(12) United States Patent
Berretta et al.

(10) Patent No.: US 9,794,048 B2
(45) Date of Patent: Oct. 17, 2017

(54) SYSTEM FOR TRANSMITTING AND RECEIVING RADIO FREQUENCY SIGNALS CARRYING COMPLEX HARMONIC MODES

(71) Applicant: EUTELSAT S A, Paris (FR)

(72) Inventors: Giuliano Berretta, Paris (FR); Jacques Dutronc, Paris (FR); Antonio Saitto, Paris (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 15/032,953

(22) PCT Filed: Nov. 5, 2013

(86) PCT No.: PCT/IB2013/003156
§ 371 (c)(1),
(2) Date: Apr. 28, 2016

(87) PCT Pub. No.: WO2015/067987
PCT Pub. Date: May 14, 2015

(65) Prior Publication Data
US 2016/0254897 A1 Sep. 1, 2016

(51) Int. Cl.
*H03D 3/18* (2006.01)
*H04J 1/00* (2006.01)
(Continued)

(52) U.S. Cl.
CPC .............. *H04L 5/02* (2013.01); *H04L 1/0003* (2013.01); *H04L 5/0007* (2013.01); *H04L 5/04* (2013.01)

(58) Field of Classification Search
CPC . H04L 5/04; H04L 5/14; H04L 1/0003; H04L 5/023; H04L 27/20; H04L 27/2601;
(Continued)

(56) References Cited

U.S. PATENT DOCUMENTS 4,470,147 A * 9/1984 Goatcher ................. H03D 1/00
329/317
4,994,784 A * 2/1991 Yoon .................. H04W 88/026
340/7.52
(Continued)

FOREIGN PATENT DOCUMENTS

EP 2639993 A2 * 2/2013
EP 2 639 993 A2 9/2013
(Continued)

OTHER PUBLICATIONS

International Search Report as issued in International Patent Application PCT/IB2013/003156, dated Aug. 18, 2014.
(Continued)

*Primary Examiner* — Daniel Washburn
*Assistant Examiner* — Sarah Hassan
(74) *Attorney, Agent, or Firm* — Pillsbury Winthrop Shaw Pittman LLP

(57) ABSTRACT

A radio communications system includes a transmitter and a receiver. The transmitter generates or receives digital symbols having a given symbol rate associated with a corresponding symbol period; and generates, every S digital symbols generated/received (S>3), a respective multi-mode digital signal, which has a predefined time length shorter than S times the symbol period, which is sampled with a predefined sampling rate higher than the symbol rate, and which carries the S digital symbols by a plurality of orthogonal harmonic modes including a main mode which is a real harmonic mode and carries P of the S digital symbols (P<S). The receiver receives and processes the radio frequency signal to obtain a corresponding incoming digital signal; and extracts, from successive, non-overlapped portions of the incoming digital signal sampled with the predefined sampling rate, the S digital symbols respectively carried by each
(Continued)

incoming digital signal portion by the orthogonal harmonic modes.

31 Claims, 38 Drawing Sheets

(51) Int. Cl.
*H04L 5/02* (2006.01)
*H04L 1/00* (2006.01)
*H04L 5/04* (2006.01)
*H04L 5/00* (2006.01)

(58) Field of Classification Search
CPC .......... H04L 25/03343; H04L 27/2602; H04L 1/0057; H04L 27/265; H04L 27/3863; H04L 5/02; H04L 1/0042; H04L 1/1854
USPC .......................................... 375/327; 370/480
See application file for complete search history.

(56) References Cited

U.S. PATENT DOCUMENTS

| | | | | |
|---|---|---|---|---|
| 5,239,557 | A * | 8/1993 | Dent ................. | H04B 1/70755 370/342 |
| 5,933,764 | A * | 8/1999 | Katayama .............. | G08B 5/229 340/5.54 |
| 8,432,884 | B1 | 4/2013 | Ashrafi | |
| 2002/0051503 | A1 * | 5/2002 | Takahiko ............... | H03D 3/007 375/327 |
| 2002/0065060 | A1 * | 5/2002 | Minnis ..................... | H04B 1/30 455/324 |
| 2003/0142234 | A1 * | 7/2003 | Dent ......................... | H04N 5/21 348/554 |
| 2004/0061804 | A1 * | 4/2004 | Favrat ................... | H03H 7/0115 348/554 |
| 2007/0019679 | A1 * | 1/2007 | Scheck ............... | H04W 88/085 370/480 |
| 2008/0146179 | A1 * | 6/2008 | Li ............................ | H05K 1/117 455/205 |
| 2009/0232191 | A1 * | 9/2009 | Gupta ................. | H04L 27/2096 375/216 |
| 2013/0235744 | A1 | 9/2013 | Chen et al. | |
| 2015/0333865 | A1 * | 11/2015 | Yu ....................... | H04B 10/5161 398/44 |

FOREIGN PATENT DOCUMENTS

| | | |
|---|---|---|
| GB | 2 410 130 A | 7/2005 |
| WO | WO 2012/084039 A1 | 6/2012 |
| WO | WO 2014/016655 A1 | 1/2014 |

OTHER PUBLICATIONS

Mohammadi, S.M., et a., "Orbital angular momentum in radio—a system study," IEEE Transactions on Antennas and Propagation, vol. 58, No. 2, 2010, pp. 565-572.

Tamburini, F., et al., "Encoding many channels in the same frequency through radio vorticity: first experimental test," arXiv.org, 2011, 17 pages.

International Preliminary Report on Patentability and the Written Opinion of the International Searching Authority as issued in International Patent Application PCT/IB2013/003156, dated May 10, 2016.

* cited by examiner

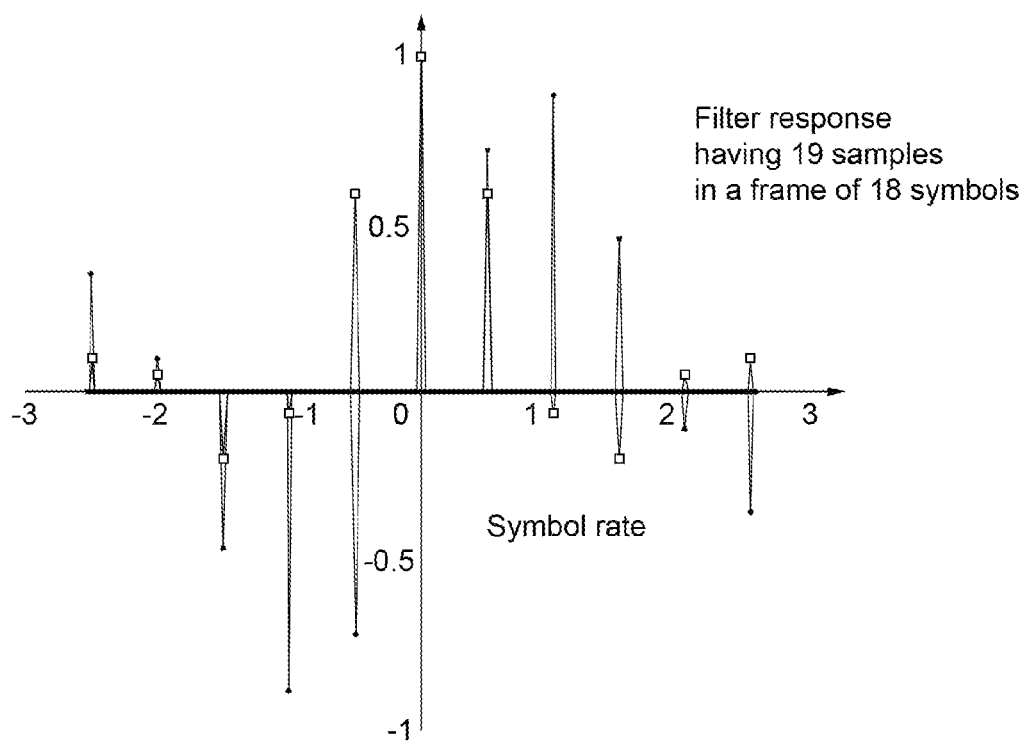
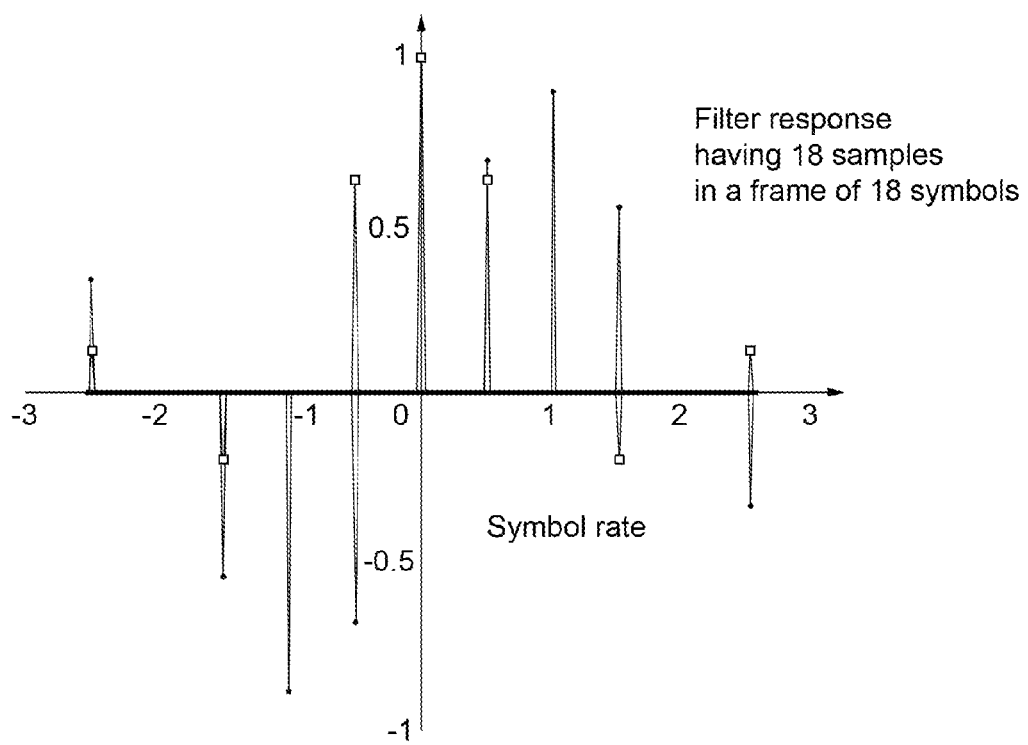
FIG. 13

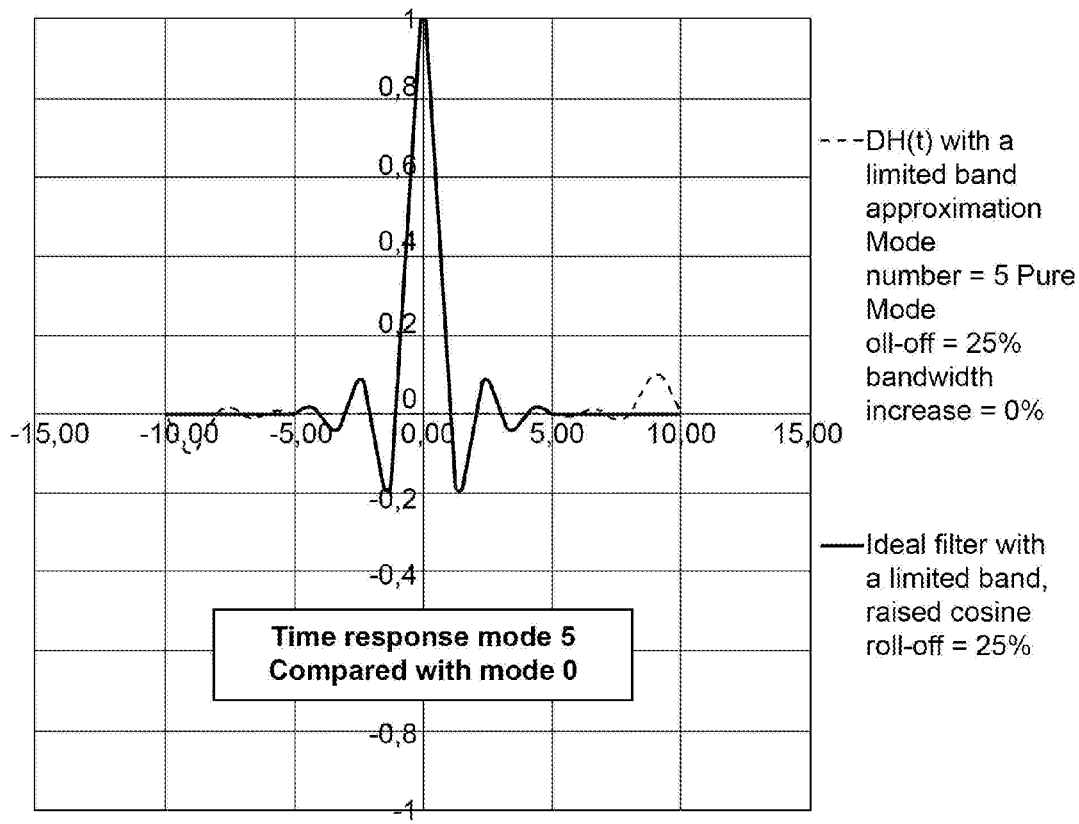
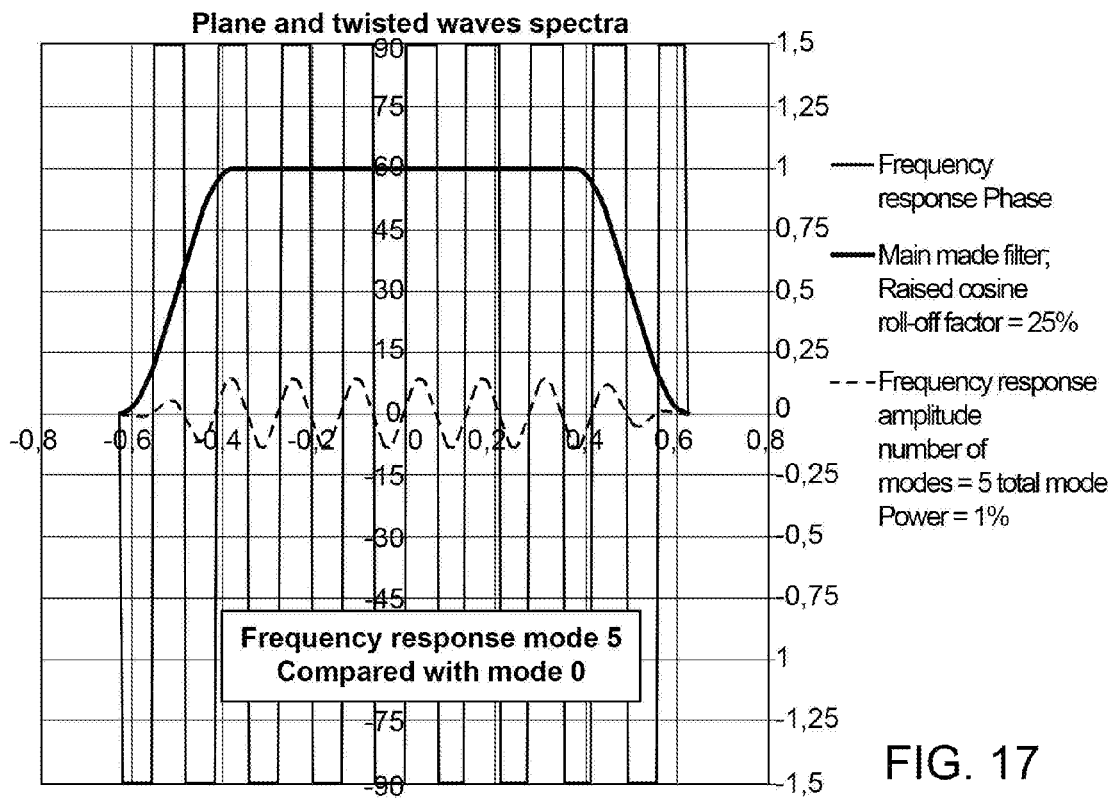
FIG. 17

Mode 0 real part even      Σ all mode with real part

SYSTEM FOR TRANSMITTING AND RECEIVING RADIO FREQUENCY SIGNALS CARRYING COMPLEX HARMONIC MODES

CROSS-REFERENCE TO RELATED APPLICATIONS

This is the U.S. National Stage of PCT/IB2013/003156, filed Nov. 5, 2013, the entire content of which is incorporated herein by reference in its entirety.

TECHNICAL FIELD OF THE INVENTION

The present invention relates to a system for transmitting and receiving at Radio Frequency (RF) (including frequencies from a few KHz to hundreds of GHz) signals carrying complex harmonic modes.

The present invention can be advantageously exploited, in general, in radio communications, and, in particular, in satellite communications and terrestrial wireless communications, such as the ones based on Long Term Evolution (LTE) and/or Worldwide Interoperability for Microwave Access (WiMAX) standards.

Moreover, the present invention can be also advantageously exploited in radar detection and Synthetic Aperture Radar (SAR) imaging.

BACKGROUND ART

In consideration of Orbital Angular Momentum (OAM) potentialities of increasing transmission capacity and since RF spectrum shortage problem is deeply felt in radio communications sector, recently a lot of experimental studies have been carried out on the use of OAM states, or modes, at RF (also known as radio vortices) in order to try to enhance RF spectrum reuse.

In this connection, reference may, for example, be made to:

- Mohammad S. M. et al., "*Orbital Angular Momentum in Radio—A System Study*", IEEE TRANSACTIONS ON ANTENNAS AND PROPAGATION, IEEE SERVICE CENTER, PISCATAWAY, N.J., US, vol. 58, no. 2, 1 Feb. 2010, pages 565-572, which shows that standard antennas arranged in circular arrays can be used to generate RF beams carrying OAM;
- Tamburini F. et al., "*Encoding many channels in the same frequency through radio Vorticity: first experimental test*", arXiv.org, 12 Jul. 2011, Ithaca, N.Y., USA, which experimentally shows that it is possible to propagate and use the properties of twisted non-monochromatic incoherent radio waves to simultaneously transmit several radio channels on one and the same frequency by encoding them in different (and, thence, orthogonal) OAM states (even without using polarization or dense coding techniques);
- GB 2 410 130 A, which discloses a planar phased array antenna for transmitting and receiving OAM radio vortex modes, which antenna comprises a circular array of cavity backed axial mode spiral antenna elements whose phase is controlled such that the phase of each antenna element changes sequentially about the array; and
- WO 2012/084039 A1, which discloses a transmit antenna arrangement comprising N antenna elements arranged along a circumference with an angular separation of degrees between neighboring antenna elements, the antenna arrangement comprising an CAM encoder arranged to receive N input signals for transmission, indexed from M=−(N−1)/2 up to M=(N−1)/2 for odd N and from M=−(N−2)/2 up to N/2 for even N; the OAM encoder connecting each input signal to each antenna element and giving each input signal M at each antenna element a phase shift of M*α relative to the phase of the same input signal M at an adjacent antenna element; wherein two or more antenna elements are directional, have their directivity in the same direction, and have an antenna aperture higher than, or equal to, 5λ, where λ is the wavelength of the N input signals.

From a mathematical perspective, the transmission of an CAM mode (or state) at a single RF (i.e., by using a pure tone) implies that the electrical field on the radiating aperture can be represented as:

$$F(\rho,\phi) = F(\rho) e^{jk\phi},$$

where $\rho$ and $\phi$ are the cylindrical coordinates on the radiating aperture, j is the imaginary unit, and k is a positive or negative integer.

The radiated field can be represented in the far zone as:

$$E(\vartheta, \varphi) = \frac{1}{R} \int\int_S F(\rho, \phi) e^{-j2\pi \frac{\rho}{\lambda} \sin(\vartheta)\cos(\varphi-\phi)} \rho \, d\rho \, d\phi,$$

where $\theta$ and $\phi$ are the spherical coordinates in the far field, R denotes the radius of the sphere centered on the radiating aperture, S denotes the integration surface used at reception side, and $\lambda$ denotes the wavelength used.

As is known, due to intrinsic characteristics of OAM, an OAM mode transmitted at a single RF (i.e., by using a pure tone) is affected by a phase singularity which creates a null at the bore-sight direction, thereby resulting that $$E(0,0) = 0.$$

In order for said phase singularity to be compensated, the integration surface S used at reception side should be sized so as to include the crown peak generated by the OAM mode.

In particular, the integration surface S used at reception side should be different for each OAM mode and, considering the sampling theorem applied to the radiating antenna, should have an area given by:

$$\Delta S = \Delta \Omega R^2 = 2\left(\frac{\lambda}{D}R\right)^2,$$

where D denotes the diameter of the radiating antenna.

Therefore, the price to be paid with pure OAM modes transmitted by using pure tones (i.e., single radiofrequencies) is that the dimensions of the equivalent receiving antenna depend on the distance R from, and on the diameter D of, the transmitting antenna.

This solution is impractical for satellite communications, where the aperture efficiency and the size of the antennas are very critical issues. For example, in geostationary-satellite-based communications in Ka band, for a ground antenna having a diameter D of about 9 m, the diameter of the receiving ring on board the geostationary satellite should be of the order of 50 Km, thereby resulting impractical.

Thence, in view of the foregoing, the main criticality in using radio vorticity in practical systems is that the orthogonality between OAM modes depends on the size of antennas, on the distance between the transmitting and receiving antennas, and on the need for the receiving antenna to operate as an interferometer basis (as, for example, disclosed in the aforesaid papers "*Orbital Angular Momentum in Radio—A System Study*" and "*Encoding many channels in the same frequency through radio Vorticity: first experimental test*", in GB 2 410 130 A and in WO 2012/084039 A1). These constraints result in OAM-based radio communication systems which are inefficient and unusable for very long distances such as the ones involved in satellite communications.

Moreover, further criticalities in the use of radio vorticity for satellite communications are represented by the need of an extremely accurate mutual pointing of the transmitting and receiving antennas, and by the unfeasibility of the geometry for Earth-satellite configurations due to the criticality of the positioning of the receiving antennas (or the receiving antenna elements).

A solution to the aforesaid technical problems is provided in the International Application No. PCT/IB2012/056804 filed on 28 Nov. 2012 in the name of EUTELSAT S.A. and concerning a multidimensional space modulation technique for transmitting and/or receiving radio vortices at frequencies ranging from a few KHz to hundreds of GHz. Specifically, the multidimensional space modulation technique according to the International Application PCT/IB2012/056804 allows to transmit and/or receive orthogonal RF OAM modes in one and the same direction (i.e., the bore-sight direction) and to overcome, at the same time, the aforesaid technical problems caused by OAM phase singularity at the bore-sight direction, thereby allowing the use of radio vortices also for long-distance radio communications, such as satellite communications.

In particular, the multidimensional space modulation according to the International Application PCT/IB2012/056804 is actually a phase modulation applied to signals to be transmitted at RF such that to result in orthogonal radio vortices along the bore-sight direction. Therefore, the modulation according to the International Application PCT/IB2012/056804 is called multidimensional space modulation because it allows orthogonal RF OAM modes to be transmitted and/or received in one and the same direction, namely the bore-sight direction, wherein each OAM mode represents a specific space channel along the bore-sight direction, which specific space channel is orthogonal to all the other space channels represented by the other OAM modes.

In order for the multidimensional space modulation according to the International Application PCT/IB2012/056804 to be understood, attention is drawn, by way of example, to the fact that, as is known, a twisted RF signal having, or carrying, the OAM mode m=+1 is characterized by only one clockwise rotation of 360° of the Poynting vector around the propagation axis per period T and, thence, it can be generated by transmitting, for example by means of four ring-arranged transmitting antenna elements, RF signals associated with phases of 0°, 90°, 180°, and 270° clockwise distributed among said four ring-arranged transmitting antenna elements. Instead, the International Application PCT/IB2012/056804 proves that it is possible and convenient, in order to transmit at RF the OAM mode m=+1 and, at the same time, to solve the problem caused by OAM phase singularity at the bore-sight direction, to exploit only one antenna transmitting the four different phases 0°, 90°, 180°, and 270° at different times (or at different frequencies) with a time step of T=T/4. This possibility increases the efficiency of the transmitting and receiving configuration, which can work regardless of the elementary antenna element spacing in an antenna array.

From a conceptual perspective, according to the International Application PCT/IB2012/056804, in order to manage OAM rotation, namely in order to control the speed of rotation of an RF OAM mode about the bore-sight direction, a supplementary phase modulation is introduced, which leaves only a residue of the OAM twist and keeps the OAM signature in a limited bandwidth. This residual rotation achieved by means of the supplementary phase modulation allows a signal having a proper bandwidth to be orthogonal to another signal having a different rotation (multiple of the minimum one). Therefore, an RF twisted wave can be transmitted by means of a modulated waveform and can be received by an antenna operating in the complex conjugate mode. The received signal is equal to the transmitted one, apart from standard attenuation and transmission and reception gains in a time period $T_{mod}$. The bandwidth increase does not prevent the transmission of plane waves (i.e., the OAM mode m=0), but limits the number of OAM modes at different central frequencies in the available bandwidth. The multidimensional space modulation according to PCT/IB2012/056804 allows to use a standard antenna in place of a phased array antenna, since the used signals are native orthogonal.

It is important to underline the fact that the generation of RF OAM modes by means of the multidimensional space modulation according to PCT/IB2012/056804 allows to drastically simplify the antenna design. In fact, the antenna does not need to take memory at the period of the carrier frequency of the phase between elements $f_0=1/T_0$. This duty is performed by the sampling frequency of the twisted waves, which is at least 3 times the signal bandwidth; therefore the phase shift assigned to the sampling is already orthogonal in time; it follows that the antenna can be a standard one without the need of using a phased array configuration on either the antenna aperture, or, in case of a reflector antenna, the focal plane. Therefore, the multidimensional space modulation according to PCT/IB2012/056804 can be exploited in satellite communications by using already existing satellite and ground antennas.

In order for the multidimensional space modulation according to PCT/IB2012/056804 to be better understood, reference is made to FIG. 1, which shows a functional block diagram of a transmitting system (denoted as whole by 1), which is disclosed in PCT/IB2012/056804 and which exploits the aforesaid multidimensional space modulation for transmitting radio vortices at frequencies ranging from a few KHz to hundreds of GHz.

In particular, the transmitting system 1 comprises:
a signal generation section 10 designed to generate
  a first digital signal $s_0(t)$ carrying an information stream, having a given sampling period $T_0$ and occupying a given frequency bandwidth W centered on a predefined frequency $f_0$, and
  up to 2N second digital signals $s_m(t)$, with $-N \leq m \leq +N$ and $N \geq 1$ (for the sake of illustration simplicity in FIG. 1 only signals $s_{+1}(t)$, $s_{-1}(t)$, $s_{+N}(t)$ and $s_{-N}(t)$ are shown), each carrying a respective information stream, having a respective sampling period $T_m=4|m|T_0$ (or $T_m=3|m|T_0$) and occupying a respective frequency bandwidth W/4|m| (or W/3|m|) centered on said predefined frequency $f_0$ (which can, conveniently, be an Intermediate Frequency (IF) thereby resulting that the first and second digital signals are IF digital signals);

a device 100 for generating OAM modes, which is coupled with said signal generation section 10 to receive the first and second digital signals generated by the latter, and which is designed to
  apply, to each second digital signal $s_m(t)$ received from the signal generation section 10, a respective space modulation associated with a respective OAM mode m so as to generate a corresponding modulated digital signal carrying said respective OAM mode m, having the given sampling period $T_0$, and occupying the given frequency bandwidth W, and
  provide an output digital signal $s_{out}(t)$ based on the modulated digital signals and on the first digital signal $s_0(t)$ received from the signal generation section 10; and
an RF transmission section 1000, which is coupled with the device 100 to receive therefrom the output digital signal $s_{out}(t)$, and which is designed to transmit at predefined radio frequencies the output digital signal $s_{out}(t)$ by means of a single antenna (which is not shown in FIG. 1 for the sake of illustration simplicity and which can be also a reflector antenna with a single feed) or an antenna array (which is not shown in FIG. 1 for the sake of illustration simplicity and which can be also a multi-feed reflector antenna), thereby transmitting an overall RF signal carrying
  said first digital signal $s_0(t)$ by means of a plane wave, and
  said second digital signals $s_m(t)$, each by means of a corresponding radio vortex having the respective OAM mode m.

The aforesaid predefined radio frequencies can conveniently range from a few KHz to hundreds of GHz depending on the specific application for which the overall transmitting system 1 is designed.

Conveniently, the signal generation section 10 can be a signal generation section of a transmitting system for satellite communications (such as a transmitting system of a feeder link Earth station, of a satellite, or of a ground apparatus for satellite communications), or of a device for wireless communications, such as LTE-based communications.

Accordingly, the RF transmission section 1000 can conveniently be an RF transmission section of a transmitting system for satellite communications (such as a transmitting system of a feeder link Earth station, of a satellite, or of a ground apparatus for satellite communications), or of a device for wireless communications, such as LTE-based communications.

Additionally, FIG. 2 shows in greater detail the device 100 for generating OAM modes, which device 100 comprises 2N OAM mode generation modules. In particular, FIG. 2 shows, for the sake of illustration simplicity, only:
  an OAM mode generation module 110 for generating OAM mode m=+1;
  an OAM mode generation module 120 for generating OAM mode m=-1;
  an OAM mode generation module 130 for generating OAM mode m=+N; and
  an OAM mode generation module 140 for generating OAM mode m=-N.

In detail, a generic OAM mode generation module for generating OAM mode m is operable to apply to a respective second digital signal $s_m(t)$ received from the signal generation section 10 a respective space modulation associated with said OAM mode m so as to generate a corresponding space-modulated digital signal $sms_m(t)$ carrying said OAM mode m, having the given sampling period $T_0$, and occupying the whole given frequency bandwidth W centered on said predefined frequency $f_0$.

More in detail, the generic OAM mode generation module for generating the OAM mode m is operable to:
  receive a synchronization signal $synch_m$ (not shown in FIG. 2 for the sake of illustration clarity) indicating the given sampling period $T_0$ and, conveniently, also the sampling period $T_m$ of the respective second digital signal $s_m(t)$ received from the signal generation section 10; and
  apply the respective space modulation to said respective digital signal $s_m(t)$ by
    digitally interpolating said respective second digital signal $s_m(t)$ on the basis of the received synchronization signal $synch_m$ so as to generate a corresponding digitally-interpolated signal having the given sampling period $T_0$;
    applying to the digitally-interpolated signal a respective digital phase modulation associated with said OAM mode m such that to generate a corresponding phase-modulated signal carrying said OAM mode m with a predefined OAM mode rotation speed; and
    digitally filtering the phase-modulated signal thereby obtaining a filtered signal which represents the aforesaid space-modulated digital signal $sms_m(t)$.

For example, the OAM mode generation module 110 is conveniently configured to:
  receive, from the signal generation section 10, the second digital signal $s_{+1}(t)$ and a synchronization signal $synch_{+1}$ indicating the given sampling period $T_0$ and, conveniently, also the sampling period $T_{+1}=4T_0$ (or $T_{+1}=3T_0$) of the second digital signal $s_{+1}(t)$;
  digitally interpolate the second digital signal $s_{+1}(t)$ by outputting, for each digital sample of said second digital signal $s_{+1}(t)$, four corresponding digital samples with time step (i.e., time distance) $T_0$, thereby generating a corresponding digitally-interpolated signal having the given sampling period $T_0$;
  apply to each set of four digital samples obtained by means of the digital interpolation digital phase shifts related to the OAM mode +1 with the predefined OAM mode rotation speed (namely, digital phase shifts related to phase values 0, $\pi/2$, $\pi$ and $3\pi/2$) so as to generate a corresponding set of four phase-shifted digital samples, which corresponding set of four phase-shifted digital samples carries said OAM mode +1 with the predefined OAM mode rotation speed;
  digitally filter each set of four phase-shifted digital samples obtained by means of the digital phase shifting so as to output a corresponding set of four filtered digital samples; and
  combine the sets of four filtered digital samples obtained by means of the digital filtering into a single filtered signal which represents the space-modulated digital signal $sms_{+1}(t)$.

Accordingly, the OAM mode generation module 120 is conveniently configured to:
  receive, from the signal generation section 10, the second digital signal $s_{-1}(t)$ and a synchronization signal $synch_{-1}$ indicating the given sampling period $T_0$ and, conveniently, also the sampling period $T_{-1}=4T_0$ (or $T_{-1}=3T_0$) of the second digital signal $s_{-1}(t)$;
  digitally interpolate the second digital signal $s_{-1}(t)$ by outputting, for each digital sample of said second digital signal $s_{-1}(t)$, four corresponding digital samples with time step (i.e., time distance) $T_0$, thereby generating a corresponding digitally-interpolated signal having the given sampling period $T_0$;

apply to each set of four digital samples obtained by means of the digital interpolation digital phase shifts related to the OAM mode −1 with the predefined OAM mode rotation speed (namely, digital phase shifts related to phase values 0, $3\pi/2$, $\pi$ and $\pi/2$) so as to generate a corresponding set of four phase-shifted digital samples, which corresponding set of four phase-shifted digital samples carries said OAM mode −1 with the predefined OAM mode rotation speed;

digitally filter each set of four phase-shifted digital samples obtained by means of the digital phase shifting so as to output a corresponding set of four filtered digital samples; and combine the sets of four filtered digital samples obtained by means of the digital filtering into a single filtered signal which represents the space-modulated digital signal $sms_{-1}(t)$.

The OAM mode generation modules for generating higher-order OAM modes (i.e., with $|m|>1$) operate, mutatis mutandis, conceptually in the same way as the OAM mode generation modules 110 and 120.

Moreover, again with reference to FIG. 2, the device 100 further comprises:

a combining module 150 operable to Combine the first digital signal $s_0(t)$ received from the signal generation section 10 and all the space-modulated digital signals $sms_m(t)$ generated by the OAM mode generation modules into a corresponding combined digital signal $s_c(t)$; and a transmission filtering module 160, which is operable to digitally filter the combined digital signal $s_c(t)$ by means of a predefined transmission filter such that to adjust the signal bandwidth to the bandwidth of transmission radio channel (i.e., the specific radio channel used in transmission) so as to reduce Inter-Symbol Interference (ISI), thereby obtaining a corresponding output digital signal $s_{out}(t)$; wherein the transmission filtering module 160 is coupled with the RF transmission section 1000 to provide the latter with the output digital signal $s_{out}(t)$.

For example, in case of (free-space) satellite communications on a radio channel having the given frequency bandwidth W, the transmission filter can be a predefined root raised cosine filter adapted to said given frequency bandwidth W.

As far as reception is concerned, reference is made to FIG. 3, which shows a functional block diagram of a receiving system (denoted as whole by 2), which is disclosed in PCT/IB2012/056804 and which exploits the aforesaid multidimensional space modulation for receiving radio vortices at frequencies ranging from a few KHz to hundreds of GHz.

In particular, the receiving system 2 comprises:

an RF reception section 2000, which is designed to receive signals at predefined radio frequencies by means of a single antenna (which is not shown in FIG. 3 for the sake of illustration simplicity and which can be also a reflector antenna with a single feed) or an antenna array (which is not shown in FIG. 3 for the sake of illustration simplicity and which can be also a multi-feed reflector antenna), and which is designed to obtain an incoming digital signal $u_{in}(t)$ on the basis of the received signals;

a device 200 for demodulating OAM modes, which is coupled with said RF reception section 2000 to receive the incoming digital signal $u_{in}(t)$ therefrom, and which is designed to process said incoming digital signal $u_{in}(t)$ so as to output useful signals (in FIG. 3 useful signals $u_0(t)$, $u_{+1}(t)$, $u_{-1}(t)$, $u_{+N}(t)$ and $u_{-N}(t)$ outputted by the device 200 are shown); and a signal processing section 20, which is coupled with said device 200 to receive the useful signals outputted by the latter and which is designed to process said useful signals.

The aforesaid predefined radio frequencies can conveniently range from a few KHz to hundreds of GHz depending on the specific application for which the overall receiving system 2 is designed.

Conveniently, the RF reception section 2000 can be an RF reception section of a receiving system for satellite communications (such as a receiving system of a feeder link Earth station, of a satellite, or of a ground apparatus for satellite communications), of a device for wireless communications (such as LTE-based communications), of a radar system, of a Synthetic Aperture Radar (SAR) system, or of a radio astronomy receiving system.

Accordingly, the signal processing section 20 can conveniently be a signal processing section of a receiving system for satellite communications (such as a receiving system of a feeder link Earth station, of a satellite, or of a ground apparatus for satellite communications), of a device for wireless communications (such as LTE-based communications), of a radar system, of a SAR system, or of a radio astronomy receiving system.

Additionally, FIG. 4 shows in greater detail the device 200 for demodulating CAM modes. In particular, as shown in FIG. 4, the device 200 comprises a reception filtering module 210, which is operable to digitally filter the incoming digital signal $u_{in}(t)$ by means of a predefined reception filter such that to equalize the incoming digital signal $u_{in}(t)$ with respect to reception radio channel (i.e., the specific radio channel used in reception) and, conveniently, also with respect to transmission filter (i.e., the specific filter used in transmission), thereby obtaining a corresponding filtered incoming digital signal $u_f(t)$.

For example, in case of (free-space) satellite communications on a radio channel having the given frequency bandwidth W, wherein the transmission filter is a predefined root raised cosine filter adapted to said given frequency bandwidth W, the reception filter can be the complex conjugate of said predefined root raised cosine filter so as to reduce ISI.

Additionally, again with reference to FIG. 4, the device 200 further comprises a digital oversampling module 220 operable to digitally oversample the filtered incoming digital signal $u_f(t)$ on the basis of a predefined oversampling period $T_{over}$, thereby outputting a corresponding set of digital samples.

For example, in case the receiving system 2 is configured to receive the RF signals transmitted by the transmission system 1, the predefined oversampling period $T_{over}$ can conveniently be equal to $T_0/Q$, wherein $T_0$ is the given sampling period previously introduced in connection with the transmission system 1, and Q denotes an integer higher than one.

Furthermore, again with reference to FIG. 4, the device 200 comprises also a processing module 230 configured to:

provide a linear system of M equations (where M denotes an integer higher than one) relating the set of digital samples outputted by the digital oversampling module 220 to X unknown digital values (where X denotes an integer higher than one and lower than M) of useful signals associated, each, with a respective predefined OAM mode m with a predefined OAM mode rotation speed;

wherein said linear system of M equations relates the set of digital samples outputted by the digital oversampling module 220 to the X unknown digital values through first predefined parameters related to the predefined OAM modes with the predefined OAM mode rotation speed, and second predefined parameters related to the predefined reception filter, to the reception radio channel and, conveniently, also to the transmission filter;

compute the X digital values by solving the linear system of M equations; and digitally generate and output the useful signals (for example the useful signals $u_0(t)$, $u_{+1}(t)$, $u_{-1}(t)$, $u_{+N}(t)$ and $u_{-N}(t)$ shown in FIG. 4) on the basis of the corresponding digital values computed.

In this connection, it is important to underline the fact that, in order to extract the useful signals (i.e., in order to solve the linear system of M equations thereby computing the X digital values, and, thence, to generate and output the useful signals), the processing module 230 is conveniently configured to operate as a generalized matched filter which exploits one or more mathematical processing techniques, such as the pseudo-inverse technique.

Moreover, it is also important to underline the fact that the oversampling operation performed by the digital oversampling module 220 allows to increase redundancy of the linear system of M equations (i.e., it allows to obtain a number M of independent equations higher and higher than the number X of the unknown digital values), thereby allowing to find more robust solutions to said linear system of M equations.

Furthermore, the better the characterization of the OAM modes and of the radio channel in the linear system of M equations, the more robust the resolution of said linear system of M equations. Specifically, an increase of the number of first and second predefined parameters used in the linear system of M equations allows to increase redundancy of said linear system of M equations (i.e., it allows to obtain a number M of independent equations higher and higher than the number X of the unknown digital values), thereby allowing to optimize the resolution of, i.e., to find optimum solutions to, said linear system of M equations in terms of energy per bit to noise power spectral density ratio $E_b/N_0$.

In case the receiving system 2 is configured to receive the RF signals transmitted by the transmission system 1, the first predefined parameters are related to the sampling periods $T_0$ and $T_m$ previously introduced in connection with the device 100, and to the digital phase shifts applied by the OAM mode generation modules of the device 100 to the digital samples of the digitally-interpolated signals.

Moreover, again in case the receiving system 2 is configured to receive the RF signals transmitted by the transmission system 1, the useful signals generated and outputted by the processing module 230 (such as the signals $u_0(t)$, $u_{+1}(t)$, $u_{-1}(t)$, $u_{+N}(t)$ and $u_{-N}(t)$ shown in FIG. 4) are the digital signals transmitted by said transmission system 1 by means of the plane wave and the several radio vortices (namely the signals $s_0(t)$, $s_{+1}(t)$, $s_{-1}(t)$, $s_{+N}(t)$ and $s_{-N}(t)$ shown in FIGS. 1 and 2).

Preferably, the device 100 for generating OAM modes and the device 200 for demodulating OAM modes are implemented by means of Field-Programmable Gate Array (FPGA), Application-Specific Integrated Circuit (ASIC), and Software Defined Radio (SDR) technologies.

Finally, according to a further aspect of to the International Application PCT/IB2012/056804, an overall radio communication system including both the transmission system 1 and the receiving system 2 is preferably designed to:

monitor interference experienced by the radio vortices transmitted; and, if the interference experienced by a radio vortex carrying a given digital signal $s_m(t)$ by means of a given OAM mode m meets a given interference-related condition (for example, if it exceeds a given interference level), start using an OAM mode m* different from the given OAM mode m for transmitting the information stream previously carried by said given digital signal $s_m(t)$ by means of said given OAM mode m, and stop using said given OAM mode m.

In case said further aspect of PCT/IB2012/056804 is used for satellite communications, it is possible to mitigate jammer, since said further aspect of PCT/IB2012/056804 allows to reject a jammed OAM mode. Moreover, said further aspect of PCT/IB2012/056804 can be used also in combination with other anti-jamming capabilities of the receiving system.

OBJECT AND SUMMARY OF THE INVENTION

The Applicant has carried out an in-depth study in order to develop a practical, efficient mode for carrying out the multidimensional space modulation disclosed in the International Application PCT/IB2012/056804, and this in-depth study has led the Applicant to develop a new, inventive system for transmitting and receiving signals at Radio Frequency (RF) (including frequencies from a few KHz to hundreds of GHz) with increased transmission capacity.

Therefore, a first object of the present invention is that of providing a practical, efficient mode for carrying out the multidimensional space modulation according to the International Application PCT/IB2012/056804.

Moreover, a second object of the present invention is that of providing a system for transmitting and receiving RF signals with increased transmission capacity.

These and other objects are achieved by the present invention in so far as it relates to a radio communications system, to a transmitter and a receiver of said radio communications system, and to radar system, as defined in the appended claims.

In particular, the radio communications system according to the present invention comprises a transmitter and a receiver, wherein the transmitter is configured to:

generate or receive digital symbols having a given symbol rate associated with a corresponding symbol period;

generate, every S digital symbols generated/received, a respective multi-mode digital signal, which has a predefined time length shorter than S times the symbol period, which is sampled with a predefined sampling rate higher than the symbol rate, and which carries said S digital symbols by means of a plurality of orthogonal harmonic modes comprising a main mode which is a real harmonic mode and carries P of said S digital symbols, and one or more secondary modes carrying the other S-P digital symbols, each secondary mode being a complex harmonic mode time-shifted by half the symbol period with respect to the main mode; and transmit a radio frequency signal carrying a sequence of the generated multi-mode digital signals;

S being an integer higher than three and P being an integer lower than S.

Moreover, the receiver is configured to:
receive the radio frequency signal transmitted by the transmitter;
process the received radio frequency signal so as to obtain a corresponding incoming digital signal; and
extract, from successive, non-overlapped portions of the incoming digital signal sampled with the predefined sampling rate, the S digital symbols respectively carried by each incoming digital signal portion by means of the orthogonal harmonic modes; wherein each of the successive, non-overlapped portions of the incoming digital signal has the predefined time length.

Preferably, the transmitter is configured to generate a multi-mode digital signal carrying S digital symbols by:
allocating P of the S digital symbols to the main mode by providing, for each of said P digital symbols, a corresponding complex value which represents said digital symbol and is related to the main mode;
allocating each of the other S-P digital symbols to a corresponding secondary mode by providing, for each of said S-P digital symbols, a corresponding complex value which represents said digital symbol and is related to the secondary mode to which said digital symbol is allocated;
computing, by using a predefined transmission matrix, M multi-mode complex values related to M successive time instants which, within the predefined time length, are separated by half the symbol period, wherein M is an integer equal to or higher than S, and wherein the predefined transmission matrix relates
the S complex values representing the S digital symbols and related to the harmonic modes
to the M successive time instants
through complex coefficients each of which is related to a respective harmonic mode and to a respective time instant; and
generating a multi-mode digital signal having the predefined time length and sampled with the predefined sampling rate on the basis of the M multi-mode complex values computed.

Again preferably, the receiver is configured to extract the S digital symbols carried by an incoming digital signal portion having the predefined time length and sampled with the predefined sampling rate by:
extracting, from said incoming digital signal portion, M multi-mode complex values related to M successive time instants which are, within the predefined time length, separated by half the symbol period;
computing, by using a reception matrix derived from the predefined transmission matrix, S complex values representing the S digital symbol carried by said incoming digital signal portion by means of the orthogonal harmonic modes, wherein said reception matrix relates
the M extracted multi-mode complex values related to the M successive time instants
to the S complex values to be computed
through complex coefficients each of which is related to a respective harmonic mode and to a respective time instant; and
determining the S digital symbols represented by the S complex values computed.

Conveniently, the reception matrix is derived from the predefined transmission matrix through a generalized inversion technique.

More conveniently, the predefined transmission matrix is such that the matrix resulting from the multiplication of the transpose of said predefined transmission matrix and said predefined transmission matrix has a determinant different from zero, and the reception matrix is derived from the predefined transmission matrix through a pseudo-inverse technique.

More and more conveniently, the reception matrix is computed on the basis of the following formula:

$$[[GMF]] = ([[A]]^T [[A]])^{-1} [[A]]^T,$$

where $[[GMF]]$ denotes the reception matrix, $[[A]]$ denotes the predefined transmission matrix, $[[A]]^T$ denotes the transpose of the predefined transmission matrix, and $([[A]]^T [[A]])^{-1}$ denotes the operation of inversion of the matrix resulting from the multiplication of the transpose of the predefined transmission matrix and the predefined transmission matrix.

Preferably, the main mode comprises, within the predefined time length, P samples with sampling period equal to the symbol period, the secondary modes comprise, within the predefined time length, P-1 samples with sampling period equal to the symbol period, each secondary mode is time-shifted by half the symbol period with respect to the main mode, and said M successive time instants, which, within the predefined time length, are separated by half the symbol period, are the sampling times of the main mode and of the secondary modes, thereby resulting that M=2P-1.

More preferably, the harmonic modes comprise 2N secondary complex harmonic modes each of which carries a respective Orbital Angular Momentum (OAM) mode and has a respective topological-charge-related index n comprised between -N and +N, wherein N is an integer higher than one; moreover, the main mode carries $P=2^{N+1}+1$ digital symbols and each secondary complex harmonic mode having topological-charge-related index n carries $2^{N-n+1}$ digital symbols, thereby resulting that $M=2^{N+2}+1$ and $S=2^{N+2}-1$.

Conveniently, the predefined sampling rate depends at least on the predefined time length of each multi-mode digital signal and of each of the successive, non-overlapped portions of the incoming digital signal.

More conveniently, the predefined time length is equal to P times the symbol period.

More and more conveniently, the predefined sampling rate is determined on the basis of the following formula:

$$CR = \frac{2P+u}{2P} \cdot \frac{1}{T_S},$$

where CR denotes said predefined sampling rate, $T_S$ denotes the symbol period, and u denotes a digital-vestigial-component-related parameter whose value is an integer and depends at least on the predefined time length.

Preferably, the transmitter is configured to generate a multi-frame digital signal comprising successive, non-overlapped time frames each of which has the predefined time length and is occupied by a respective multi-mode digital signal; moreover, the multi-frame digital signal carries frame synchronization data related to frame synchronization of its time frames; accordingly, the radio frequency signal transmitted by the transmitter carries the multi-frame digital signal;

Additionally, the receiver is further configured to:
extract the frame synchronization data from the incoming digital signal;

detect, on the basis of the extracted frame synchronization data, successive, non-overlapped time frames of the incoming digital signal with the predefined time length; and, for each detected time frame of the incoming digital signal, extract, from the incoming digital signal portion within said time frame, the S digital symbols carried by said incoming digital signal portion by means of the orthogonal harmonic modes.

More preferably, the multi-frame digital signal comprises a preamble followed by F successive, non-overlapped time frames occupied, each, by a respective multi-mode digital signal, F being an integer higher than one; in particular, the preamble carries frame synchronization data related to frame synchronization of the F following time frames.

More and more preferably, the frame synchronization data indicate time frame beginning and/or the predefined time length of the time frames.

BRIEF DESCRIPTION OF THE DRAWINGS

For a better understanding of the present invention, preferred embodiments, which are intended purely by way of non-limiting example, will now be described with reference to the attached drawings (all not to scale), wherein:

FIG. 13 schematically illustrates the effect of a digital vestigial component on the impulse response of a filter representing a sampling rate according to a preferred embodiment of the present invention;

FIG. 17 schematically illustrates time and frequency responses for OAM mode $n=+5$ with respect to OAM mode $n=0$ according to a preferred embodiment of the present invention;

FIGS. 30-32 schematically illustrate examples of generalized transmission matrices exploitable by the multi-mode signal generation device shown in FIG. 26;

DETAILED DESCRIPTION OF PREFERRED EMBODIMENTS OF THE INVENTION

Figure 1:
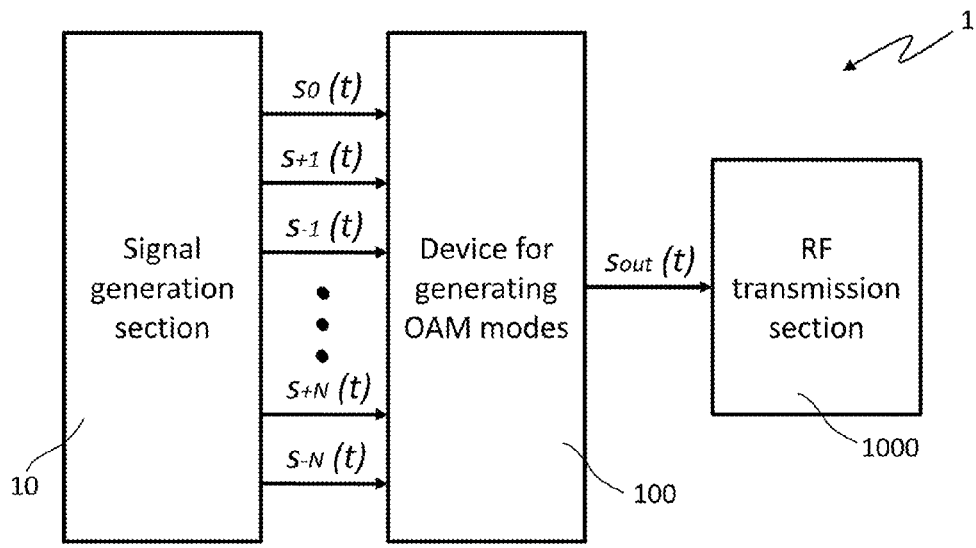
FIG. 1 schematically illustrates a transmitting system for transmitting radio vortices according to the background art.
Figure 2:
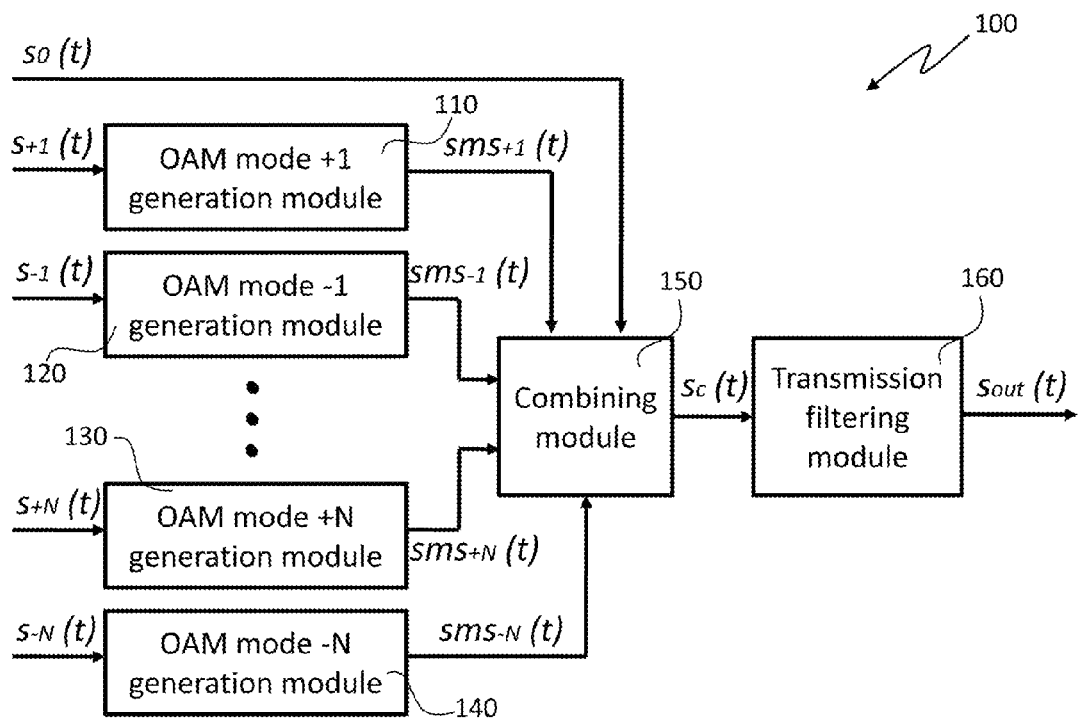
FIG. 2 schematically illustrates a device for generating OAM modes, which device is exploited by the transmitting system shown in FIG. 1.
Figure 3:
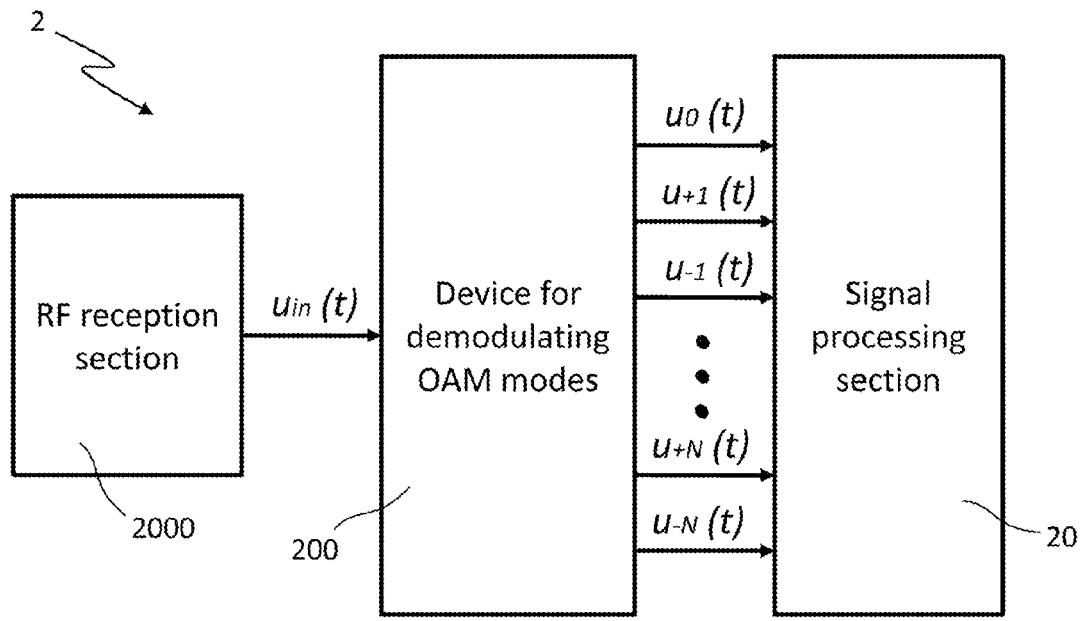
FIG. 3 schematically illustrates a receiving system for receiving radio vortices according to the background art.
Figure 4:
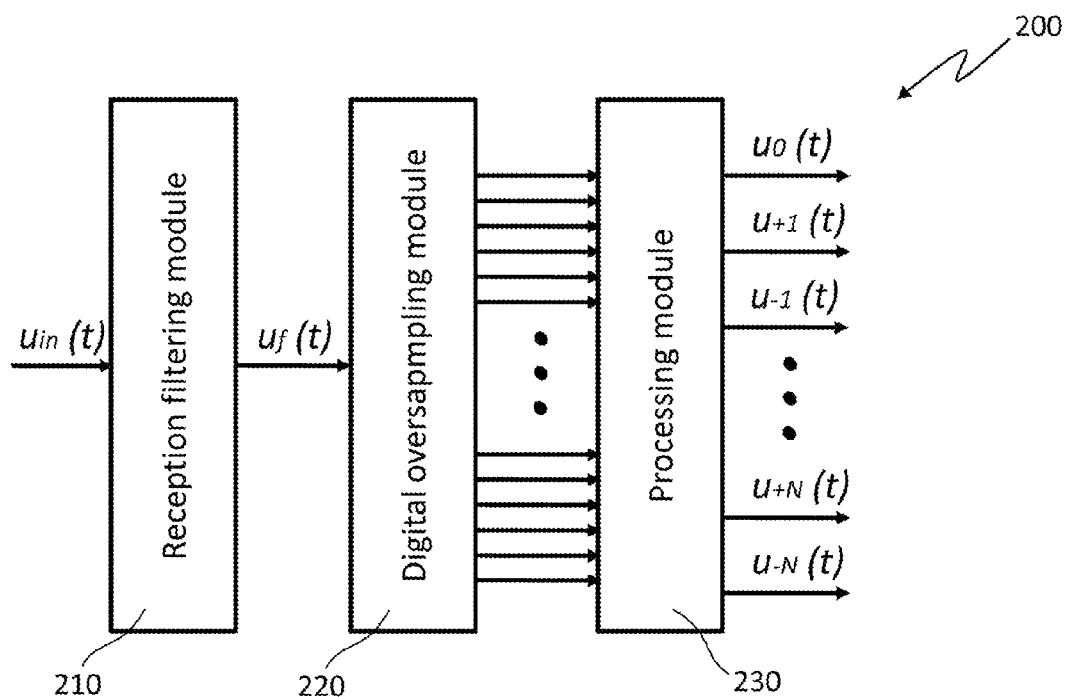
FIG. 4 schematically illustrates a device for demodulating OAM modes, which device is exploited by the receiving system shown in FIG. 2.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

The present invention relates, in general, to a practical, efficient mode for increasing transmission capacity and, in particular, for increasing RF spectrum reuse by generating supplementary channels re-using one and the same frequency band.

In brief, features peculiar to OAM are, as is known, spatial features and are, as previously explained, inapplicable to satellite communications due to OAM phase singularity at bore-sight direction. Therefore, according to an aspect of the present invention, OAM features are "transformed" into time features. This implies that time samples are to be processed considering a time interval and not single time samples, i.e., the present invention introduces the capability to consider an imaginary signal along with a real signal, both sharing one and the same frequency band. The previous sentence is quite different from the traditional concept of analytical signals, for which the relation between real and imaginary parts is not free and, thence, no additional degree of freedom can be introduced. On the contrary, the present invention implies the possibility of introducing an imaginary signal independent of the real one. In the following explanations of why the generation of such a signal is possible and how it can be carried out will be presented, and a practical, efficient implementation thereof will be described.

The introduction of a time interval for generating additional degrees of freedom can be regarded as a method equivalent to the introduction of an imaginary signal in the same baseband of a real signal. In fact, the imaginary part of a signal can be considered a shift in time of the signal itself.

In a way similar to the traditional analytical signals, the baseband can be translated, i.e., shifted, to the positive frequency axis by half the bandwidth and, by doing so, the real and the imaginary signals become both real and share one and the same bandwidth. The main difference with respect to the traditional analytical signals is that, in order for these two signals to be extracted, it is necessary to use a processing involving a time frame longer than the one used for analytical signals (for which the time frame is reduced to one symbol).

The methodology can be regarded as similar to interferometry, but, instead of using multiple points in "physical space", it uses multiple points in "time space".

Considering multiple time points implies the possibility of working with time-shifted signals, i.e., imaginary signals (since an imaginary signal is equivalent to a signal shifted in time).

As is known, Hilbert transform allows an imaginary signal to be introduced. In the following a use of Hilbert transform for achieving a procedure for generating independent signals in one and the same bandwidth by taking multiple time points into consideration will be presented.

The application of Hilbert transform results in a cut of the negative component of the frequency spectrum. This cut produces a spectrum which is no longer even and generates a complex signal in time.

In practical systems the process deals with real signals and the Hilbert transform presents a tail in time representing the track of the part of the signal which is represented by the negative frequencies.

Figure 5:
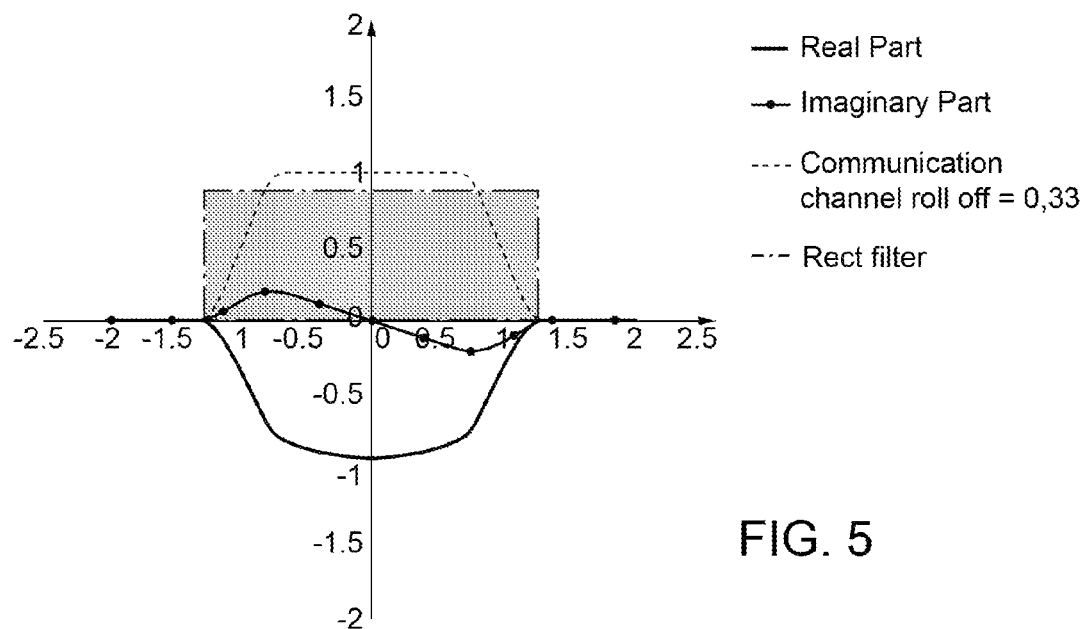
FIGS. 5 and 6 schematically illustrate, respectively, a rect filter and a filter based on a double-bandwidth Hilbert transform for filtering a generic band-limited signal.

For the sake of description simplicity, let us consider a signal defined by a frequency band function which is a rectangular function rect(f/B) (in this respect, reference is made to FIG. 5 which schematically shows an example of rect function). This function can be multiplied by a double-bandwidth Hilbert transform DH(f), such that its value is 1 for f>0, and −1 for f<0 (in this respect, reference is made to FIG. 6 which schematically shows an example of double-bandwidth Hilbert transform).

Figure 6:
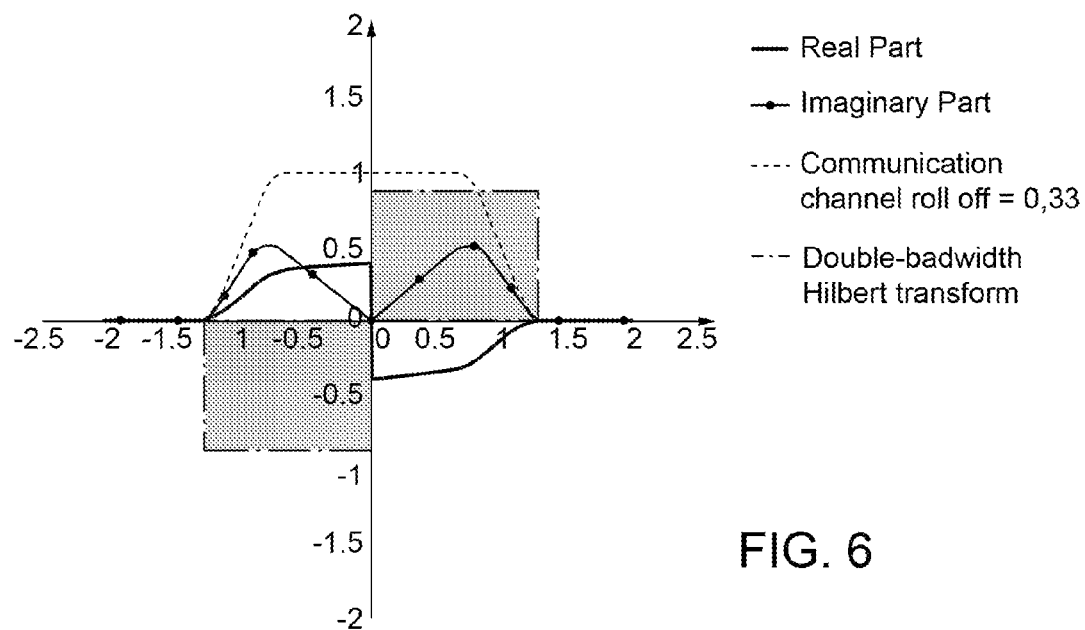

As inferred from FIGS. 5 and 6, a first generic band-limited signal X(f) multiplied by the rect function remains unchanged, while a second generic band-limited signal Y(f) multiplied by the double-bandwidth Hilbert transform DH(f) can be defined as:

$$Y(f) = Y(f)^+ u_0(f) - Y(-f)^- u_0(-f)$$

where $u_0(f)$ and $u_0(-f)$ are the step functions for $f>0$ and $f<0$, respectively.

Figure 7:
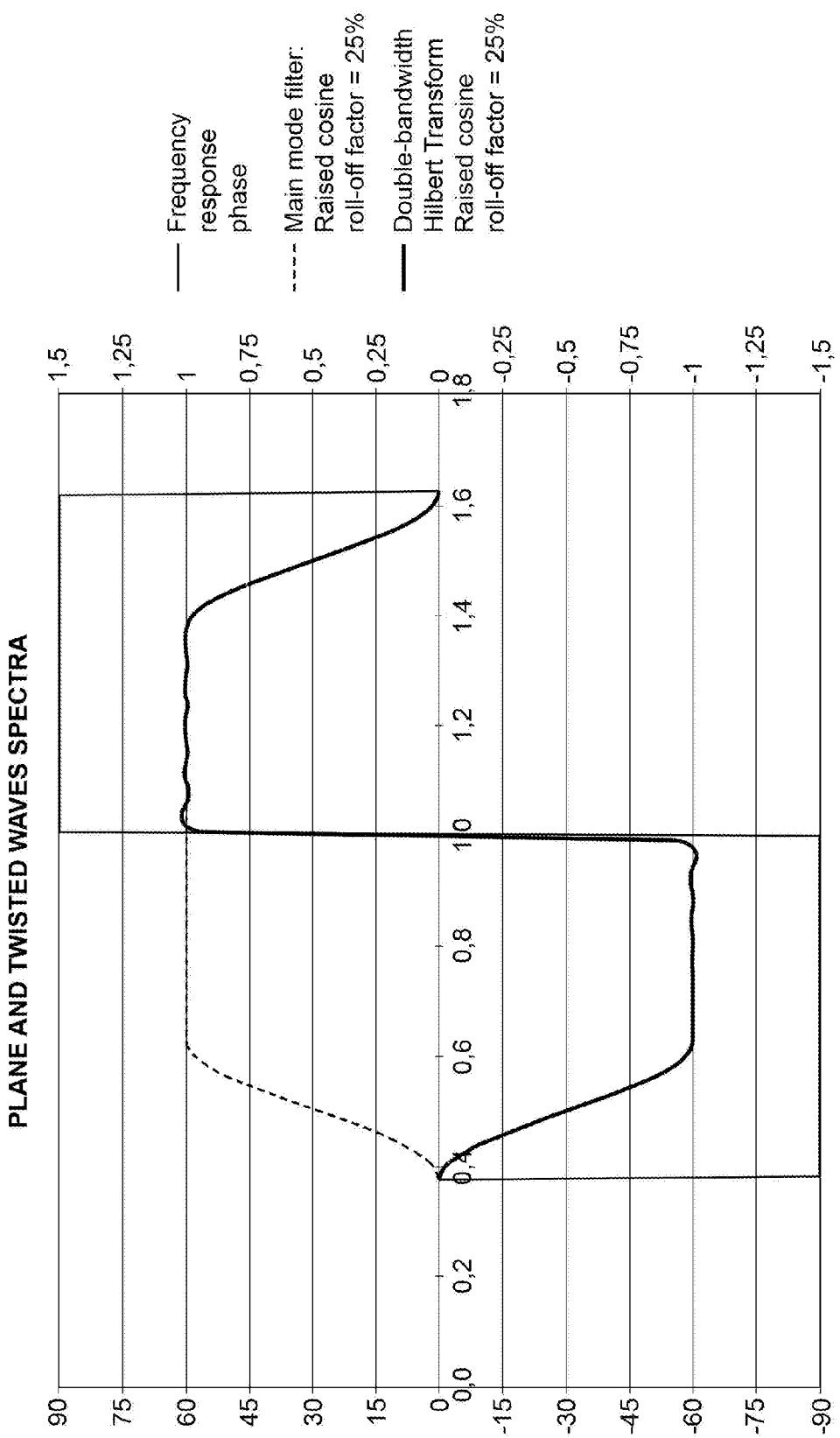
FIG. 7 schematically illustrates an example of frequency shift of a conventional signal and of a double-bandwidth-Hilbert-transformed signal.

The two signals X(f) and Y(f) can be shifted in frequency similarly to traditional analytical signals, in particular they can be shifted to the positive frequency axis and, by doing so, they become both real and detectable independently of each other (in this respect, reference is made to FIG. 7 which schematically shows an example of frequency shift of the conventional and double-bandwidth-Hilbert-transformed signals). Anyway, as it will be explained in the following, the detection process needs to take into account a sample frame and not single samples. This is a direct consequence of the properties of the Hilbert transform.

Figure 8:
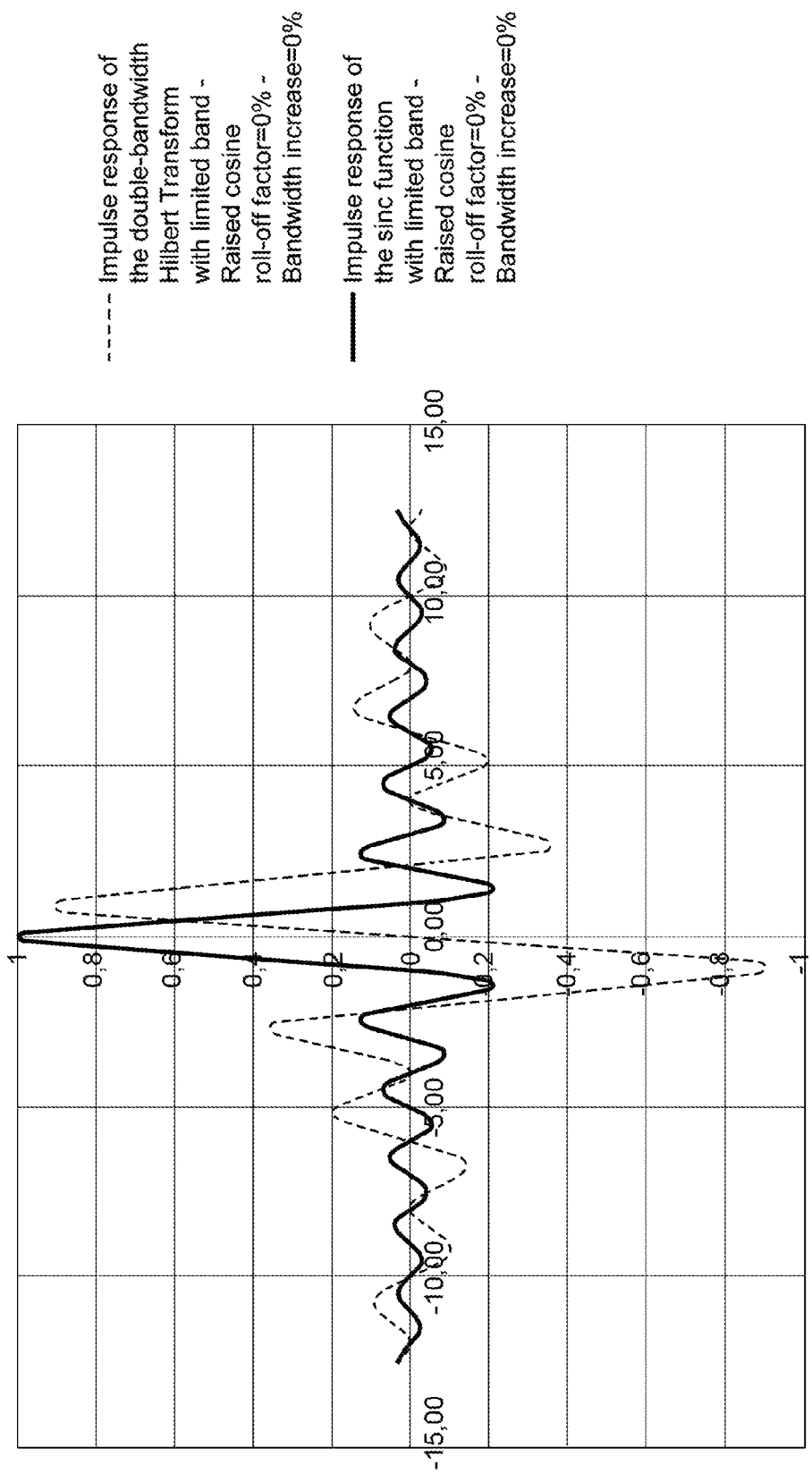
FIG. 8 schematically illustrates the impulse response of a sinc function and of a double-bandwidth Hilbert transform function.
Figure 9:
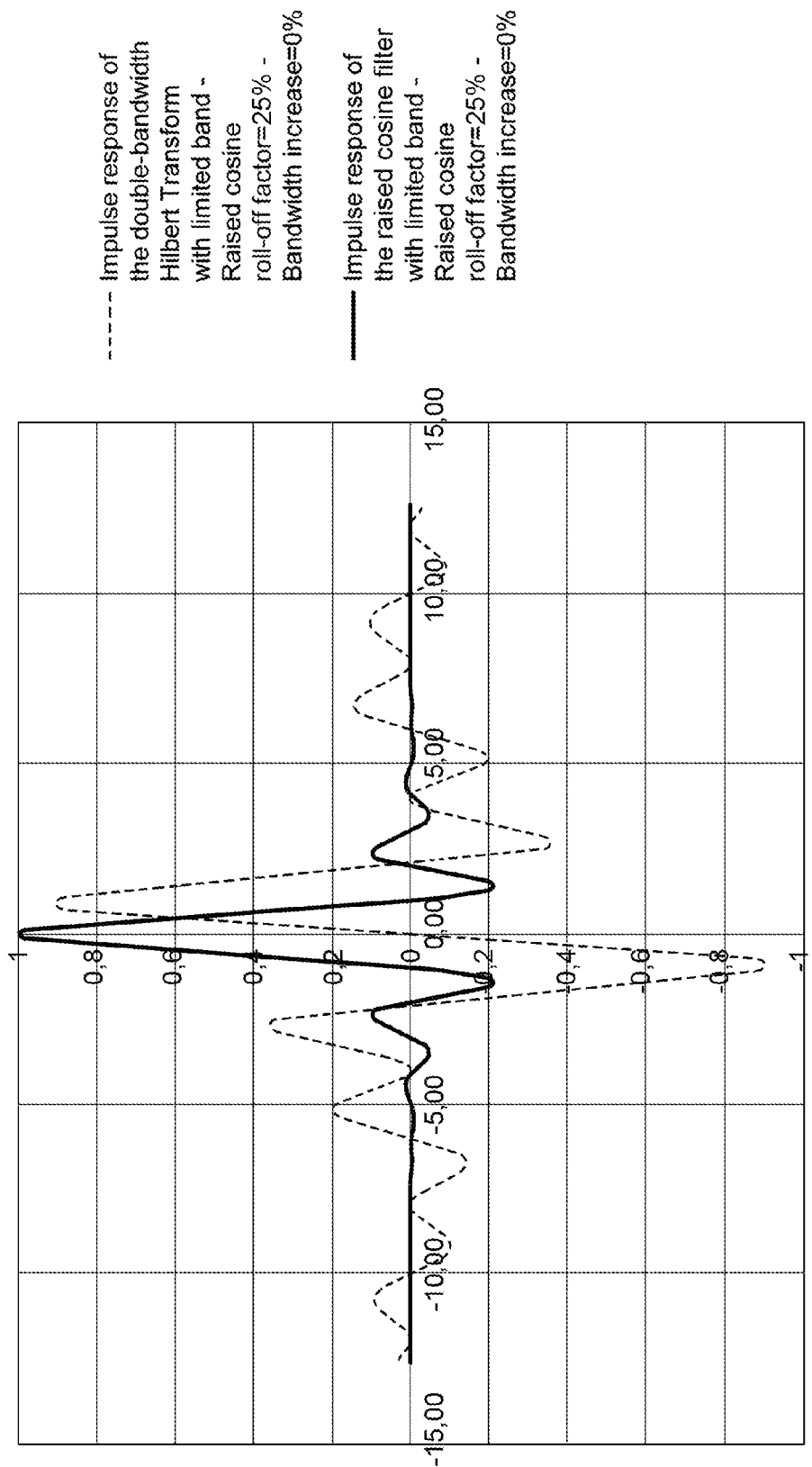
FIG. 9 schematically illustrates the impulse response of a raised cosine filter and of a double-bandwidth Hilbert transform function.

The impulse response of the conventional filter can be a conventional sinc function or a raised cosine function, while the impulse response DH(t) of the double-bandwidth Hilbert transform results to be the difference, in frequency domain, of two rectangular (or rect) functions, each with half of the overall bandwidth. Said impulse response DH(t) presents time tails which are considerably long thereby rendering a practical utilization of said impulse response DH(t) difficult. In this respect, reference is made to FIG. 8 which schematically shows the impulse response of the sinc function and of the double-bandwidth Hilbert transform function. The situation substantially does not improve in spite of the introduction of a raised cosine filter due to the presence of the strong discontinuity in the middle of the band. In this respect, reference is made to FIG. 9 which schematically shows the impulse response of the raised cosine filter and of the double-bandwidth Hilbert transform.

The tail length of the DH(t) function can be managed by developing the DH(f) function into orthogonal harmonic modes. Each of these modes has amplitude $A_{2k-1}$ given by:

$$A_{2k-1} = \frac{2\sqrt{2}}{\pi(2k-1)},$$

with k=1, 2, 3, . . . , K

Figure 10:
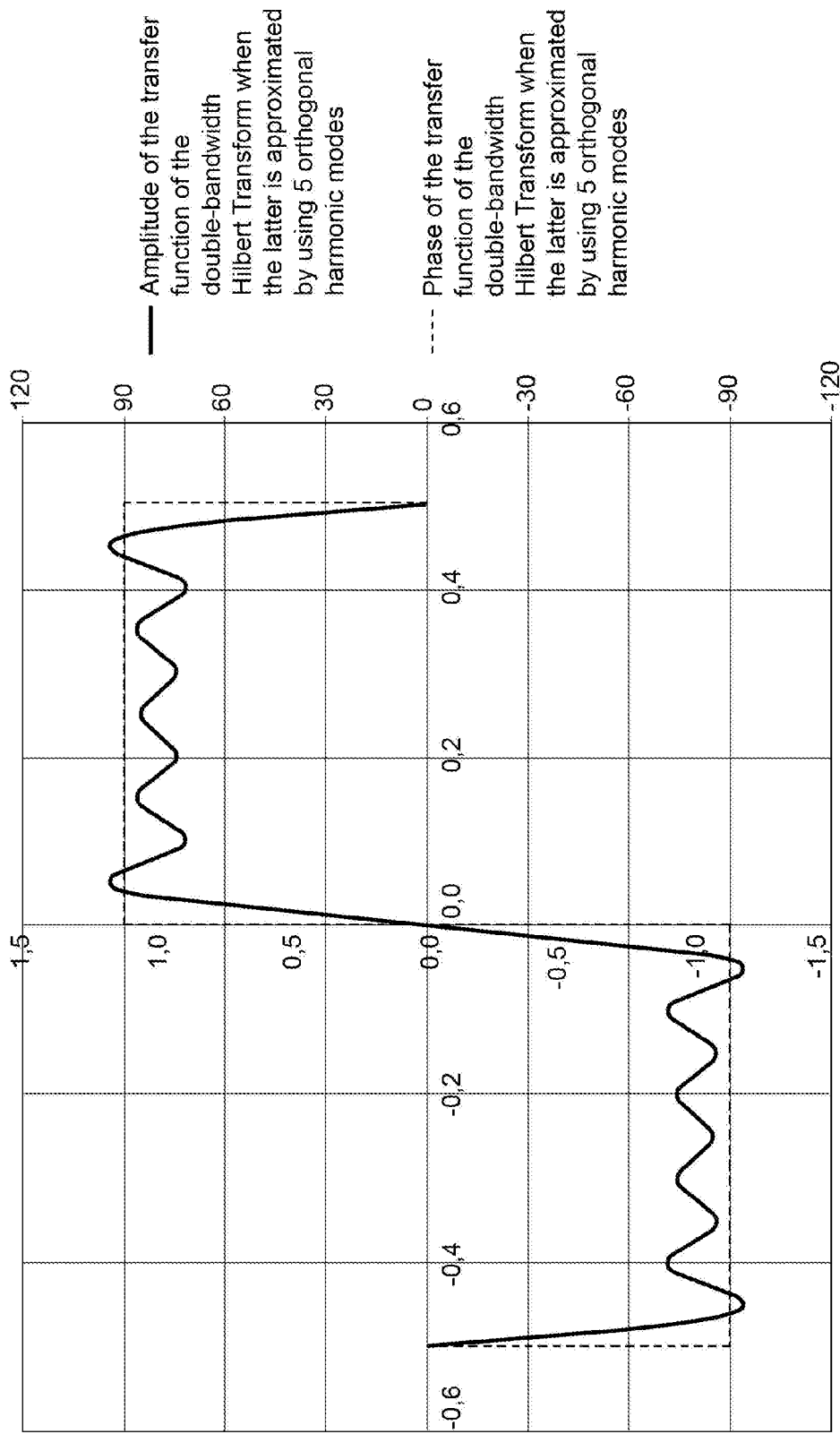
FIG. 10 schematically illustrates an approximation of the double-bandwidth Hilbert transform transfer function when a harmonic mode expansion (or development) of the latter is carried out by using only five orthogonal harmonic modes.

In this respect, reference is made to FIG. 10 which schematically shows the approximation of the double-bandwidth Hilbert transform transfer function DH(f) when the harmonic mode expansion (or development) of the latter is carried out by using only five orthogonal harmonic modes.

It is interesting to analyze the time response of each mode. In fact, the time response of each mode, since it is obtained by the convolution of a tone with a rect filter, presents two peaks corresponding to the time period of the tone. This implies that the time tails of the approximation of the impulse response DH(t) of the double-bandwidth Hilbert transform enlarge with the increase in the number of orthogonal harmonic modes used for approximating the double-bandwidth Hilbert transform. Therefore, the number of orthogonal harmonic modes used for approximating the double-bandwidth Hilbert transform represents the parameter which defines the time length of the approximated double-bandwidth Hilbert transform impulse response DH(t) and, consequently, the size of the time frame to be considered for defining the "Time point Interferometry".

Figure 11:
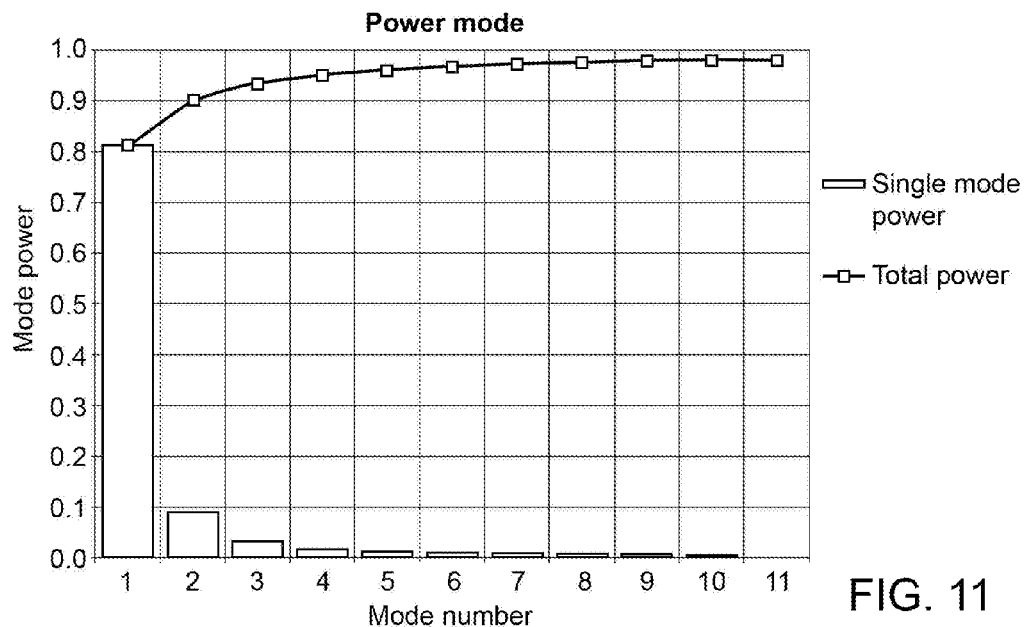
FIG. 11 schematically illustrates powers associated with orthogonal harmonic modes used to develop the double-bandwidth Hilbert transform function.

The double-bandwidth Hilbert transform allows, theoretically, to maintain all the information content of the original signal. Therefore, also the orthogonal harmonic mode development up to infinity of the double-bandwidth Hilbert transform allows, theoretically, to maintain all the information content of the original signal. Each mode contributes to the information content proportionally to the respective power of the mode (assuming that the overall power of the signal is equal to one). In this respect, reference is made to FIG. 11 which schematically shows the respective power (i.e., information content) associated with each mode up to the eleventh mode. From FIG. 11 it can be noted that with the first two or three modes it is possible to maintain about 90% of the information content of the original signal with a potential frequency reuse of 1.9. The use of additional higher-order modes results in an increase in implementation complexity rather than an effective improvement in the performances.

The evident advantage in the introduction of digital signals is that the information content is represented by an alphabet of possible symbols, therefore each mode can carry symbols of the signal at a suitable symbol rate independently of the other modes.

It is clear that the signals are to be oversampled (at least of a factor 2), otherwise the DH(t) signal is zero at the normal sampling rate. This does not imply a larger bandwidth, being the sampling period T of each signal the same, but shifted between them of T/2.

Then let us consider that the information limited bandwidth is associated with its own sampling period, which is considered as the key element for defining a representation of the double-bandwidth Hilbert Transform modes.

The conventional signal, i.e., the signal transmitted with a conventional filter (namely, a sinc filter or a raised cosine filter), can carry independent symbols with a symbol period given by $T_S=1/2B$, where 2B is the overall bandwidth of said conventional signal. This symbol period represents the reference unit for all the modes such that each mode carry independent symbols with an overall rate which is a sub-multiple of the symbol rate $1/T_S$ of the conventional signal.

In order to detect the two signals (i.e., the conventional signal and the signal obtained through the double-bandwidth Hilbert transform approximation) it is necessary to detect the symbol rate, therefore the effective sampling rate of the two overlapped signals shall be slightly larger than the symbol rate itself. This aspect recalls the vestigial component of the Single-SideBand (SSB) modulation and, thence, can be considered as a digital vestigial component.

Figure 12:
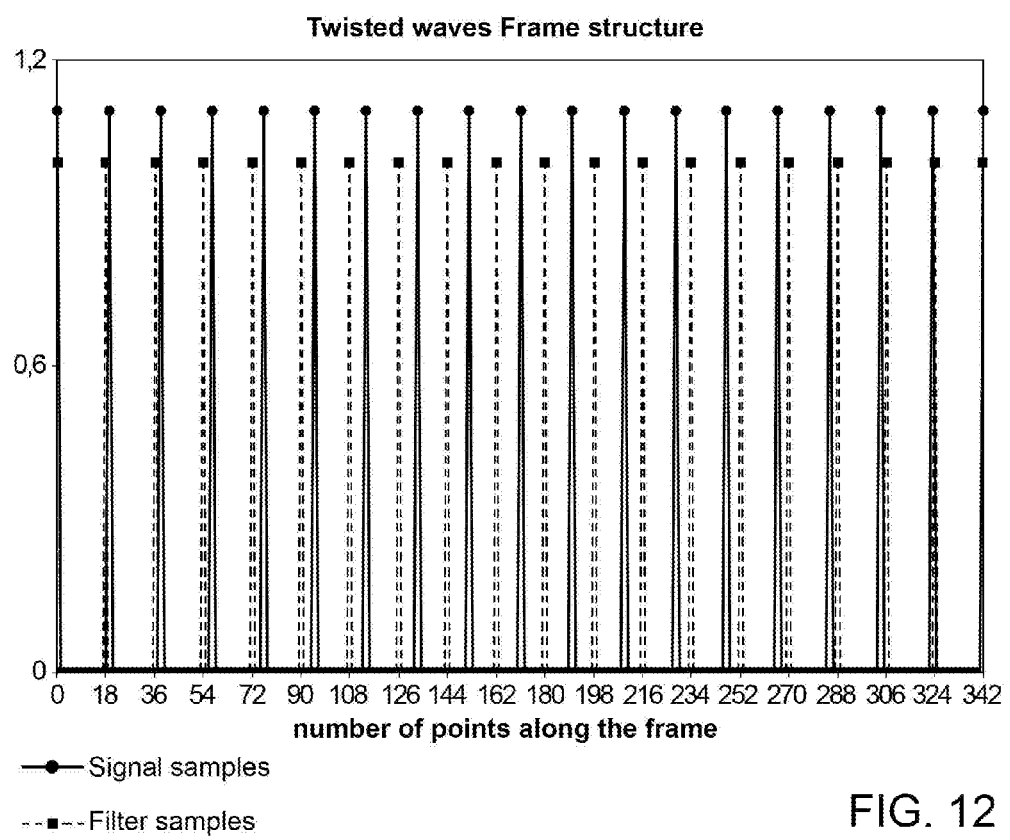
FIG. 12 schematically illustrates an example of filter and symbol sampling scheme according to a preferred embodiment of the present invention.

For instance, let us assume a frame of 9 symbols oversampled with a factor 2 and associated with the conventional filtered signal; in this case, the filter sampling rate can be one more so as to keep symbol rate measurement capability with 19 samples in one and the same time frame. This situation is shown in FIG. 12, which schematically illustrates an example of filter and symbol sampling scheme.

The resulting effect is that the impulse response of the filter representing the sampling rate 19/18 is detected at the symbol rate, thereby allowing also the symbol rate reference and the half symbol position to be detected. In this respect, FIG. 13 schematically shows the effect of the digital vestigial component on the impulse response (i.e., the possibility of measuring half of the symbol time) with respect to the case in which the digital vestigial component is absent. The apparent ISI, which seems to be present, is, on the contrary, essential to detect the two independent signals (i.e., the conventional signal and the signal based on the double-bandwidth Hilbert transform approximation).

Let us now consider the impulse response of the generic mode "n": this response is characterized by the presence of two peaks which are antisymmetric with respect to a time reference. The time distance between these peaks is approximately given by $4nT_S$, where, as previously said, $1/T_S$ is the symbol rate. By associating to this response a symbol, the relative symbol rate of the mode n results to be:

$$\frac{1}{T_S}\left(\frac{1}{4n}\right).$$

Figure 14:
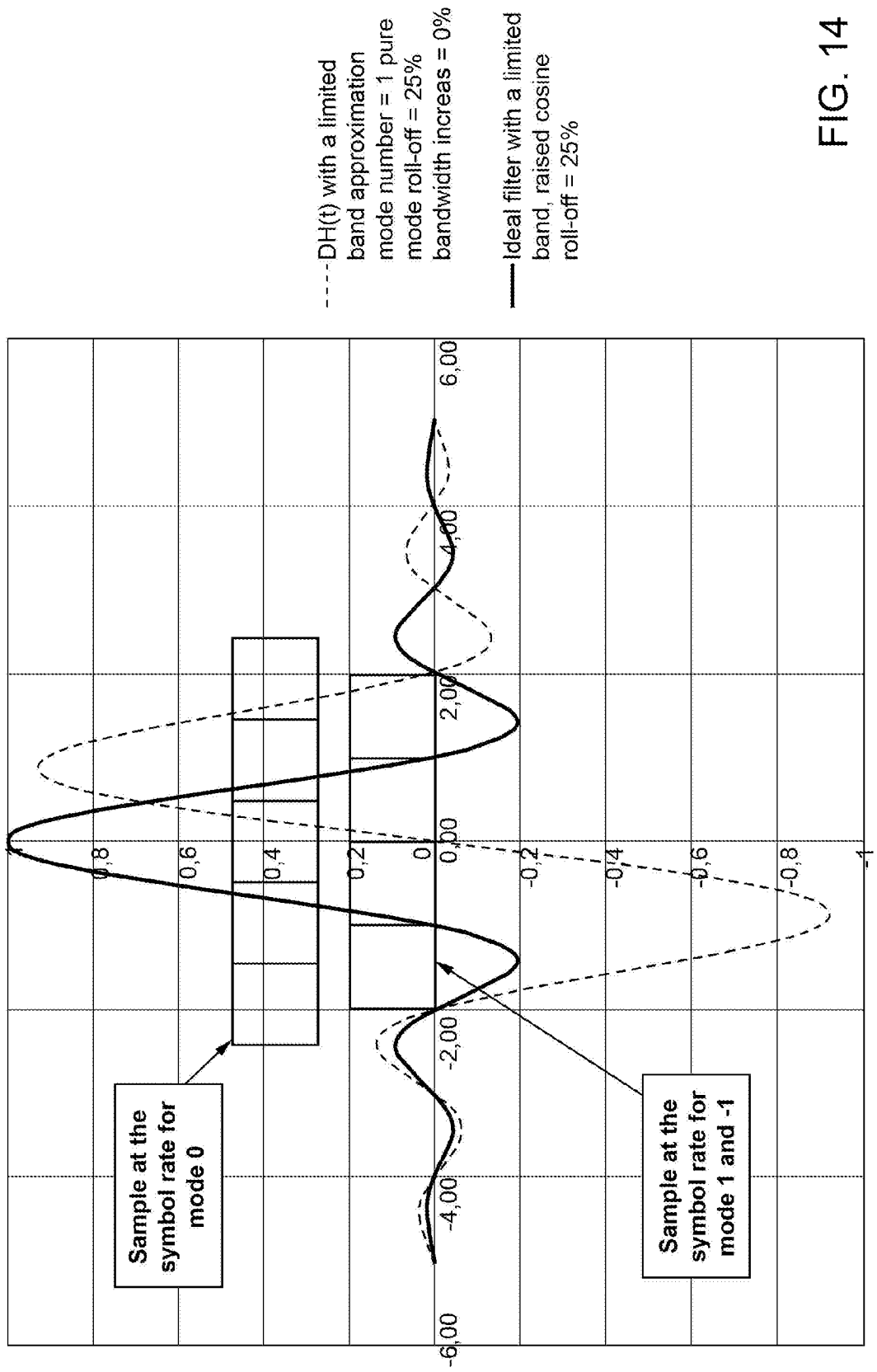
FIG. 14 schematically illustrates an example of sampling scheme for OAM modes $n=0, \pm 1$, which sampling scheme is based on a concept of Time Interferometry according to a preferred embodiment of the present invention.

Therefore, a very convenient way for filling this time distance by using the symbol rate $1/T_S$ of the main mode (i.e., the mode n=0 or "plane wave") is, following the concept of Time Interferometry, that of using for the generic mode n a code modulation changing the phase for each sample, without changing the symbol value. In this way a digital rotation can be introduced for each mode, thereby obtaining the advantage of using the full time distance for generating the signal associated with the mode, similarly to a sort of complex four chip Code Division Multiple Access (CDMA). In this respect, reference is made to FIG. 14 which schematically shows an example of sampling scheme for the main mode n=0 and the modes n=±1, which sampling scheme is based on the foregoing concepts.

In order to take into account the $T_S/2$ time shift, it is useful to generate a couple of pulses for the real component and another one couple of pulses for the imaginary component.

Figure 15:
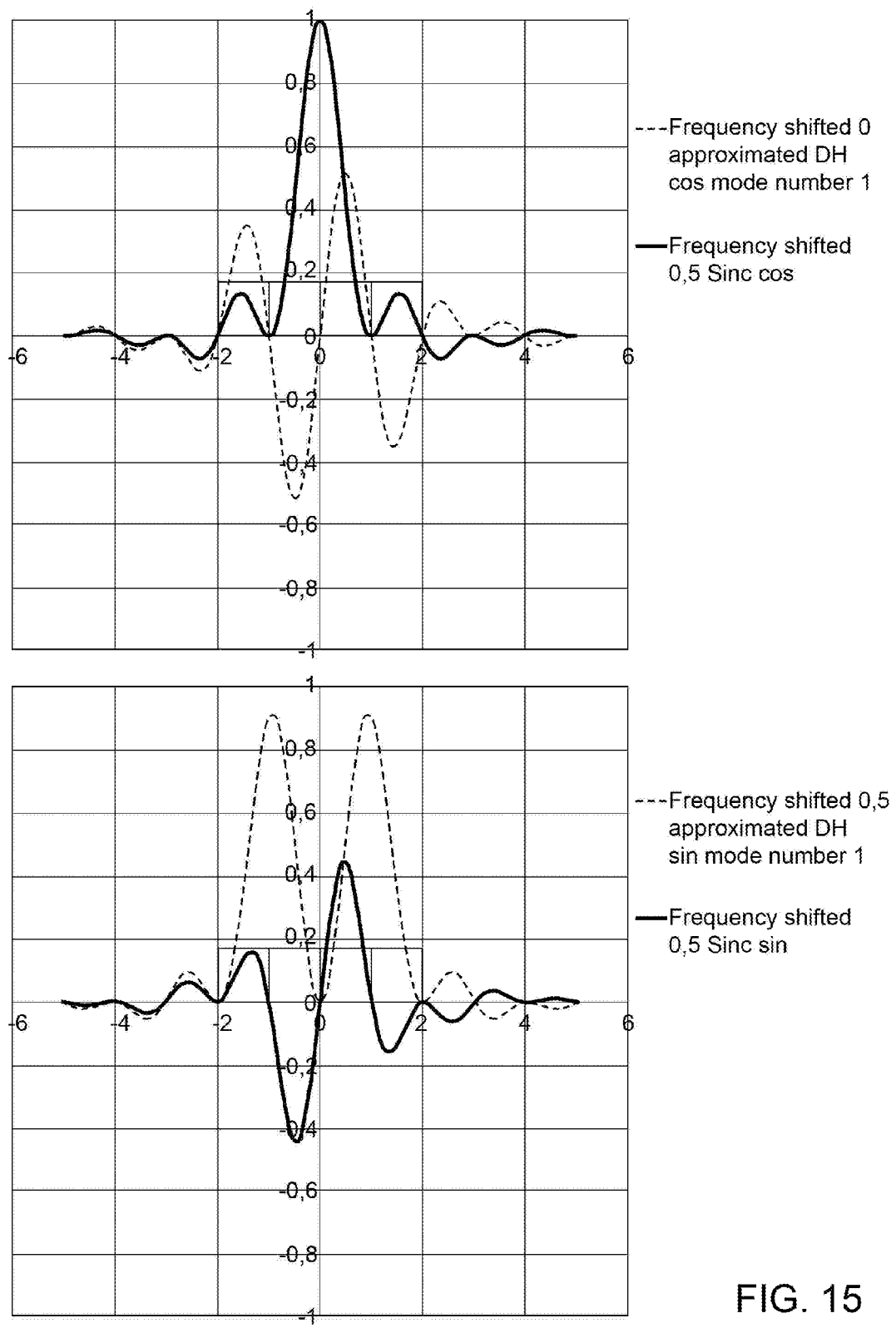
FIG. 15 schematically illustrates an example of cosine and sine components of the minimum shift analytical signal for OAM modes $n=\pm 1$ according to a preferred embodiment of the present invention.

This sequence is a good approximation of these two components of the minimum analytical signal. In this respect, reference is made to FIG. 15 which schematically shows an example of cosine and sine components of the minimum shift analytical signal for modes n=±1.

Figure 16:
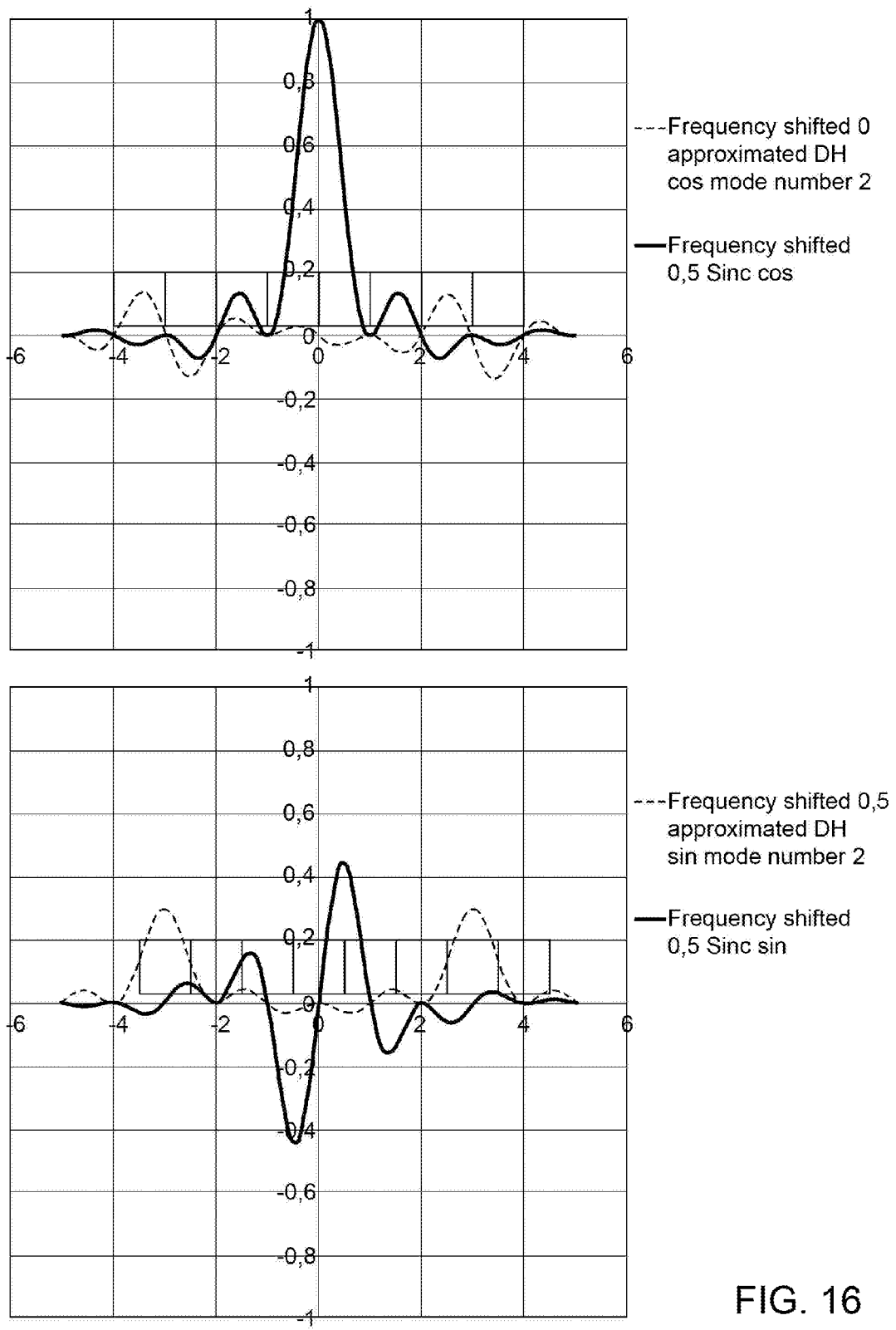
FIG. 16 schematically illustrates an example of cosine and sine components of the minimum shift analytical signal for OAM modes $n=\pm 2$ according to a preferred embodiment of the present invention.

Additionally, FIG. 16 schematically shows an example of cosine and sine components of the minimum shift analytical signal for modes n=±2.

Moreover, FIG. 17 schematically shows time and frequency responses for mode n=+5 with respect to the main mode n=0. In particular, it is interesting to look at the known relation between time and frequency shown in FIG. 17 for mode n=+5. In fact, the time response is the convolution of the raised cosine filter of the main mode and a time periodic tone in the frequency domain. This fact implies that each mode is orthogonal to any other one with a different n value (i.e., a different topological charge). In addition, for each mode there are two possible rotations (i.e., clockwise and counter-clockwise) which can be generated. This additional orthogonality is very interesting, because it allows modulation constellation complexity to be decreased for each clockwise/counter-clockwise mode, without decreasing the total information content.

As far as a generic mode n is concerned, it is possible to assume the same sequence just increasing the length of the time duration of the sampling window by n times.

Conveniently, a practical system can use only the modes n=0, ±1, ±2, thereby achieving a potential frequency reuse close to 1.9.

Anyway, there are some implementation-related aspects which are to be carefully considered. In particular, a first aspect is the need to keep the reference sampling frequency; therefore, it is necessary to have more samples than the minimum number achievable with a twice oversampling; for example, if modes up to n=±2 are used, the time frame includes 9 symbols of the main mode oversampled by a factor 2 thereby resulting 18 symbol samples; as previously explained, in order to keep memory of the even/odd relation, it is necessary to add the aforesaid digital vestigial component, i.e., to introduce in the same time frame 19 filter samples (which corresponds to a bandwidth increase of about 6%).

Moreover, a second aspect is the use, for each mode, of a time sequence capable of generating, with respect to the other modes, the possibility of operating between an even and an odd component, i.e., capable of defining a reference frequency with respect to which the mode spectrum has this even/odd symmetry; to this end, it is convenient to define, for each mode, a frequency shift capable of satisfying this need; in particular, this frequency shift is given by $$f_n = \frac{nB}{2},$$

with a time sequence of $$\frac{4n}{B}.$$

Figure 18:
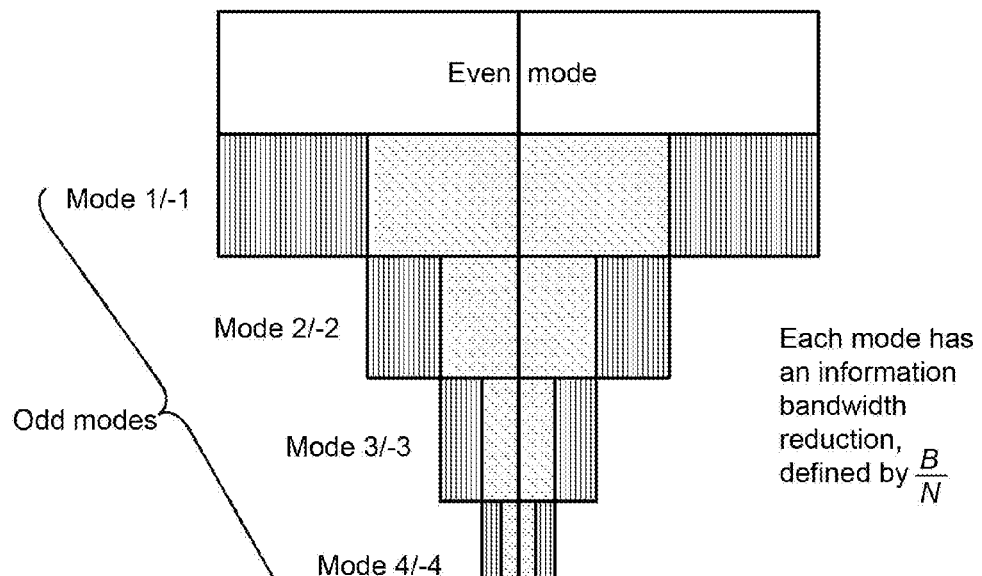
FIG. 18 schematically illustrates an example of OAM mode frequency reference layout according to a preferred embodiment of the present invention.

In this respect, reference is made to FIG. 18, which schematically shows an example of mode frequency reference layout wherein mode spectra have the aforesaid even/odd symmetry with respect to a reference frequency.

Figure 19:
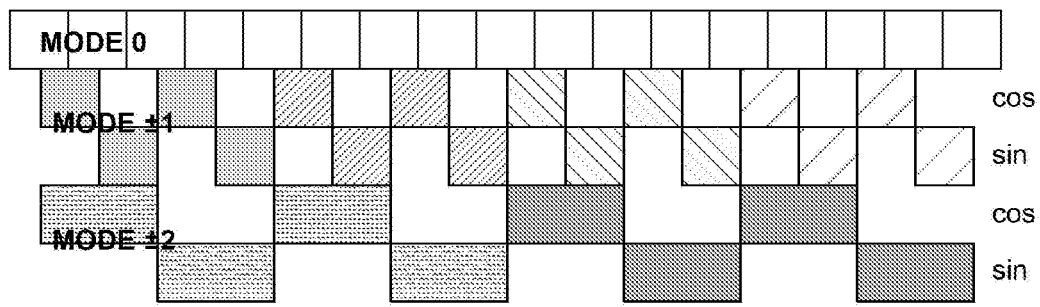
FIG. 19 schematically illustrates an example of time sequence layout for OAM modes $n=0, \pm 1, \pm 2$ according to a preferred embodiment of the present invention.

As far as the use of a time sequence with the minimum frequency shift is concerned, let us consider generating a real sequence for each mode with a cosine carrier; in this case, the time sequences present above mode n=0 a cosine component and a sine component, such as the ones shown in FIG. 19 (which schematically illustrates an example of time sequence layout for modes n=0, ±1, ±2).

Figure 20:
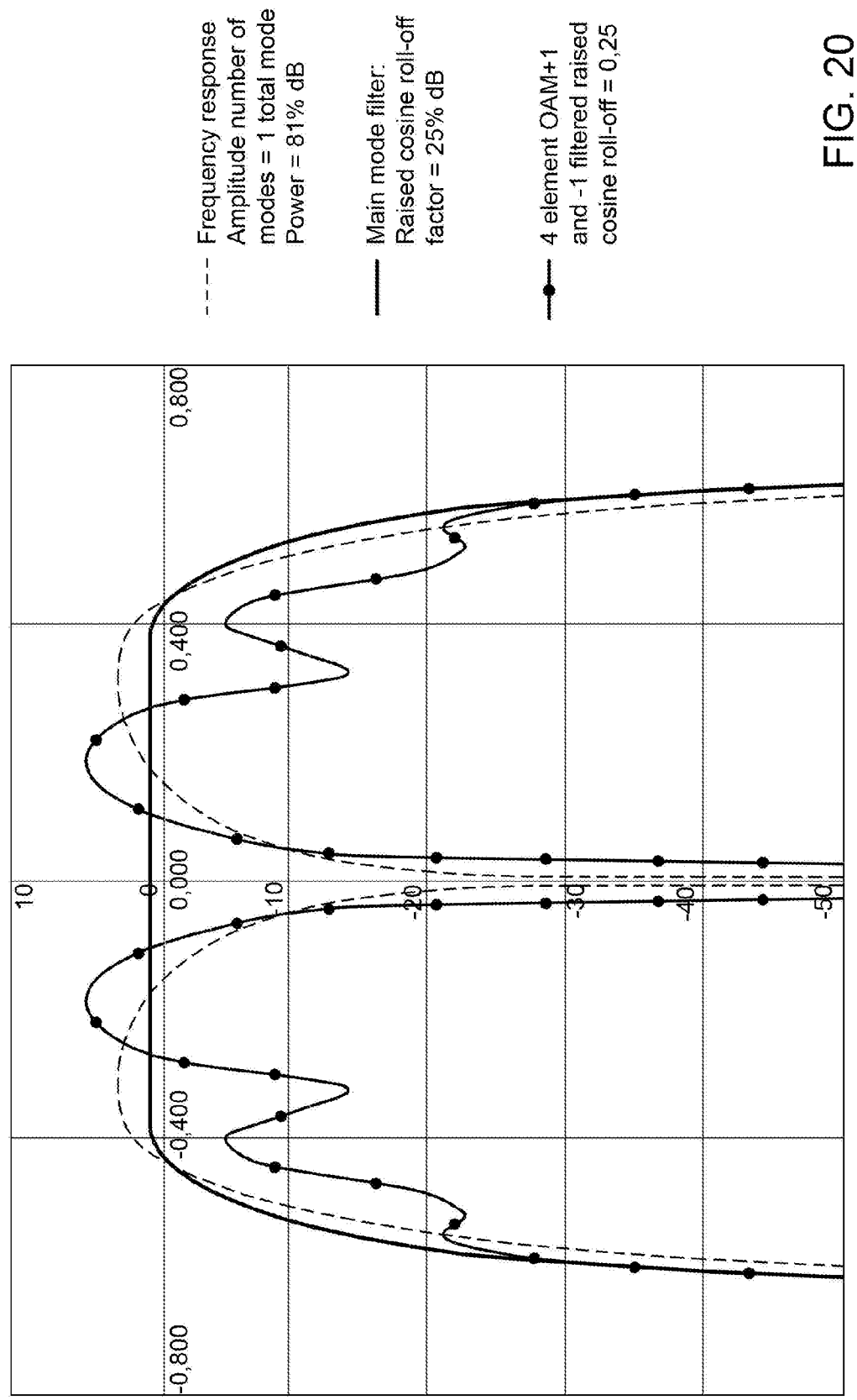
FIG. 20 schematically illustrates spectra of OAM modes $n=0$ and $n=\pm 1$ along with first-mode double-bandwidth Hilbert transform spectrum according to a preferred embodiment of the present invention.
Figure 21:
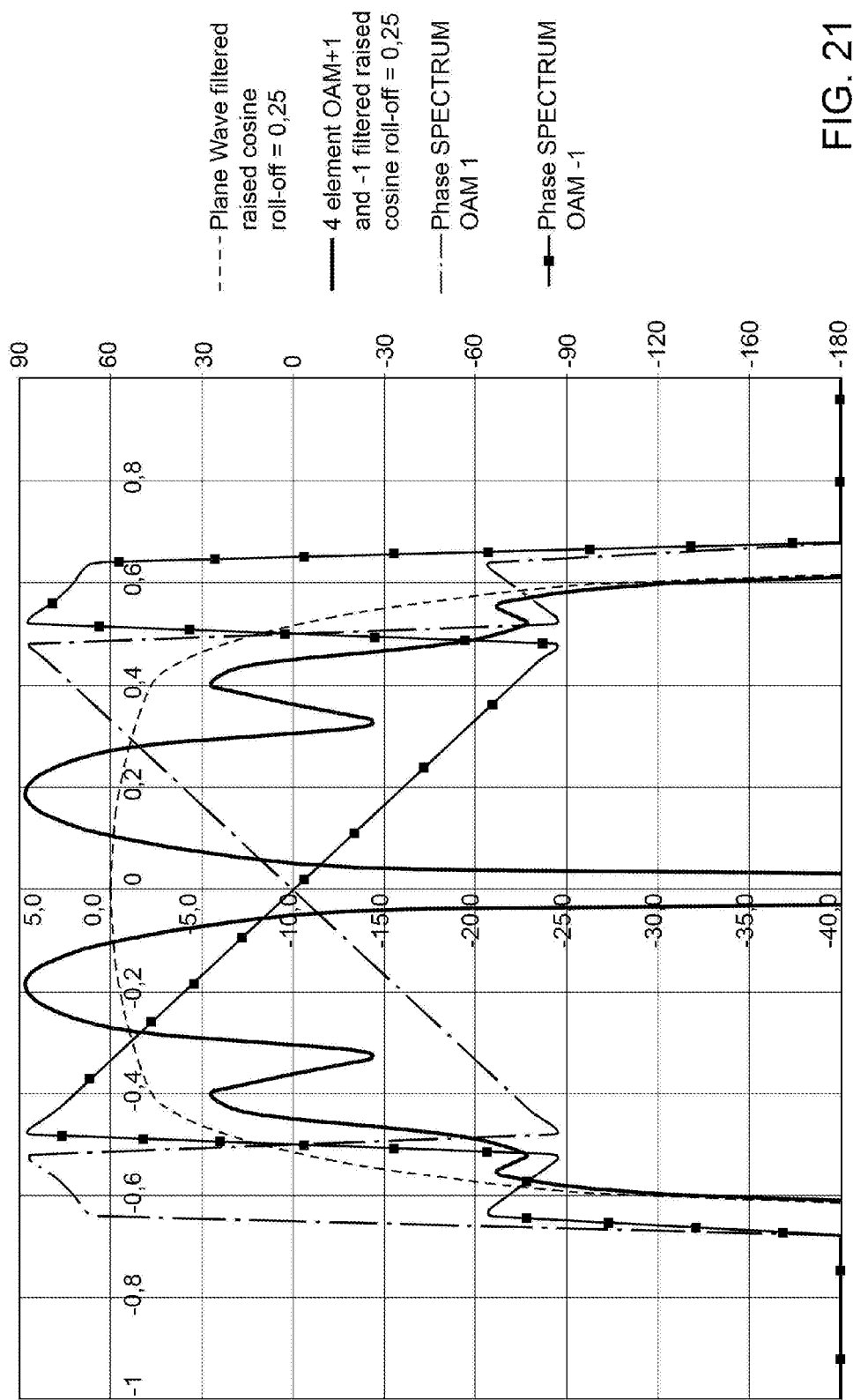
FIG. 21 schematically illustrates amplitude and phase spectra of modes $n=\pm 1$ according to a preferred embodiment of the present invention.

Moreover, FIG. 20 schematically shows spectra of modes n=0 and n=±1 along with first-mode double-bandwidth Hilbert transform spectrum, and FIG. 21 schematically shows amplitude and phase spectra of modes n=±1. From these figures it can be noted that a 4-step twist allows to obtain the same frequency behavior of the Hilbert transform mode approximation.

By using a time frame according to the foregoing, the symbols associated with (i.e., carried by) the different modes can be represented on a two-dimensional plane with the sampling time as abscissa and the frequency band (or the phase) as ordinate, i.e., on a time-band plane. In this respect, reference is made to FIG. 22, which schematically shows an example of multidimensional time frame representation on time-band plane. In particular, the signal generation resulting from FIG. 22 has the following features:

- as far as main mode n=0 is concerned, conventional symbol generation is performed with symbol rate $1/T_S$ and sampling at $kT_S$ (with k equal to 0, 1, 2, 3, . . . , 8); in particular, the main mode n=0 carries 9 symbol complex values (real and imaginary components for any kind of digital modulation);
- as far as modes n=±1 is concerned, a two-complex-symbol generation is performed for each mode with symbol rate $1/(4T_S)$ and sampling at $(2k'-1)T_S/2$ (with k' equal to 1, 2, 3, . . . , 8); in particular, a total of 4 symbol complex values is carried by modes n=±1; and
- as far as modes n=±2 is concerned, one-complex-symbol generation is performed for each mode with symbol rate $1/(16T_S)$ and sampling at $(2k'-1)T_S/2$; in particular, a total of 2 symbol complex values is carried by modes n=±2.

From reception perspective, 9+4+2=15 complex unknowns are to be determined for each received time frame, while the overall number of complex equations is 17, namely 9 complex equations sampling at $kT_S$ plus 8 complex equations sampling at $(2k'-1)T_S/2$.

As far as sample shape for a time frame/sequence is concerned, one and the same filter can be used for the symbols associated with all the modes. Each mode is approximated by a sequence of repetition of one and the same symbol value properly phase-shifted the number of times necessary to complete a full $2\pi$ period.

Due to the mix of the real and imaginary signals in one and the same frequency band, it is necessary to receive a full frame before determining the symbol values. This feature can be regarded as equivalent to interferometry techniques which take simultaneously into account a set of different directions in physical space.

Let us consider having the same energy per symbol for all the modes, then a generic pulse sequence can be rearranged considering that the maximum amplitude associated with the even samples (i.e., at $kT_S$) is associated with the full energy, while the maximum amplitude associated with the odd samples (i.e., at $(2k'-1)T_S/2$) is divided, for each mode n, by a respective factor that is $$2^{\frac{n+2}{2}}.$$

Figure 23:
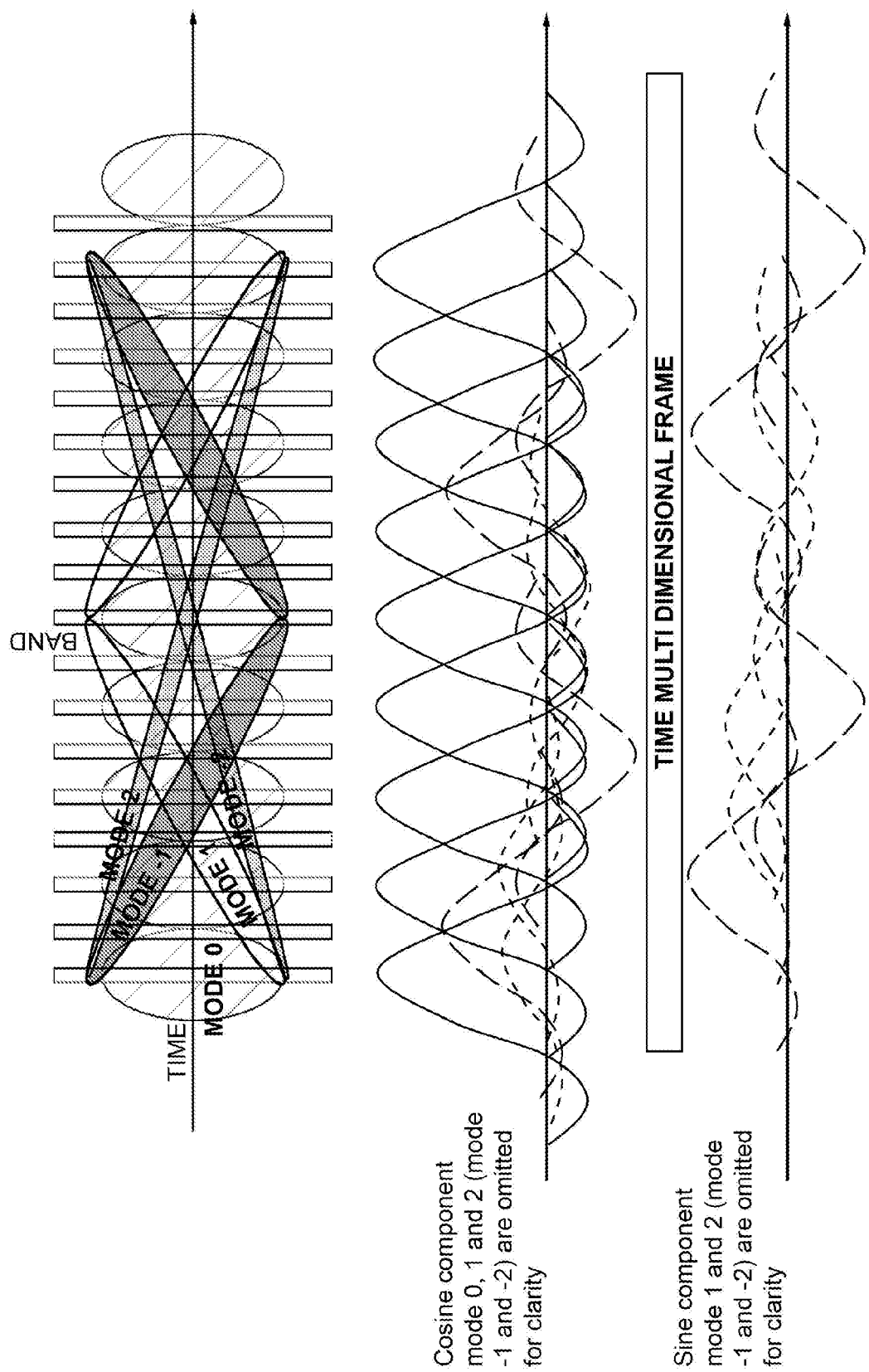
FIG. 23 schematically illustrates even and odd properties of a multidimensional time frame according to a preferred embodiment of the present invention.

In this respect, FIG. 23 schematically shows even and odd properties of a multidimensional time frame having the aforesaid features.

It is important to note that, according to the present invention, the overlapping between symbols within each frame is used to find out the symbol values and that, thence, the traditional Inter-Symbol Interference (ISI) is conceptually replaced with an InterFrame Interference (IFI), i.e., interference between frames. In this respect, reference is made to FIG. 24, which schematically illustrates IFI concept.

Figure 24:
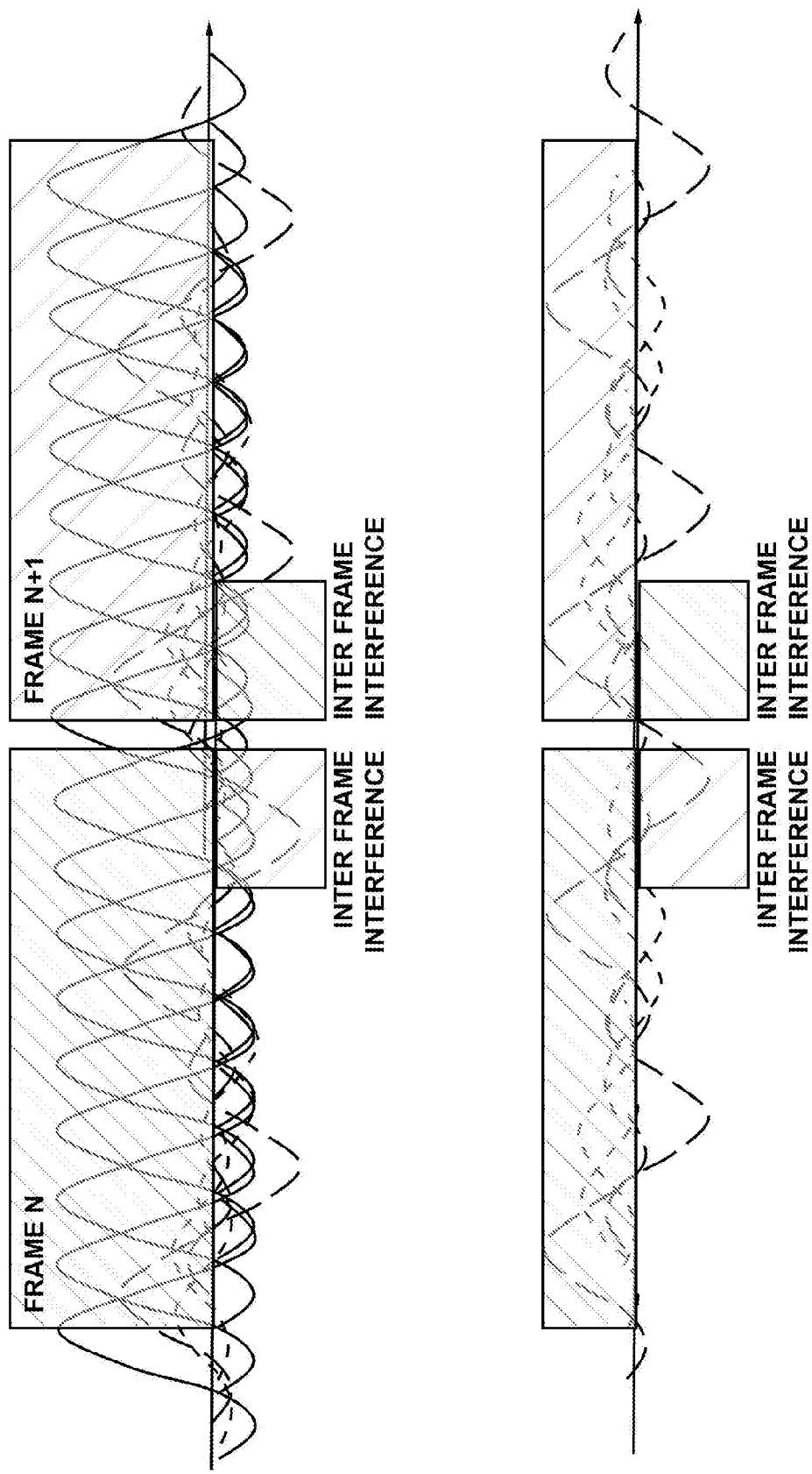
FIG. 24 schematically illustrates an InterFrame Interference (IFI), i.e., an interference between frames, according to a preferred embodiment of the present invention.

IFI has an impact smaller than ISI, considering that, as shown in FIG. 24, the odd modes are affected only at the boundary and that the even mode has a larger energy per symbol with respect to the odd modes. In addition, in order to reduce IFI impact, it can be convenient to leave boundary samples of frames free of odd modes. Moreover, boundaries are preferably free of odd samples also to respect the available degrees of freedom in the frame.

Figure 25:
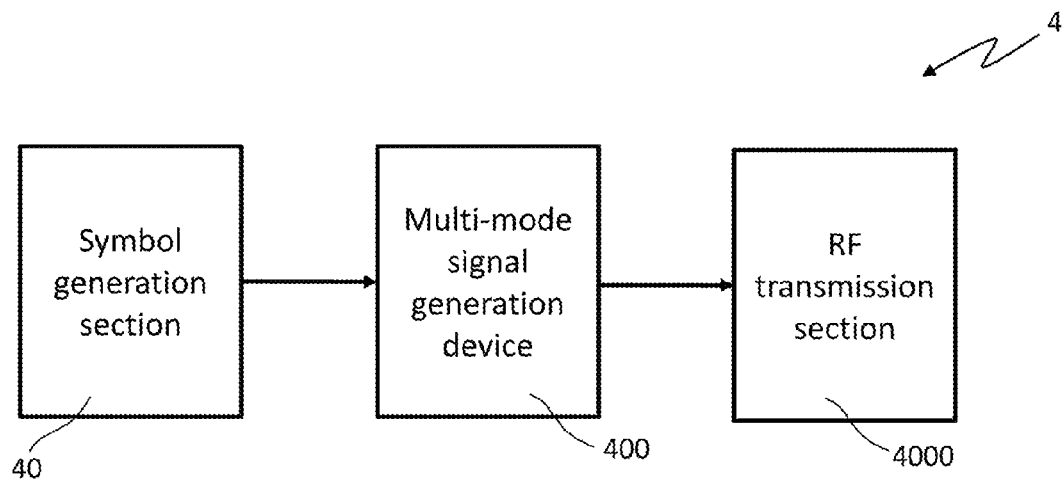
FIG. 25 schematically illustrates a transmitting system according to a preferred embodiment of the present invention.

In order for the operation of the present invention to be better understood, reference is made to FIG. 25, which shows a functional block diagram of a transmitting system (denoted as whole by 4) according to a preferred embodiment of the present invention.

In particular, as shown in FIG. 25, the transmitting system 4 comprises:
- a symbol generation section 40 configured to generate and output a digital symbol stream with symbol rate $1/T_S$, or, equivalently, with symbol interval $T_S$;
- a multi-mode signal generation device 400, which is coupled with the symbol generation section 40 to receive the digital symbol stream outputted by the latter, and which is configured to generate and output, for each sequence of S (with S integer higher than three) digital symbols received from the symbol generation section 40, a respective multi-mode output digital signal carrying said S received digital symbols by means of a plurality of orthogonal harmonic modes comprising
  - a main mode carrying P (with P integer lower than S) of said S received digital symbols, wherein said main mode is a real harmonic mode, and
  - one or more secondary modes carrying the other S-P received digital symbols, wherein each secondary mode is a complex harmonic mode which is time-shifted by $T_S/2$ with respect to the main mode;
  wherein each multi-mode output digital signal generated and outputted by the multi-mode signal generation device 400 has a time length shorter than S times $T_S$; and
- an RF transmission section 4000 which is coupled with the multi-mode signal generation device 400 to receive the multi-mode output digital signals outputted by the latter, and which is configured to transmit at predefined radio frequencies the received multi-mode output digital signals by means of a single antenna (which is not shown in FIG. 25 for the sake of illustration simplicity, and which can be also a reflector antenna with a single feed) or an antenna array (which is not shown in FIG. 25 for the sake of illustration simplicity, and which can be also a multi-feed reflector antenna).

Preferably, the time length of each multi-mode output digital signal generated and outputted by the multi-mode signal generation device 400 is equal to P times $T_S$, the main mode of each multi-mode output digital signal generated and outputted by the multi-mode signal generation device 400 is a real harmonic mode comprising samples at $kT_S$ (with k equal to 0, 1, 2, 3, . . . , P−1), and the secondary modes of each multi-mode output digital signal generated and outputted by the multi-mode signal generation device 400 are, each, a complex harmonic mode comprising samples at $(2k'-1)T_S/2$ (with k' equal, in this case, to 1, 2, 3, . . . , P−1).

Again preferably, each multi-mode output digital signal generated and outputted by the multi-mode signal generation device 400 is sampled with a predefined sampling rate (or clock rate) CR higher than the symbol rate $1/T_S$, thereby resulting in a digital vestigial component embedded in each multi-mode output digital signal.

Conveniently, the aforesaid predefined radio frequencies can range from a few KHz to hundreds of GHz depending on the specific application for which the transmitting system 4 is designed.

Moreover, the symbol generation section 40 can conveniently be a symbol generation section of a transmitting system for satellite communications (such as a transmitting system of a feeder link Earth station, of a satellite, or of a ground apparatus for satellite communications), or of a device for wireless communications, such as LTE-based or WiMAX-based communications.

Accordingly, the RF transmission section 4000 can conveniently be an RF transmission section of a transmitting system for satellite communications (such as a transmitting system of a feeder link Earth station, of a satellite, or of a ground apparatus for satellite communications), or of a device for wireless communications, such as LTE-based or WiMAX-based communications.

Conveniently, the symbol generation section 40 is designed to generate the digital symbol stream by performing several operations, such as the following operations (not necessarily all performed and not necessarily performed in the following sequence): information encoding (conveniently by performing one or more signal modulations), one or more frequency shifting operations, one or more analog-to-digital conversion operations, and one or more filtering operations.

Again conveniently, the RF transmission section 4000 can be designed to transmit at the predefined radio frequencies the multi-mode digital signals by performing several operations, such as the following operations (not necessarily all performed and not necessarily performed in the following sequence): frequency up-shifting (in particular from Intermediate Frequency (IF) up to RF), one or more filtering operations, one or more digital-to-analog conversion operations, and power amplification.

Figure 26:
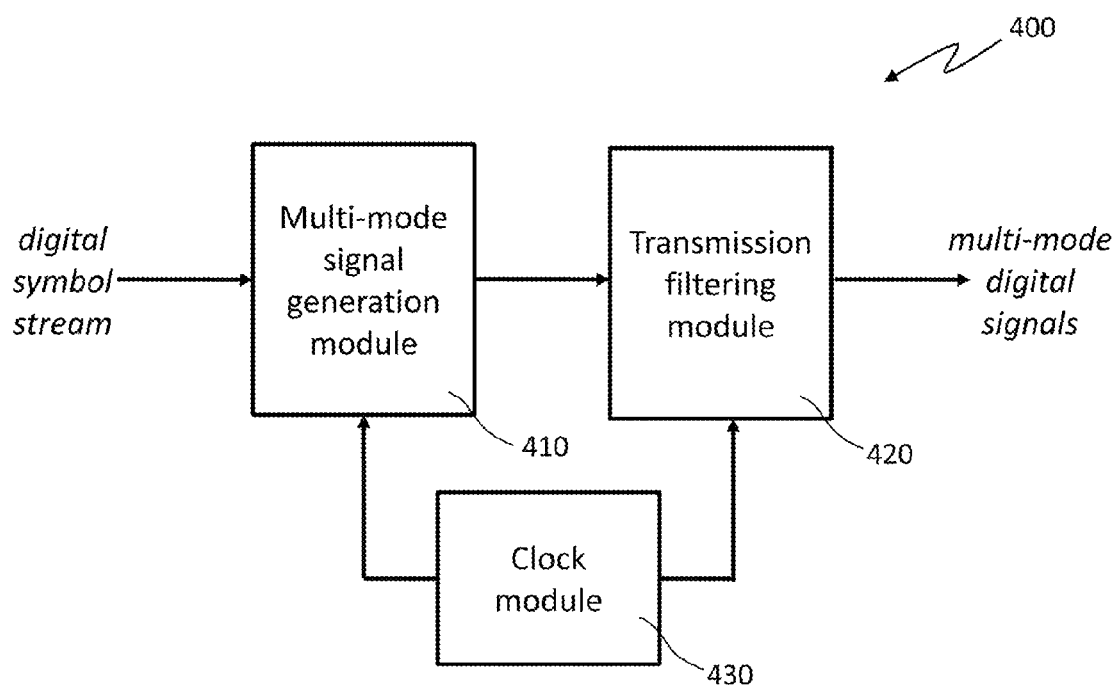
FIG. 26 schematically illustrates a multi-mode signal generation device exploited by the transmitting system shown in FIG. 25.

In order for the operation of the present invention to be described in deeper detail, reference is further made to FIG. 26, which shows a more detailed functional block diagram of the multi-mode signal generation device 400.

In particular, as shown in FIG. 26, the multi-mode signal generation device 400 comprises:
- a multi-mode signal generation module 410, which is coupled with the symbol generation section 40 (not shown in FIG. 26 for the sake of illustration simplicity) to receive the digital symbol stream outputted by the latter, and which is configured, for each sequence of S digital symbols received from the symbol generation section 40, to
  - allocate P of the S received digital symbols to the main mode by providing, for each of said P digital symbols, a corresponding complex value which represents said digital symbol and is related to the main mode,
  - allocate each of the other S-P received digital symbols to a corresponding secondary mode by providing, for each of said S-P digital symbols, a corresponding complex value which represents said digital symbol and is related to the secondary mode to which said digital symbol is allocated, compute M multi-mode complex values (with M≥S) related to M successive time instants separated by $T_S/2$, wherein the M multi-mode complex values are computed by using a predefined transmission matrix which relates the S complex values representing the S received digital symbols to the M successive time instants through M×S complex coefficients each of which is related to a respective harmonic mode and to a respective time instant, and generate, on the basis of the M computed multi-mode complex values, a multi-mode digital signal sampled with the aforesaid predefined sampling rate (or clock rate) CR (thereby resulting in a digital vestigial component embedded in the multi-mode digital signal);

a transmission filtering module 420, which is coupled with the multi-mode signal generation module 410 to receive the multi-mode digital signals generated by the latter, configured to digitally filter the received multi-mode digital signals by means of a predefined transmission filter, such as a predefined raised cosine filter (but also other different transmission filters can be used, such as a sinc or Gaussian filter), such that to adjust multi-mode digital signal bandwidth to the bandwidth of transmission radio channel (i.e., the specific radio channel used in transmission), thereby obtaining filtered multi-mode digital signals which are the aforesaid multi-mode output digital signals outputted by the multi-mode signal generation device 400, and coupled also with the RF transmission section 4000 (not shown in FIG. 26 for the sake of illustration simplicity) to provide the latter with the filtered multi-mode digital signals, i.e., the aforesaid multi-mode output digital signals; and a clock module 430 coupled with the multi-mode signal generation module 410 and the transmission filtering module 420 to provide them with a clock signal indicating said predefined sampling rate CR.

Conveniently, the sampling rate CR can be computed according to the following formula:

$$CR = \frac{2P+u}{2P} \cdot \frac{1}{T_S},$$

where u is an integer (i.e., u≥1) and its value depends:
on the time length of the time frames, namely on the time length of the multi-mode digital signals, i.e., on the aforesaid number M of successive time instants separated by $T_S/2$;
on the shape of the digital filter implemented by the transmission filtering module 420 (raised cosine filter, sinc, Gaussian, etc.); and
also on features of the receiving system (as it will be explained in the following).

Conveniently, the value of the parameter u can be comprised between 5% and 10% of the time length of the time frames, namely the time length of the multi-mode digital signals, i.e., the aforesaid number M of successive time instants separated by $T_S/2$.

Figure 22:
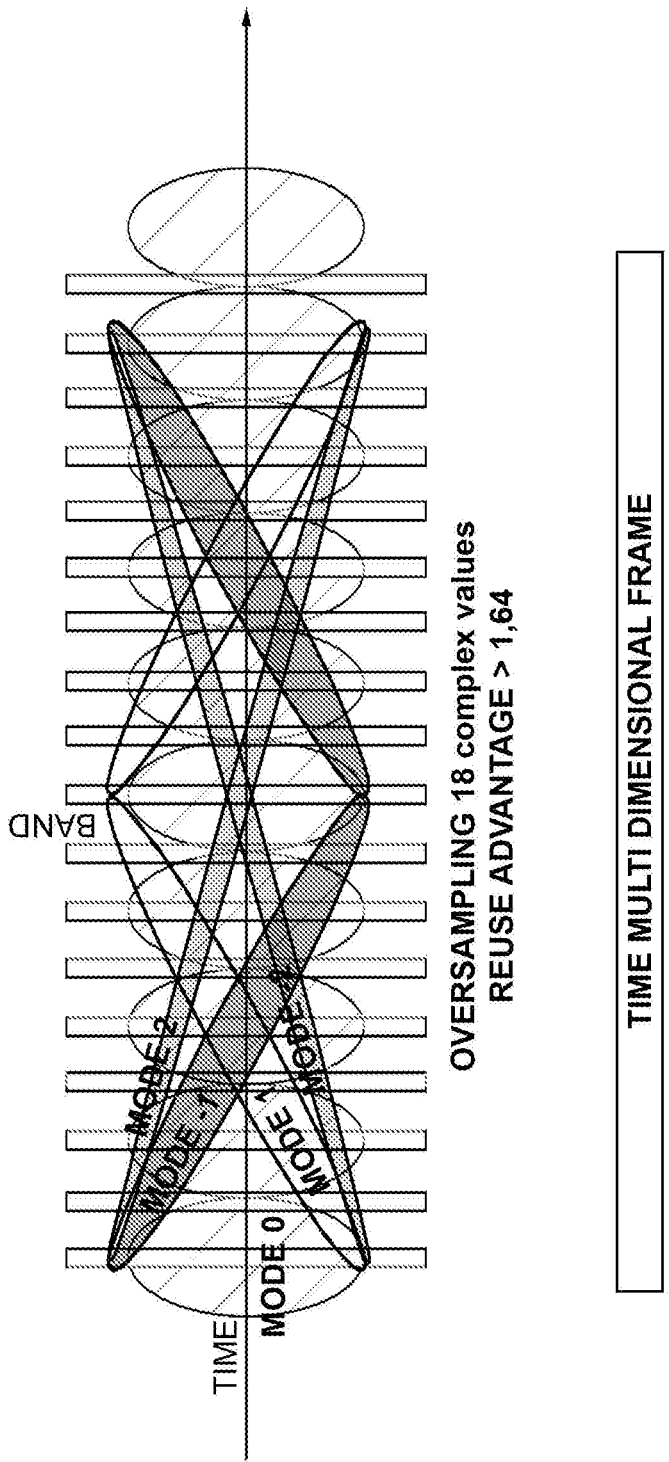
FIG. 22 schematically illustrates an example of multidimensional time frame representation on time-band plane according to a preferred embodiment of the present invention.

With reference to the example of multidimensional time frame shown in FIG. 22 and previously described, it results that, in that case, S=15,
P=9,
M=17,
the sampling rate CR is equal to $$\frac{19}{18} \cdot \frac{1}{T_S},$$

each time frame, i.e., each multi-mode digital signal, has a time length equal to $9T_S$, the main mode (or mode n=0) of each multi-mode digital signal carries 9 symbols and, thence, the resulting symbol rate of the main mode is equal to the symbol rate of the input digital symbol stream, i.e., $1/T_S$;

the secondary OAM modes n=±1 of each multi-mode digital signal carries 4 symbols and, thence, the resulting overall symbol rate of the modes n=±1 is equal to $4/(9T_S)$; and the secondary OAM modes n=±2 of each time frame carries 2 symbols and, thence, the resulting overall symbol rate of the modes n=±2 is equal to $2/(9T_S)$.

Figure 27:
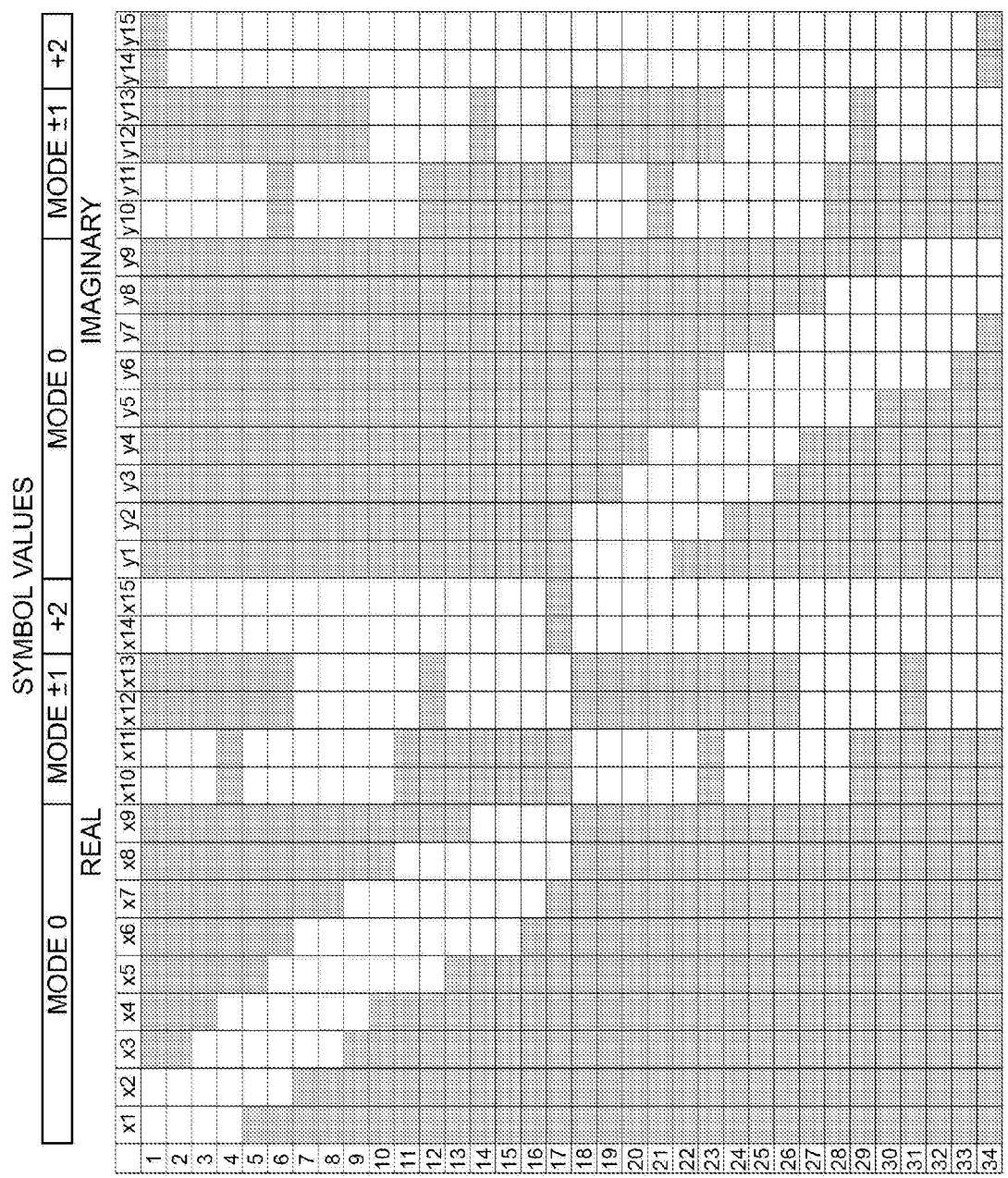
FIG. 27 schematically illustrates an example of a transmission matrix exploitable by the multi-mode signal generation device shown in FIG. 26.

In this respect, FIG. 27 shows an example of a transmission matrix exploitable by the multi-mode signal generation module 410 in the foregoing case. In particular, the transmission matrix shown in FIG. 27 is a 2M×2S rectangular matrix, which comprises:

2M=34 rows, wherein the first M=17 rows are related to the real part of the aforesaid M=17 multi-mode complex values at the M=17 successive time instants separated by $T_S/2$, and the last M=17 rows are related to the imaginary part of the aforesaid M=17 multi-mode complex values at the M=17 successive time instants separated by $T_S/2$; and 2S=30 columns, wherein the first S=15 columns are related to the real part of the S=15 mode-related complex values which represent the S=15 digital symbols to be transmitted and which are related to the orthogonal harmonic modes to which said S=15 digital symbols are respectively allocated; and wherein the last S=15 columns are related to the imaginary part of the S=15 mode-related complex values which represent the S=15 digital symbols to be transmitted and which are related to the orthogonal harmonic modes to which said S=15 digital symbols are respectively allocated.

In detail, the transmission matrix shown in FIG. 27 includes 34×30 cells which are blank or grey, wherein the blank cells represent the matrix cells actually occupied by coefficients, while the grey cells represent the matrix cells not occupied by any coefficient, or rather the blank cells represent the matrix cells occupied by coefficients different from zero and the grey cells represent the matrix cells occupied by coefficients equal to zero. This representation of the transmission matrix stems from the fact that the important thing shown in FIG. 27 is the matrix structure.

More in general, let us consider using up to mode ±N. Thence, the number of symbols carried by the main mode n=0 every time frame (i.e., every multi-mode digital signal) is $P=2^{N+1}+1$, the number of symbols carried by the secondary OAM modes n=±1 every time frame (i.e., every multi-mode digital signal) is $2^N$, the number of symbols carried by the secondary OAM modes n=±2 every time frame (i.e., every multi-mode digital signal) is $2^{N-1}$, the number of symbols carried by the generic secondary CAM modes n=±1 every time frame (i.e., every multi-mode digital signal) is $2^{N-i+1}$, and the number of symbols carried by the secondary OAM modes n=±N every time frame (i.e., every multi-mode digital signal) is $2^{N-N+1}$=2.

Therefore, the overall number S of symbols carried by all the modes every time frame (i.e., every multi-mode digital signal) is given by:

$$S = (2^{N+1}+1) + \sum_{i=1}^{N} 2^{N-i+1},$$

wherein the first addend represents the number P of symbols carried by the main mode n=0, while the second addend (i.e., the summation) represents the number S-P of symbols carried by all the secondary modes (i.e., the CAM modes with n≠0).

The foregoing mathematical formula can be rewritten as:

$$S = 1 + \sum_{i=0}^{N} 2^{N-i+1} = 1 + 2^{N+1} + \sum_{i=0}^{N} \left(\frac{1}{2}\right)^i.$$

Thence, since it is known that $$\sum_{i=0}^{N} x^i = \frac{x^{N+1}-1}{x-1}, \text{ if } x \neq 1,$$

then it results that:

$$S = 2^{N+2}-1. \quad (1)$$

Moreover, the number M of multi-mode complex values computed by means of the transmission matrix (i.e., the number M of successive time instants separated by $T_s/2$ to which said multi-mode complex values are related) is given by:

$M=2P-1$.

Since, as previously explained, it results that $P=2^{N+1}+1$, then the mathematical formula for computing M can be written as:

$$M=2^{N+2}+1. \quad (2)$$

Figure 28:
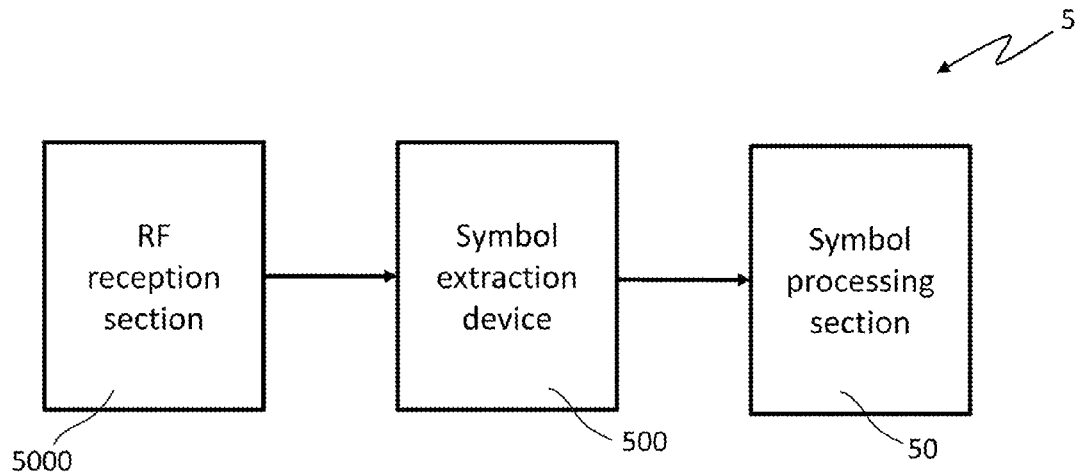
FIG. 28 schematically illustrates a receiving system according to a preferred embodiment of the present invention.

Let us now consider the operation of the present invention at reception side, and, in this respect, reference is made to FIG. 28, which shows a functional block diagram of a receiving system (denoted as whole by 5) according to a preferred embodiment of the present invention.

In particular, as shown in FIG. 28, the receiving system 5 comprises:
- an RF reception section 5000, which is designed to receive the RF signals transmitted at the predefined radio frequencies by the transmitting system 4 (in particular, by the RF transmission section 4000); said RF reception section 5000 being designed to receive the RF signals by means of a single antenna (which is not shown in FIG. 28 for the sake of illustration simplicity and which can be also a reflector antenna with a single feed) or an antenna array (which is not shown in FIG. 28 for the sake of illustration simplicity and which can be also a multi-feed reflector antenna), and to process the received RF signals so as to obtain, on the basis of said received RF signals, an incoming digital signal;
- a symbol extraction device 500, which is coupled with said RF reception section 5000 to receive the incoming digital signal therefrom, and which is designed to
  process said incoming digital signal so as to extract the digital symbols carried by said incoming digital signal, and
  output a stream of extracted digital symbols; and
- a symbol processing section 50, which is coupled with said symbol extraction device 500 to receive the stream of extracted digital symbols outputted by the latter, and which is designed to process said stream of extracted digital symbols.

The aforesaid predefined radio frequencies coincide with the radio frequencies used in transmission by the transmitting system 4, in particular by the RF transmission section 4000. Conveniently, as already said, the predefined radio frequencies can range from a few KHz to hundreds of GHz depending on the specific application which the overall system comprising the transmitting system 4 and the receiving system 5 is designed for.

Moreover, the RF reception section 5000 can conveniently be an RF reception section of a receiving system for satellite communications (such as a receiving system of a feeder link Earth station, of a satellite, or of a ground apparatus for satellite communications), or of a device for wireless communications, such as LTE-based or WiMAX-based communications.

Accordingly, the symbol processing section 50 can conveniently be a symbol processing section of a receiving system for satellite communications (such as a receiving system of a feeder link Earth station, of a satellite, or of a ground apparatus for satellite communications), or of a device for wireless communications, such as LTE-based or WiMAX-based communications.

Conveniently, the RF reception section 5000 is designed to obtain the incoming digital signal by performing several operations upon the received RF signals, such as the following operations (not necessarily all performed and not necessarily performed in the following sequence): low-noise amplification, one or more frequency down-shifting operations (in particular from RF down to IF), one or more filtering operations, and one or more analog-to-digital conversion operations.

Again conveniently, the symbol processing section 50 is designed to process the stream of extracted digital symbols by performing several operations, such as the following operations (not necessarily all performed and not necessarily performed in the following sequence): one or more filtering operations, one or more digital-to-analog conversion operations, one or more frequency shifting operations, and information decoding (conveniently by performing one or more signal demodulations).

Figure 29:
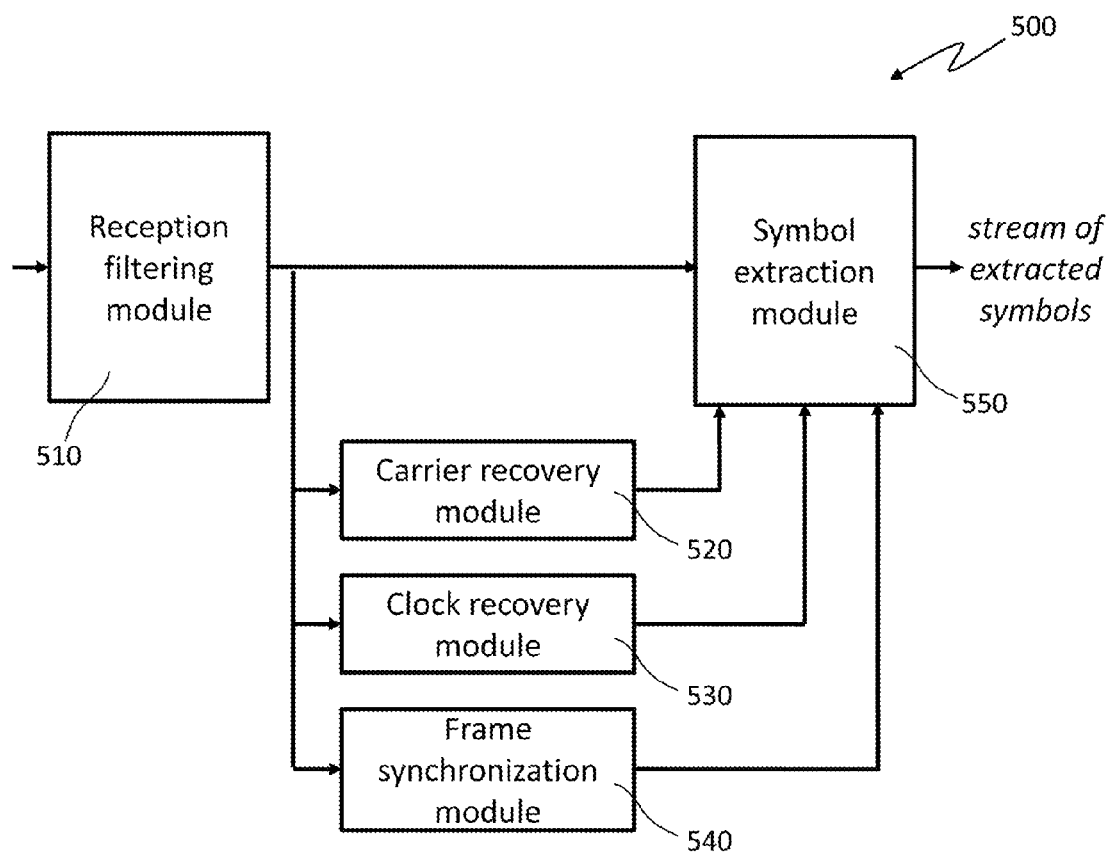
FIG. 29 schematically illustrates a symbol extraction device exploited by the receiving system shown in FIG. 28.

In order for the operation of the receiving system 5 to be described in deeper detail, reference is further made to FIG. 29, which shows a more detailed functional block diagram of the symbol extraction device 500.

In particular, as shown in FIG. 29, the symbol extraction device 500 comprises:
- a reception filtering module 510, which is coupled with the RF reception section 5000 (not shown in FIG. 29 for the sake of illustration simplicity) to receive therefrom the incoming digital signal, and which is configured to digitally filter the incoming digital signal by means of a predefined reception filter, such as a predefined raised cosine filter (but also other different reception filters can be used, such as a sinc or Gaussian filter), such that to equalize the incoming digital signal with respect to reception radio channel (i.e., the specific radio channel used in reception) and, conveniently, also with respect to transmission filter (i.e., the specific filter used in transmission by the transmission filtering module 420), thereby obtaining a corresponding filtered incoming digital signal;

a carrier recovery module 520 which is coupled with the reception filtering module 510 to receive therefrom the filtered incoming digital signal, and which is configured to recover, on the basis of the filtered incoming digital signal, the carrier of the multi-mode digital signals transmitted by the transmission system 4 (as it will be explained in detail in the following), and output a signal indicating the carrier;

a clock recovery module 530 which is coupled with the reception filtering module 510 to receive therefrom the filtered incoming digital signal, and which is configured to recover, on the basis of the filtered incoming digital signal, the sampling rate (or clock rate) CR of the multi-mode digital signals transmitted by the transmission system 4 (as it will be explained in detail in the following), and output a clock signal indicating the sampling rate (or clock rate) CR; and a frame synchronization module 540 which is coupled with the reception filtering module 510 to receive therefrom the filtered incoming digital signal, and which is configured to detect, on the basis of the filtered incoming digital signal, the structure of the time frames (in particular, frame beginning and the frame length $PT_S$), i.e., of the multi-mode digital signals, transmitted by the transmission system 4 (as it will be explained in detail in the following), and output a frame synchronization signal indicating the time frame structure.

Moreover, the symbol extraction device 500 further comprises a symbol extraction module 550, which is coupled with:

the reception filtering module 510 to receive therefrom the filtered incoming digital signal;

the carrier recovery module 520 to receive therefrom the signal indicating the carrier;

the clock recovery module 530 to receive therefrom the clock signal; and the frame synchronization module 540 to receive therefrom the frame synchronization signal.

The symbol extraction module 550 is configured to process, on the basis of the signals received from the carrier recovery module 520, the clock recovery module 530 and the frame synchronization module 540, successive, non-overlapped time frames of the filtered incoming digital signal by performing, for each time frame processed, the following operations:

extract M multi-mode complex values at M successive time instants separated by $T_S/2$ from the filtered incoming digital signal portion within the time frame processed, wherein said filtered incoming digital signal portion is sampled with the sampling rate CR;

compute S complex values, each of which represents a respective digital symbol transmitted by the transmission system 4 by means of a corresponding harmonic mode; wherein the S complex values are computed by using a predefined reception matrix, which derives from the transmission matrix used by the transmission system 4 (in particular by the multi-mode signal generation module 410), and which relates the M multi-mode complex values extracted at the M successive time instants to the S complex values to be computed through M×S complex coefficients each of which is related to a respective harmonic mode and to a respective time instant;

determine the S digital symbols represented by the S complex values computed; and output the S symbols determined.

Moreover, the symbol extraction module 550 is coupled also with the symbol processing section 50 to provide the latter with the stream of determined symbols, conveniently with symbol rate $1/T_S$.

More in detail, the symbol extraction module 550 can be regarded as a generalized matched filter based on a reception matrix which is derived from the transmission matrix through a generalized inversion technique, such as the pseudo-inverse technique.

In mathematical terms, given the transmission matrix [[A]] with the M×S complex coefficients, and given also the vector [B] of the S symbol complex values, it results that:

$$[[A]][B]=[C]$$

where [C] denote the vector of the M multi-mode complex values at the M successive time instants separated by $T_S/2$ within a time frame.

Let us now consider the reception side, where it can be useful to use a generalized inversion technique, such as the pseudo-inverse technique, to invert the foregoing matrix equation:

$$[[A]]^T[[A]][B]=[[A]]^T[C],$$

and then $$[B]=([[A]]^T[[A]])^{-1}[[A]]^T[C], \quad (3)$$

where $[[A]]^T$ denotes the transpose of the matrix [[A]], and $([[A]]^T[[A]])^{-1}$ denotes the operation of inversion of the square matrix resulting from the multiplication $[[A]]^T[[A]]$.

In particular, at reception side [B] becomes the vector of the S unknown symbol complex values to be determined by the generalized matched filter, i.e., by the symbol extraction module 550, and [C] becomes the vector of the M multi-mode complex values extracted at the M successive time instants separated by $T_S/2$ within the processed time frame.

Condition for the existence of a set of solutions for the unknown vector [B] is that the square matrix resulting from the multiplication $[[A]]^T[[A]]$ has a determinant different than zero, i.e., in mathematical terms, $$\det([[A]]^T[A])\neq 0. \quad (4)$$

Therefore, if the transmission matrix [[A]] is designed so as to satisfy the condition (4), then the S unknown symbol complex values can be determined by the generalized matched filter, i.e., by the symbol extraction module 550, by solving the equation system resulting from the matrix equation (3).

Thence, the non-Hermitian reception matrix [[GMF]] can be defined as:

$$[[GMF]]=([[A]]^T[[A]])^{-1}[[A]]^T.$$

As previously explained, the value of the parameter u, (which defines the sampling rate CR) depends on features of the receiving system 5. In particular, it depends on the robustness of the generalized matched filter.

It is very interesting to analyze the meaning of the condition (4). In fact, this condition corresponds to the necessity of the presence of the digital vestigial component obtained by using a sampling rate CR higher than the symbol rate $1/T_S$ (as described in detail in the foregoing).

Therefore, according to the present invention, the secondary complex harmonic modes used to carry the digital symbols can be generalized with respect to the use of only pure CAM (or twisted) modes. For example, instead of using, or in addition to the use of, a pure CAM (or twisted mode) n=+1 (which is associated with the phases 1, j, −1, −j, where j denotes, as previously explained, the imaginary unit), a generalized complex harmonic mode $n=(+1)^i$ associated with the phases 1, j, 1 could be used.

The generalization of the secondary complex harmonic modes used to carry the digital symbols implies the possibility of generalizing also:
- the allocation of the digital symbols to the (generalized) harmonic modes with respect to the allocation previously described and implying the use of only pure OAM modes; and
- the structure of the time frames with respect to the time frame structure previously described and implying the use of only pure twisted modes.

All these generalizations result in the possibility of using a generalized transmission matrix which has size no longer complying with the aforesaid mathematical formulae (1) and (2). Anyway, in order for a generalized transmission matrix to be actually usable, said generalized transmission matrix needs to satisfy the condition (4), otherwise the equation system resulting from the matrix equation (3) cannot be solved.

Figure 30:
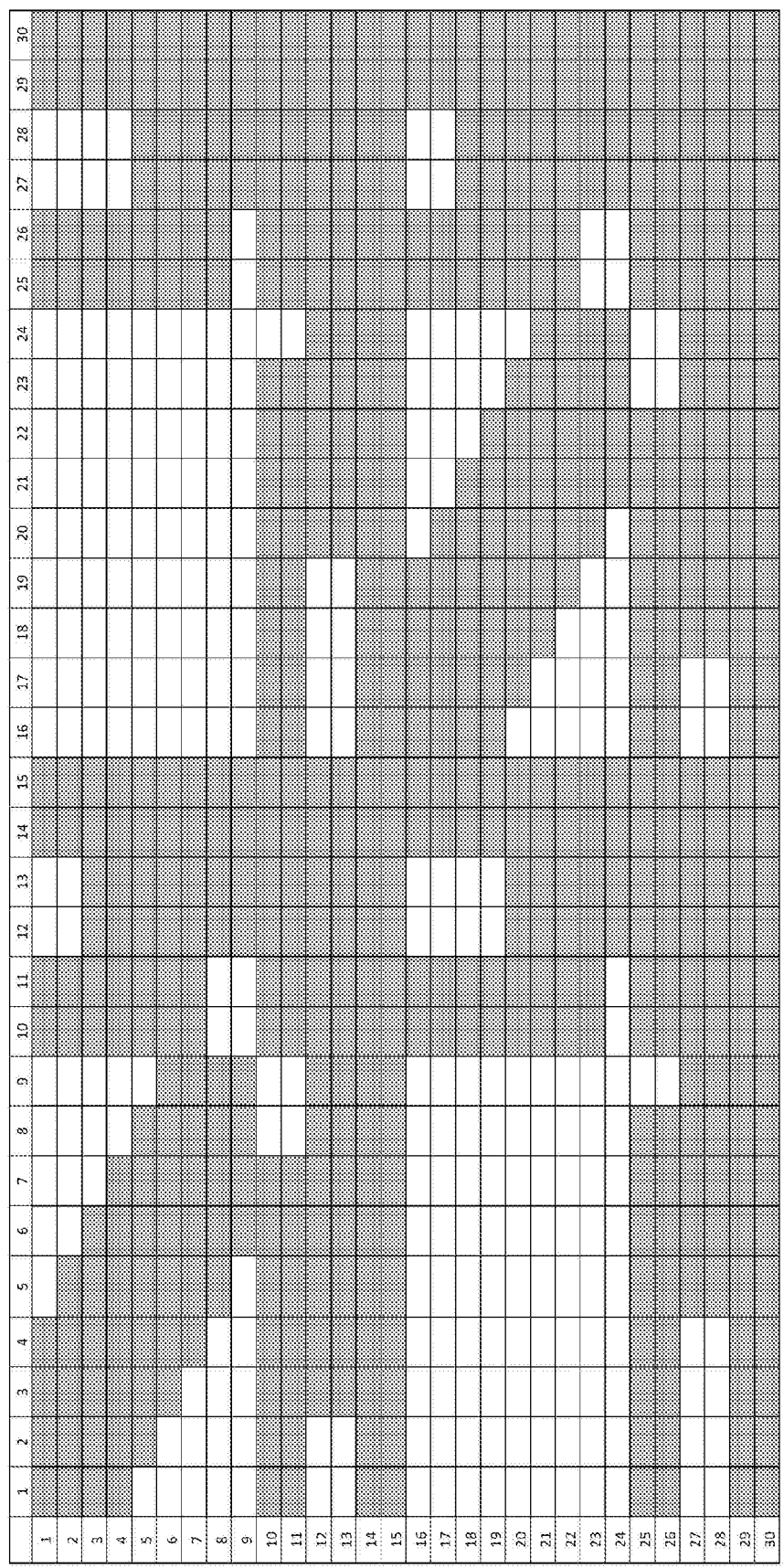
Figure 31:
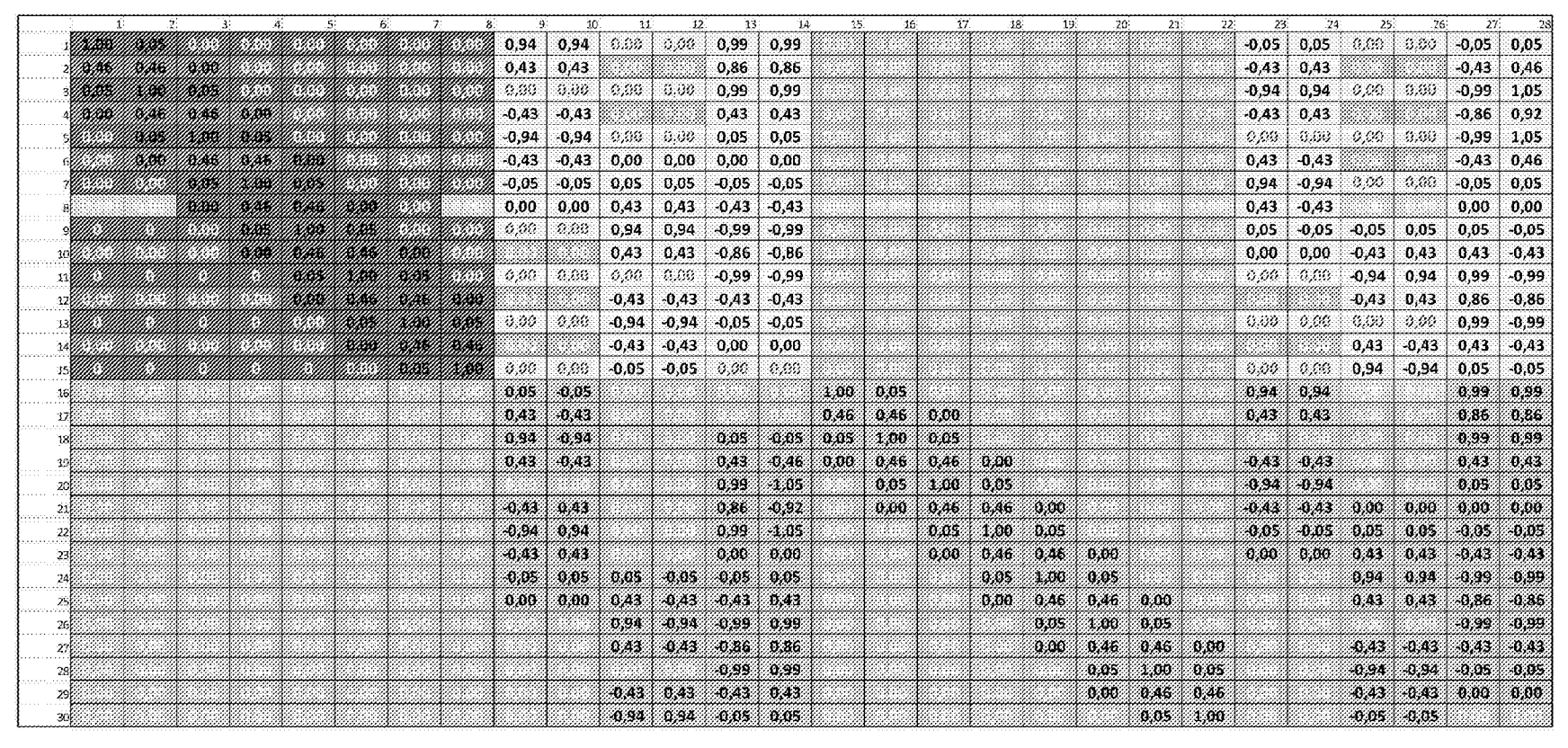
Figure 32:
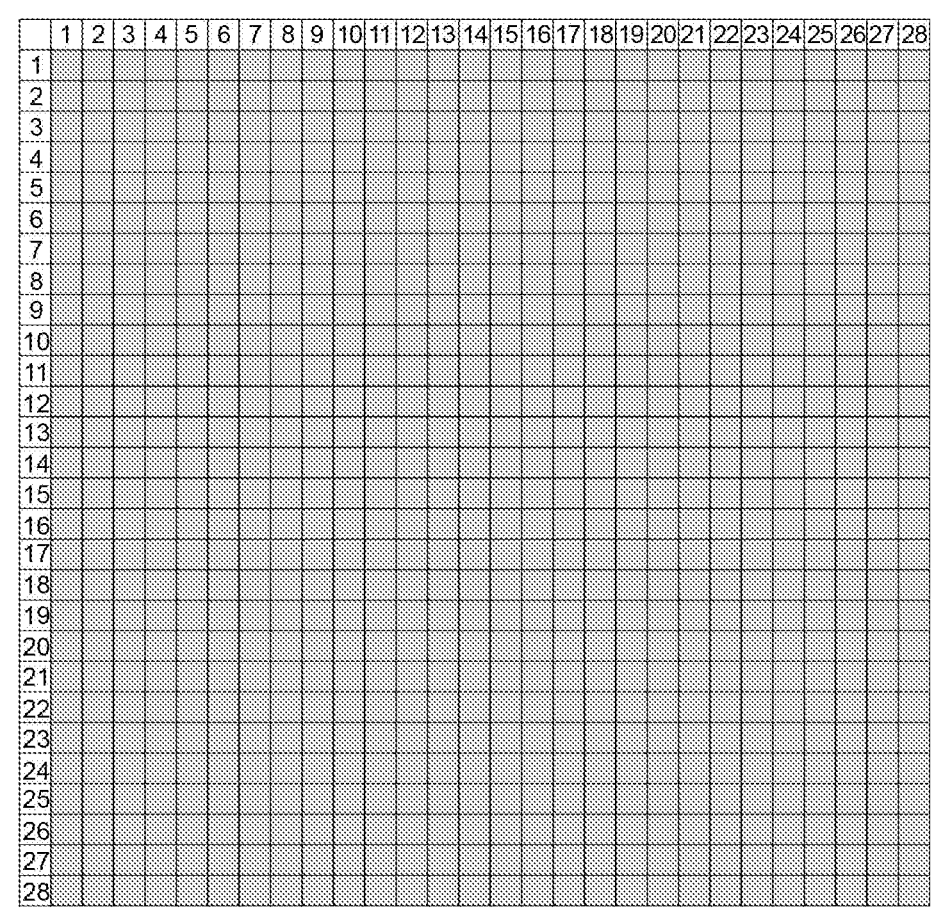

In this respect, FIGS. 30, 31 and 32 show examples of generalized transmission matrices exploitable according to the present invention.

In particular, the generalized transmission matrix shown in FIG. 30 includes 30×30 cells which are blank or grey, wherein the grey cells represent the matrix cells actually occupied by coefficients, while the blank cells represent the matrix cells not occupied by any coefficient, or rather the grey cells represent the matrix cells occupied by coefficients different from zero and the blank cells represent the matrix cells occupied by coefficients equal to zero. This representation of said generalized transmission matrix stems from the fact that the important thing shown in FIG. 30 is the matrix structure.

Moreover, the generalized transmission matrix shown in FIG. 31 includes 30×28 cells (i.e., 30 rows and 28 columns) each occupied by a respective coefficient (that can be different from, or equal to, zero), while the generalized transmission matrix shown in FIG. 32 includes 28×28 cells (i.e., 28 rows and 28 columns) each occupied by a respective coefficient (that can be different from, or equal to, zero). This representation of said generalized transmission matrices stems from the fact that the important thing shown in FIGS. 31 and 32 is represented by the structures of said matrices.

Figure 33:
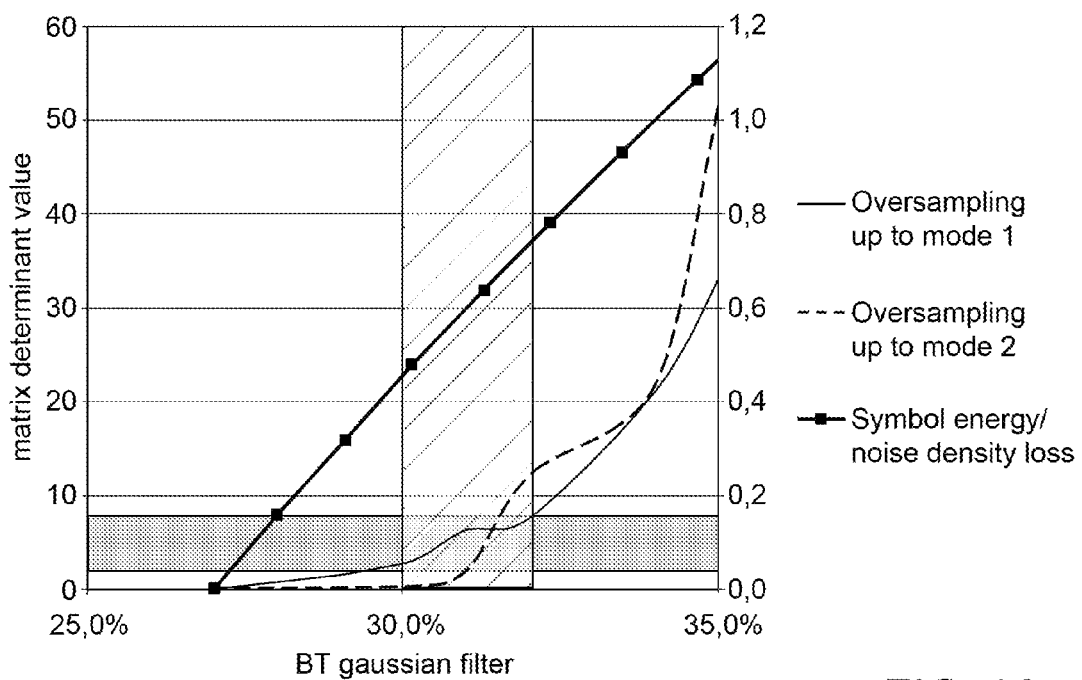
FIG. 33 shows a diagram of the determinant of a matrix resulting from the multiplication of the transpose of the transmission matrix and the transmission matrix itself with respect to 3 dB Bandwidth-Time (BT) product of a Gaussian filter.

Let us now analyze equivalence between the linear independence of the equation system (3) and the presence of a digital vestigial component. In particular, for the sake of simplicity, let us consider using a Gaussian filter and a double-bandwidth Hilbert approximation up to the mode n=±2, with a total of M=17 complex equations and S=15 complex unknowns. In this case, the determinant value of the matrix resulting from the multiplication $[[A]]^T [[A]]$ is larger than zero, only if the Bandwidth-Time (BT) product of the 3 dB filter bandwidth is larger than 27%. This corresponds to a full bandwidth slightly larger than the minimum required to satisfy the sampling theorem. In this respect, reference is made to FIG. 33, which shows the determinant value with respect to 3 dB BT product of the Gaussian filter.

Figure 34:
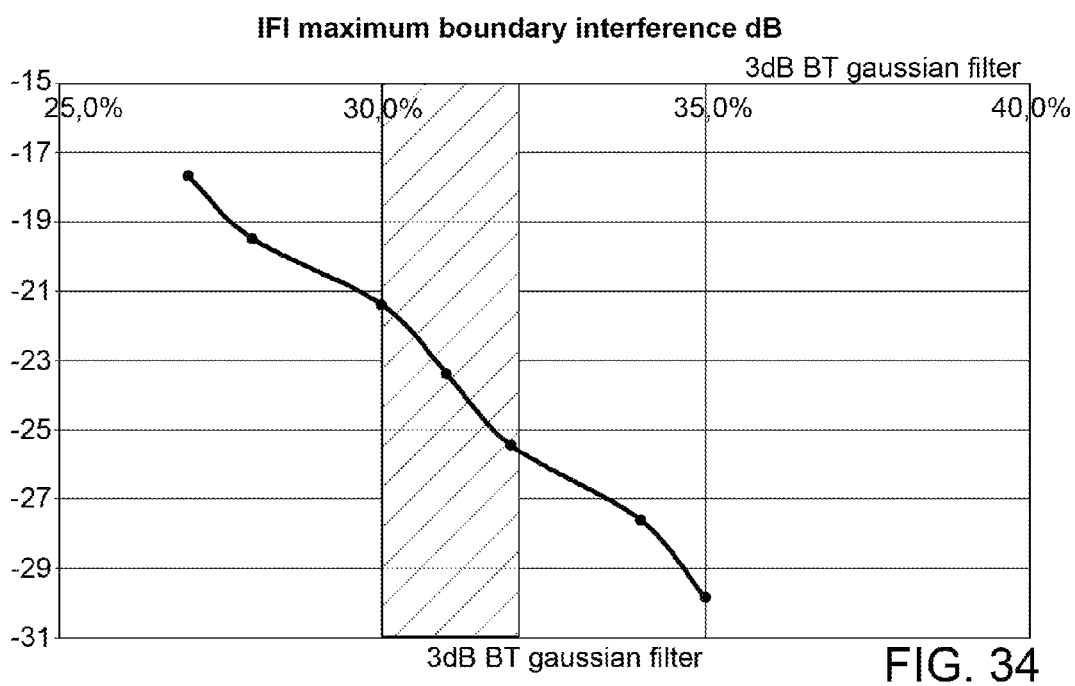
FIG. 34 shows a diagram of IFI with respect to 3 dB BT product of a Gaussian filter.

The increase of the bandwidth is small (wireless terrestrial systems normally use BT=0.3), and the increase of noise level is also small if compared with the improvement of the level of the IFI between frames. In this respect, reference is made to FIG. 34, which shows IFI with respect to 3 dB BT product of a Gaussian filter.

From the foregoing it can be inferred that a reasonable increase of the bandwidth makes the equation system (3) stable and the solution sound.

Figure 35:
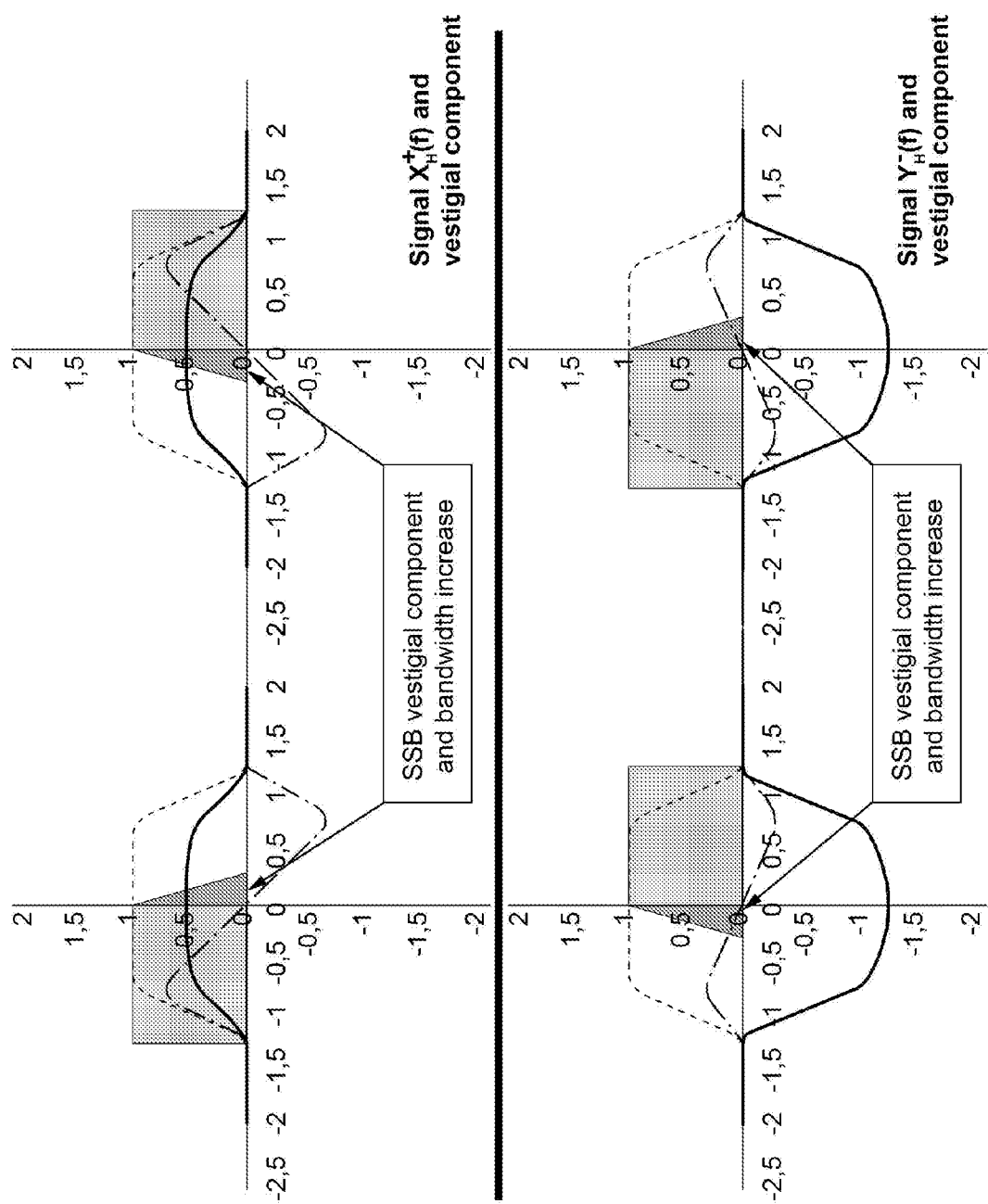
FIG. 35 schematically illustrates Hilbert transforms of two generic band-limited signals along with the corresponding bandwidth increase.

The previously described need of increasing the filter bandwidth is typical of the Hilbert transform. In fact, considering two signals X(f) and Y(f) limited in one and the same bandwidth B, it is possible to define the corresponding Hilbert transforms (shown in FIG. 35) by considering a small increase in bandwidth to keep memory of the break of symmetry.

This way of looking at the Hilbert transform is not convenient for an expansion into twisted waves, but the mutual relationship is very simple. In fact, ignoring for the moment the vestigial component, it can be written:

$$X(f)=X^+(f-f_0)u_0(f-f_0)+X^-(f-f_0)u_0(-f-f_0)$$

and $$Y(f)=Y^+(f-f_0)u_0(f-f_0)+Y^-(f-f_0)u_0(-f-f_0)$$

Let us now consider $$DH(f)=X^+(f-f_0)u_0(f-f_0)+Y^-(f-f_0)u_0(-f-f_0)$$

Figure 36:
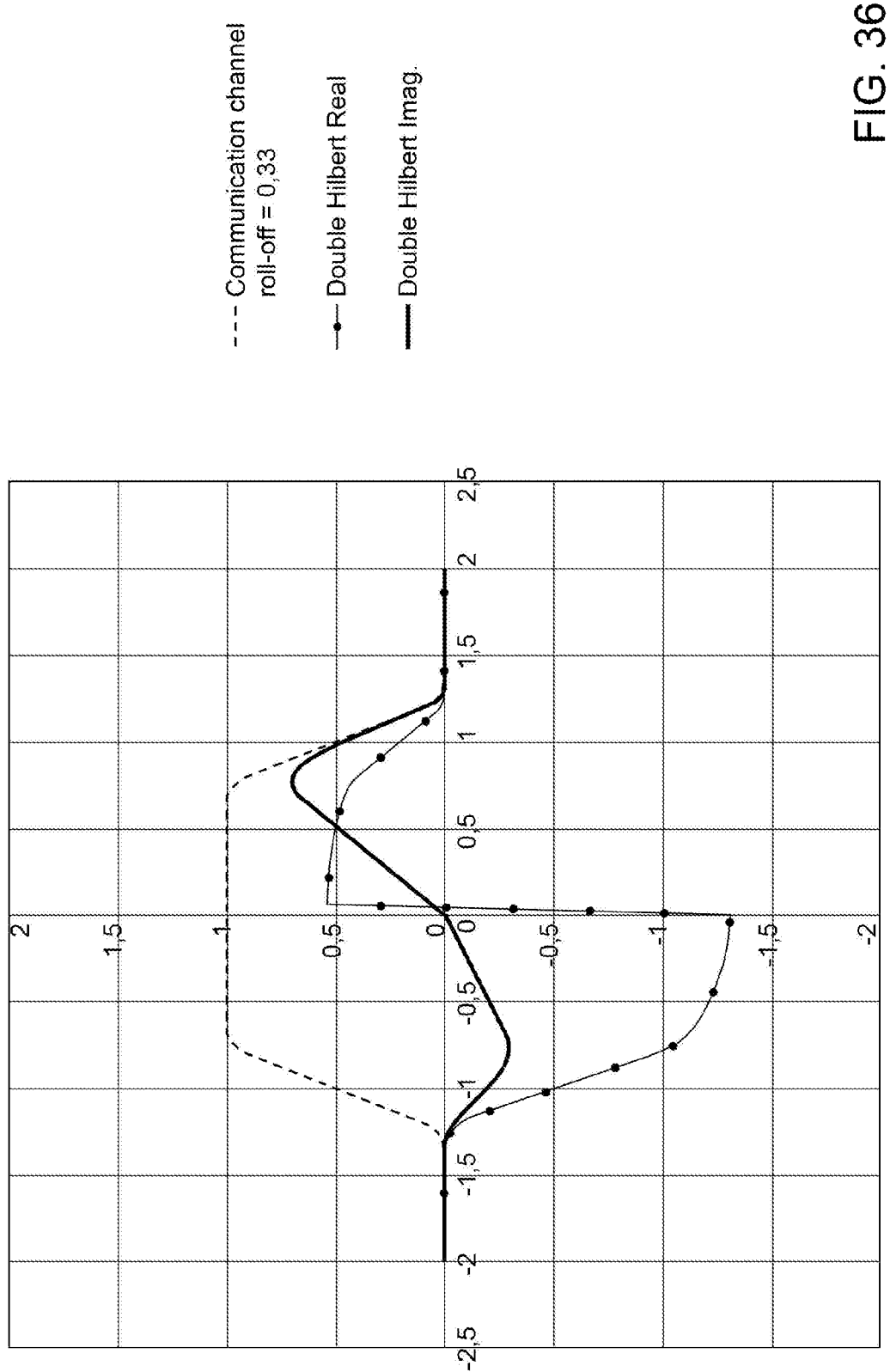
FIG. 36 schematically illustrates an example of double-bandwidth Hilbert transform.
Figure 37:
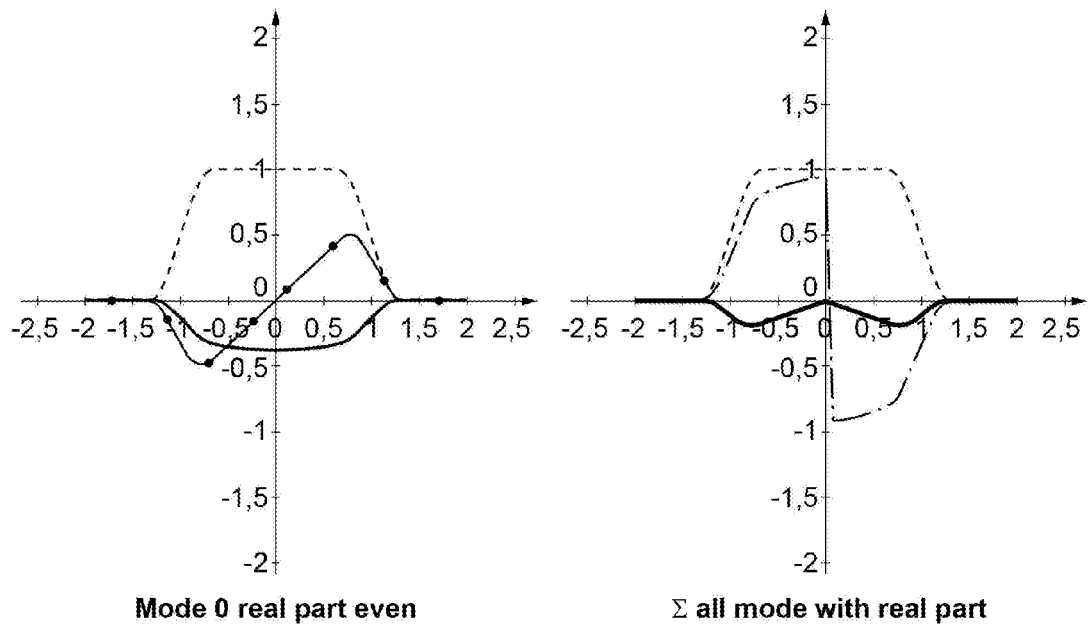
FIG. 37 schematically illustrates an example of double-bandwidth Hilbert transform and twisted waves.

This double-bandwidth Hilbert transform (for positive frequencies) is shown in FIG. 36. The function can be rearranged into two functions, namely a first function having the real part even and the imaginary part odd, and a second function having the imaginary part even and the real part odd. This form can be easily represented in the following way: the one with the real part even equivalent to mode n=0 (i.e., the plane wave), the one with the real part odd as the sum of all the odd modes representing the harmonic development of the double-bandwidth Hilbert transform. Each mode can be regarded as a twisted wave:

$$DH(f)=X^+(f-f_0)u_0(f-f_0)+Y^-(f-f_0)u_0(-f-f_0)=\xi_E(f-f_0)+\eta_O(f-f_0)+j[\xi_E(f-f_0)+\eta_O(f-f_0)]$$

where $\xi(f)$ represents the mode n=0, and $\eta(f)$ represents the limit of the sum of all the twisted modes (as shown in FIG. 37).

The introduction of the vestigial component on the new set of signals is rewarded with the possibility of detecting the reference of symmetry and anti-symmetry, i.e., the symbol rate. It is evident that to detect the symbol rate there is the need to use a sampling rate slightly larger, defined in a way to have, within each time frame, an integer number of samples with respect to an integer number of symbol frames.

Figure 38:
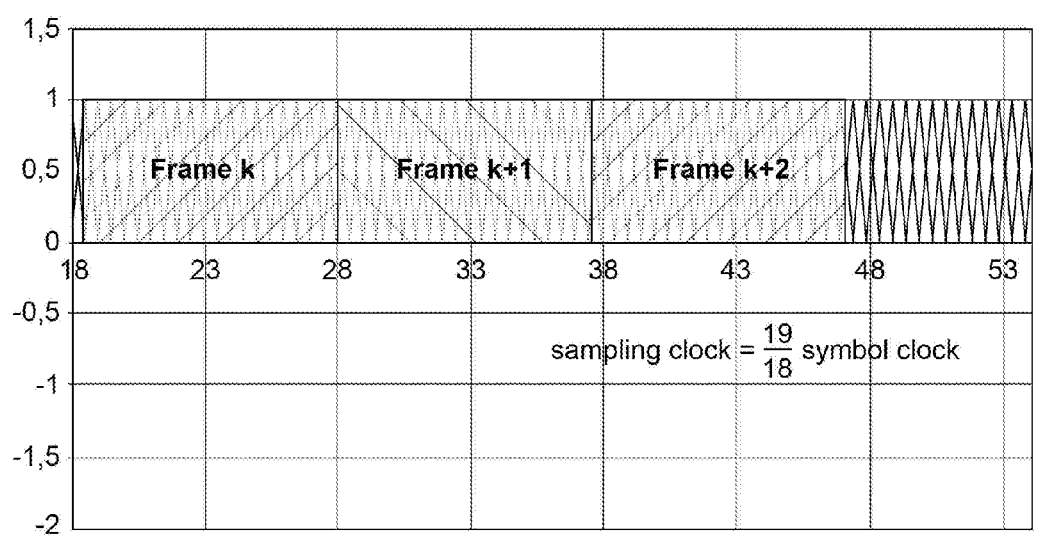
FIGS. 38 and 39 schematically illustrate a frame synchronization concept according to a preferred embodiment of the present invention.
Figure 39:
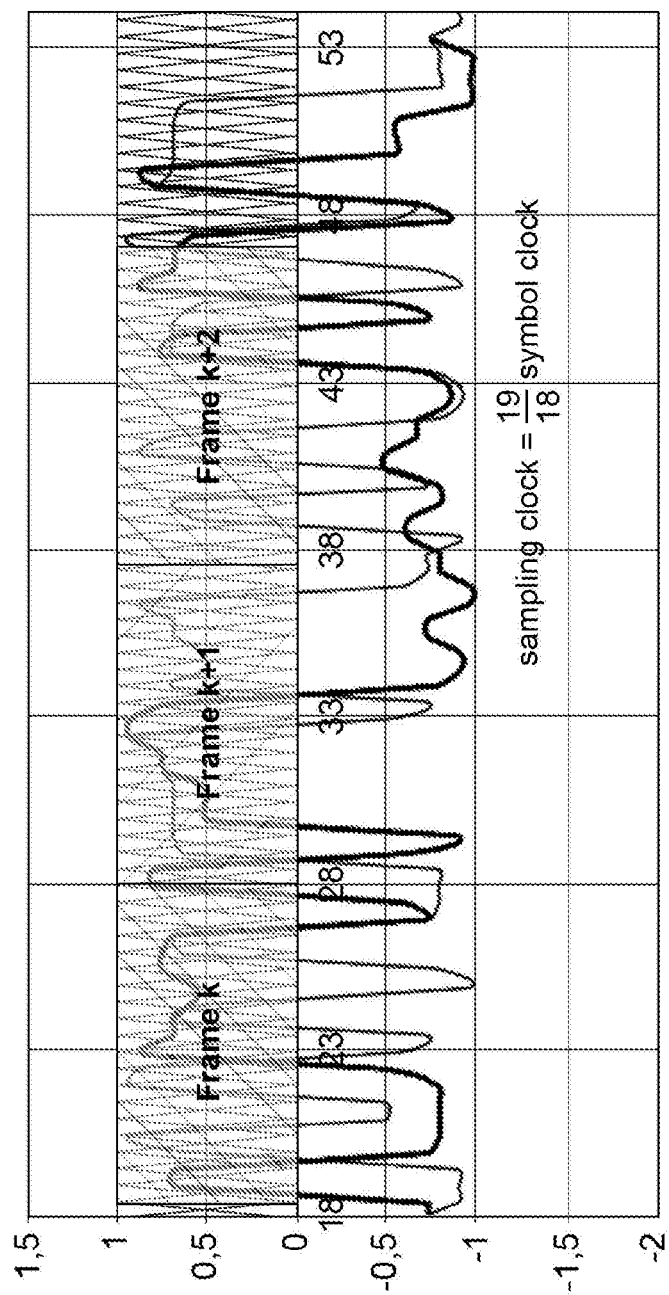

Furthermore, in consideration of the use of time frames, it is convenient to adopt a signal organization architecture, i.e., a reference system, useful to detect the signal structure at the reception side. In fact, as previously explained, each time frame has, preferably, a time length of $(2^{N+1}+1)T_S$ (where N identifies the highest modes used, or, equivalently, is the topological charge of the highest modes used), and is to be identified at reception side. Therefore, it is convenient that the overall transmitted signal carries information on frame synchronization in addition to the symbol clock. Considering the use of modes n=0, ±1, ±2 and an oversampling which is twice the symbol rate, then information on frame synchronization can conveniently identify the start of each frame every 18 samples. In this respect, FIGS. 38 and 39 show frame synchronization concept.

For example, in order for the overall transmitted signal to carry frame synchronization information, conveniently information indicating frame beginning can be periodically transmitted, similarly to the beginning of a frame in a Time-Division Multiplexing (TDM) stream, or to the preambles used in Time Division Multiple Access (TDMA).

Figure 40:
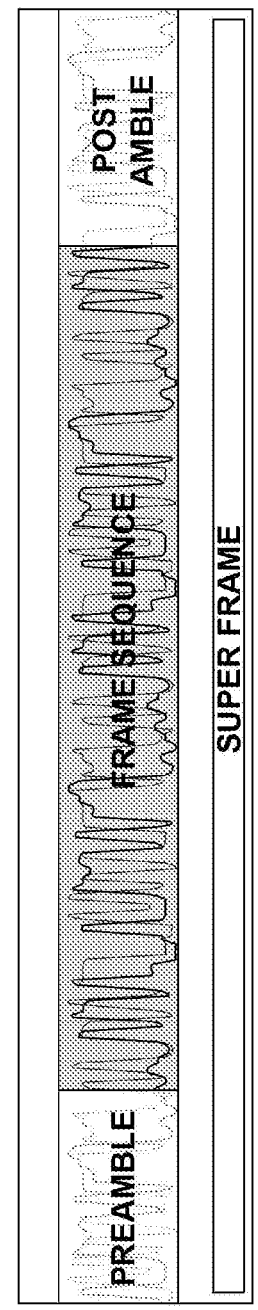
FIG. 40 schematically illustrates an example of super frame structure according to a preferred embodiment of the present invention.

In particular, a suitable preamble can be conveniently transmitted every F frame (with F integer conveniently higher than one). In this case, each sequence of F frames can be called Twisted Wave Super Frame (TWSF), or simply Super Frame (SF). In this respect, FIG. 40 shows an example of super frame structure.

As far as sampling rate (or clock rate) CR recovery at reception side is concerned, attention is again drawn to the fact, at reception side, the symbol clock can be correctly recovered thanks to the fact that the sampling rate (or clock rate) CR is slightly higher than the symbol rate, i.e., the symbol bandwidth is slightly larger than the Nyquist one.

Figure 41A:
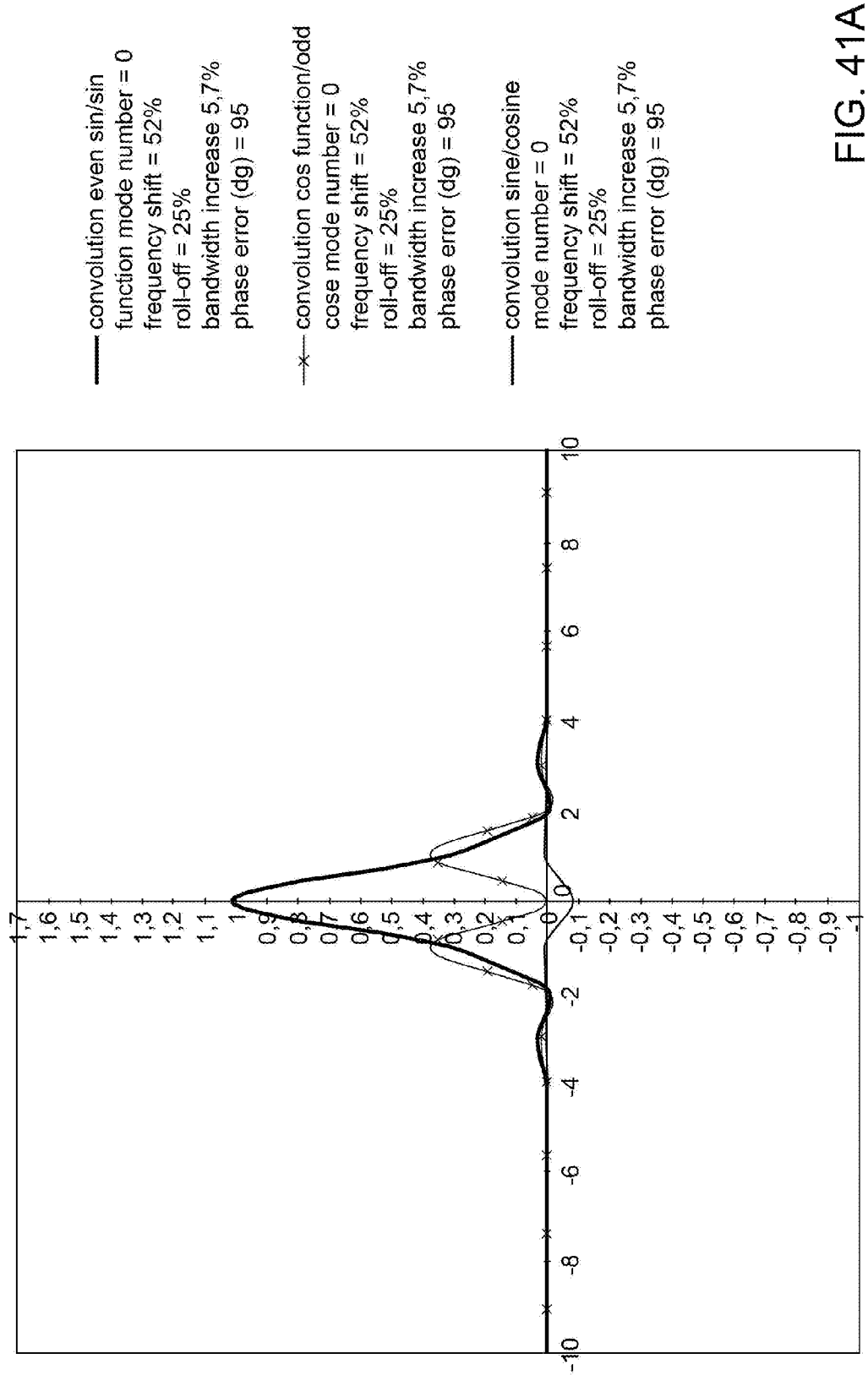
FIGS. 41A and 41B schematically illustrate examples of convolution functions and phase error functions for plane wave modulation.
Figure 41B:
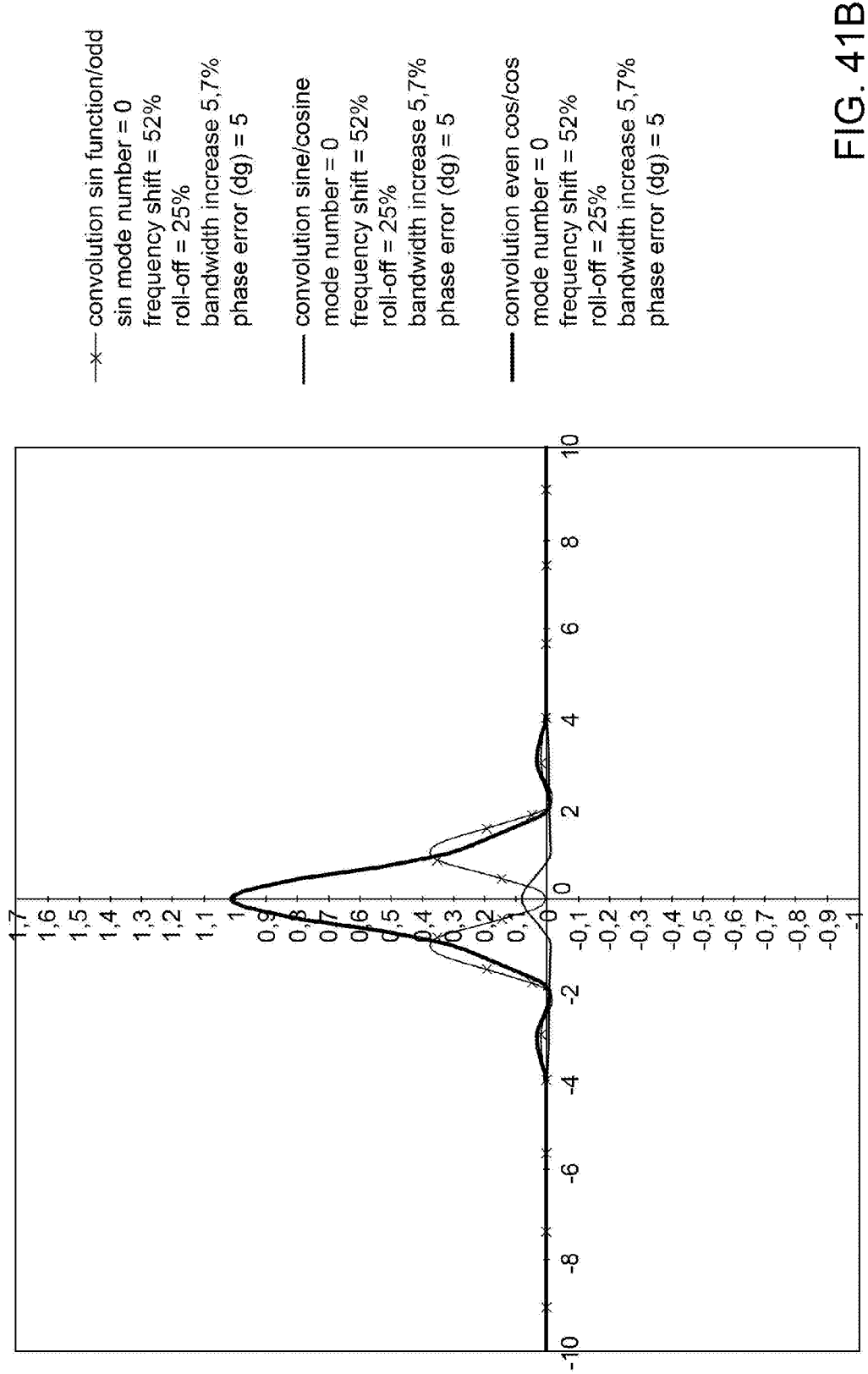

The easiest way to keep the right clock signal is based on the convolution function between the cosine component and the sine component of the real part (or the imaginary part). If there is no error, this convolution is equal to zero. This property is independent of the carrier. In fact, if the carrier is an even multiple of $1/T_S$, there is no sine component of the convolution between the odd component and the sine function, while, in the other cases, this component is present. In this respect, FIGS. 41A and 41B show examples of convolution functions and phase error functions for plane wave modulation.

The phase error function creates an oscillatory function with a maximum in correspondence to the even sample. The minimization of the function amplitude minimizes the phase error.

This procedure allows keeping locked the received stream of a plane-wave-modulated signal.

Figure 42:
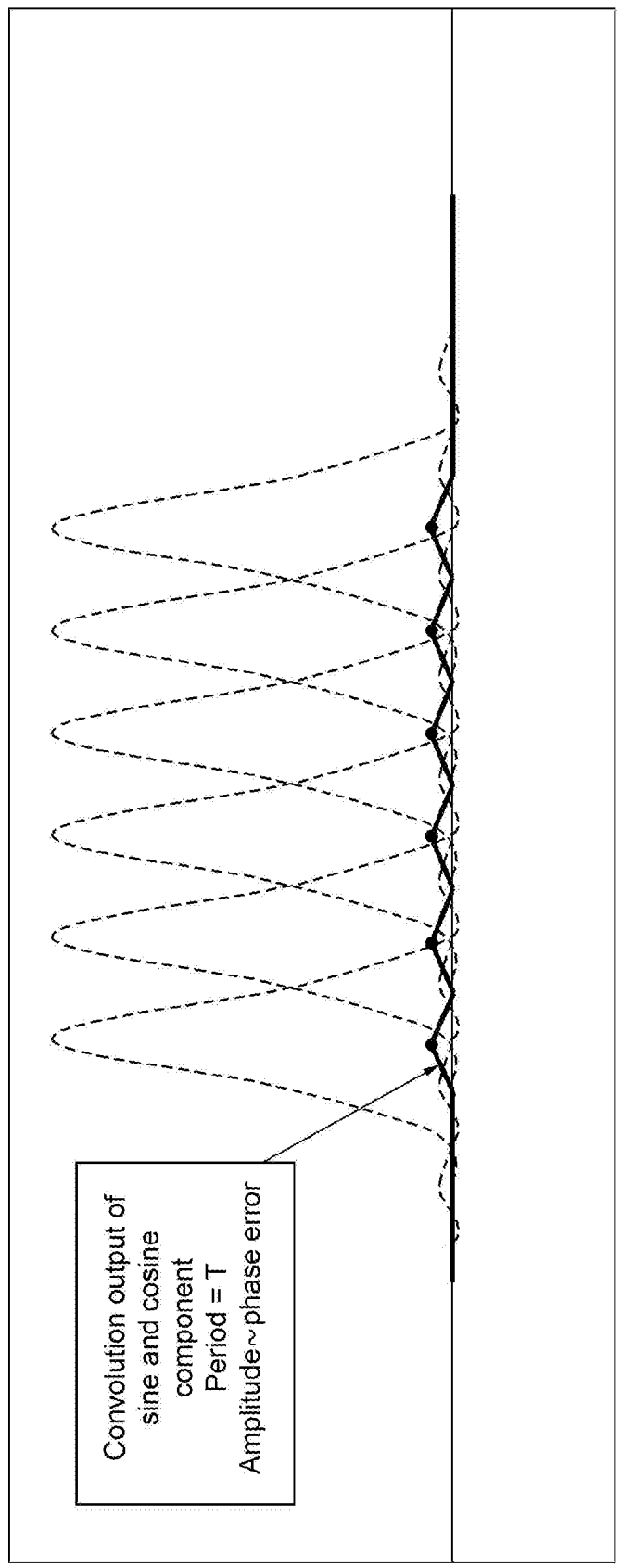
FIG. 42 schematically illustrates an example of error signal for a generic symbol stream.

In this respect, FIG. 42 shows an example of error signal for a generic symbol stream.

Figure 43:
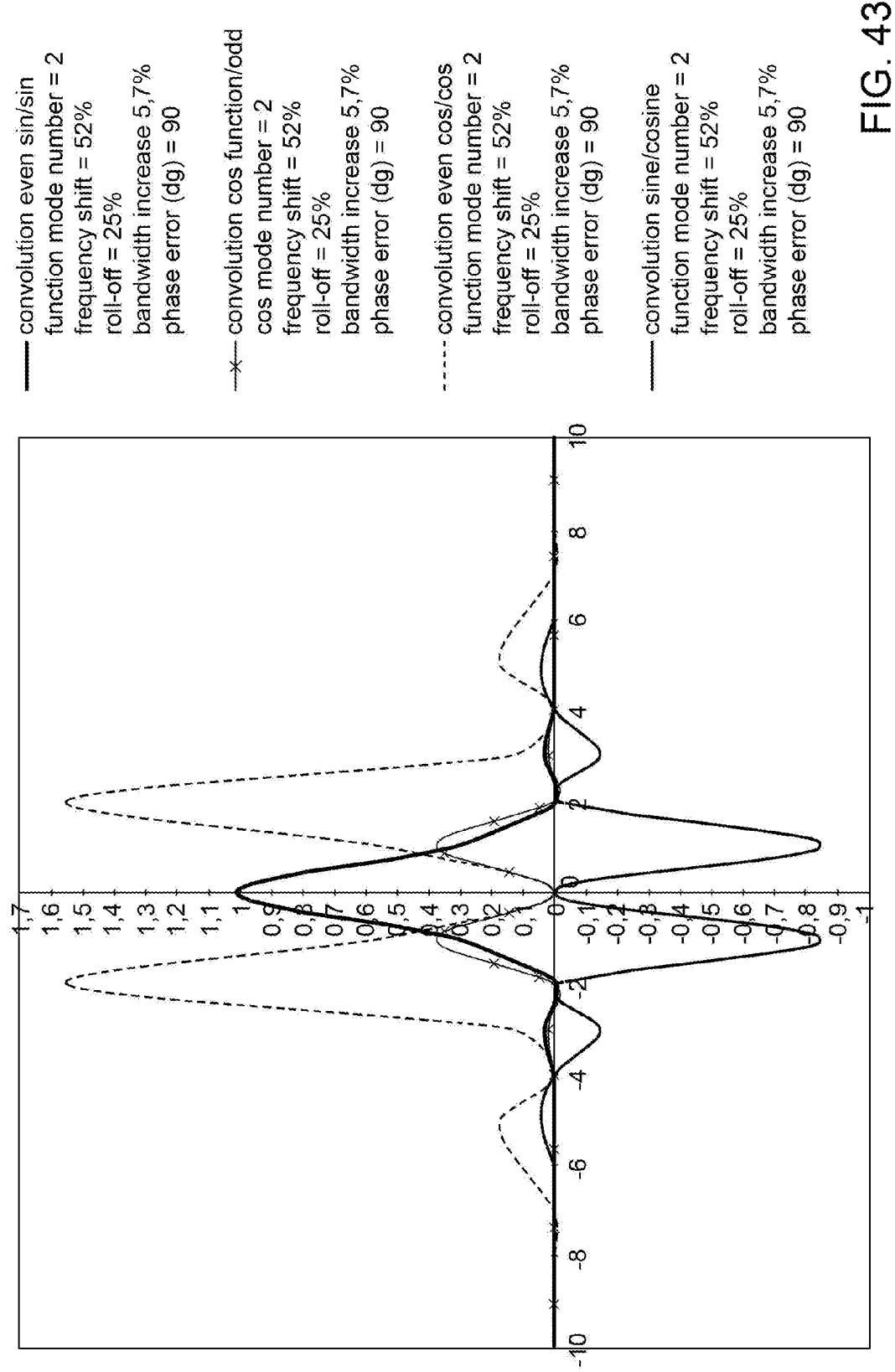
FIG. 43 schematically illustrates an example of sine-cosine convolution without phase error.

If twisted waves are present, the convolution functions are more complex, but the sine-cosine convolution is zero without phase errors in correspondence of the symbol sampling. In this respect, reference is made to FIG. 43, which shows an example of sine-cosine convolution without phase error.

If the phase error is different from zero, also the sine-cosine convolution is different from zero. It can be noted that, if twisted waves (or imaginary signals) are present, then the convolution function is zero without errors, not everywhere, but in correspondence with the even samples.

Recalling the similarities between geometrical interferometry and time interferometry, it can be said that this characteristic is equivalent to the geometrical accurate pointing necessary in the geometrical case.

Figure 44:
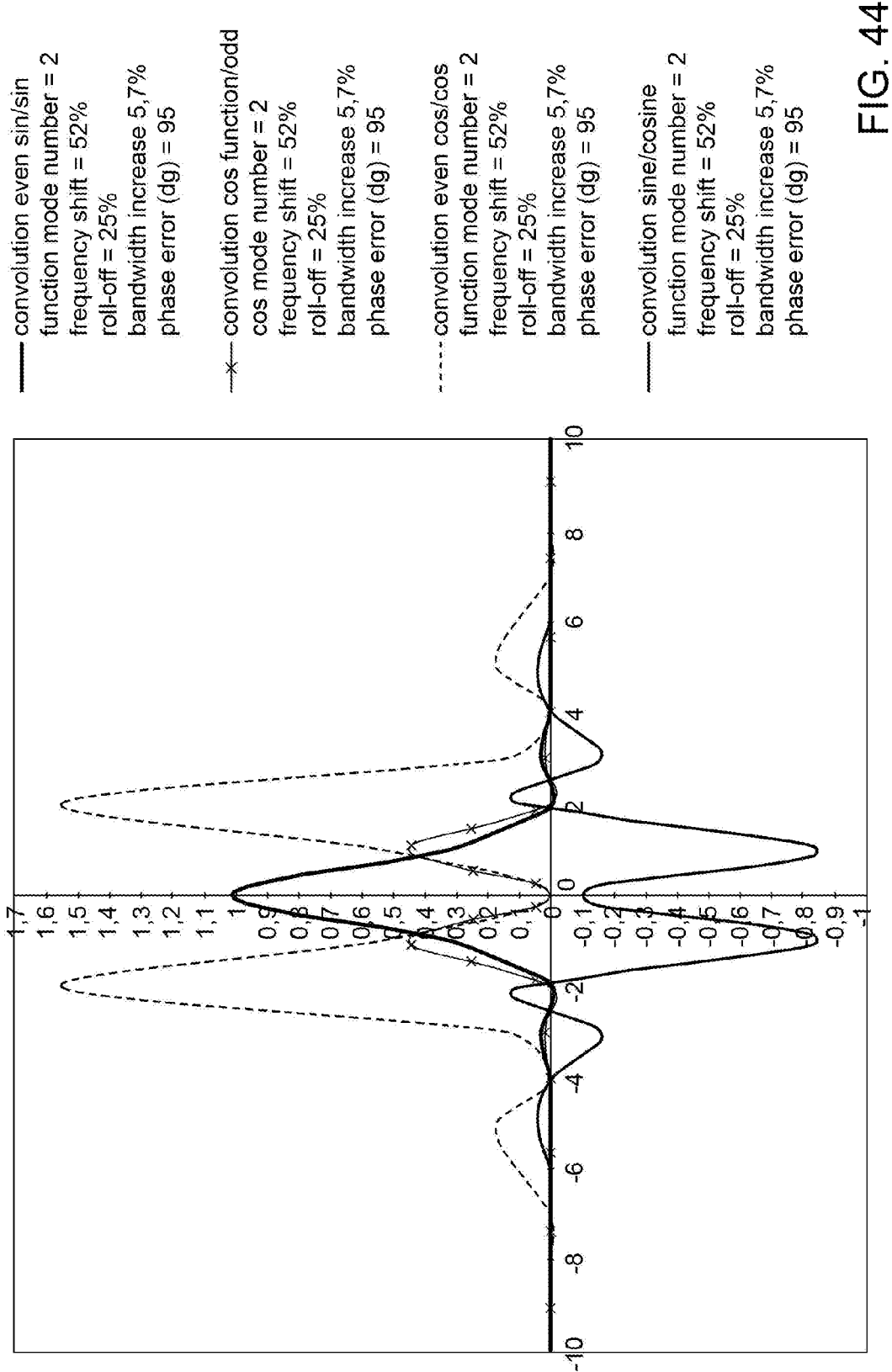
FIG. 44 schematically illustrates an example of sine-cosine convolution with phase error.

In this respect, FIG. 44 shows an example of sine-cosine convolution with phase error.

The presence of the non-zero signal at times multiple of $T_S$ allows to detect an oscillatory function different from zero in correspondence with the even samples. The minimization of this amplitude minimizes the phase error.

Figure 45:
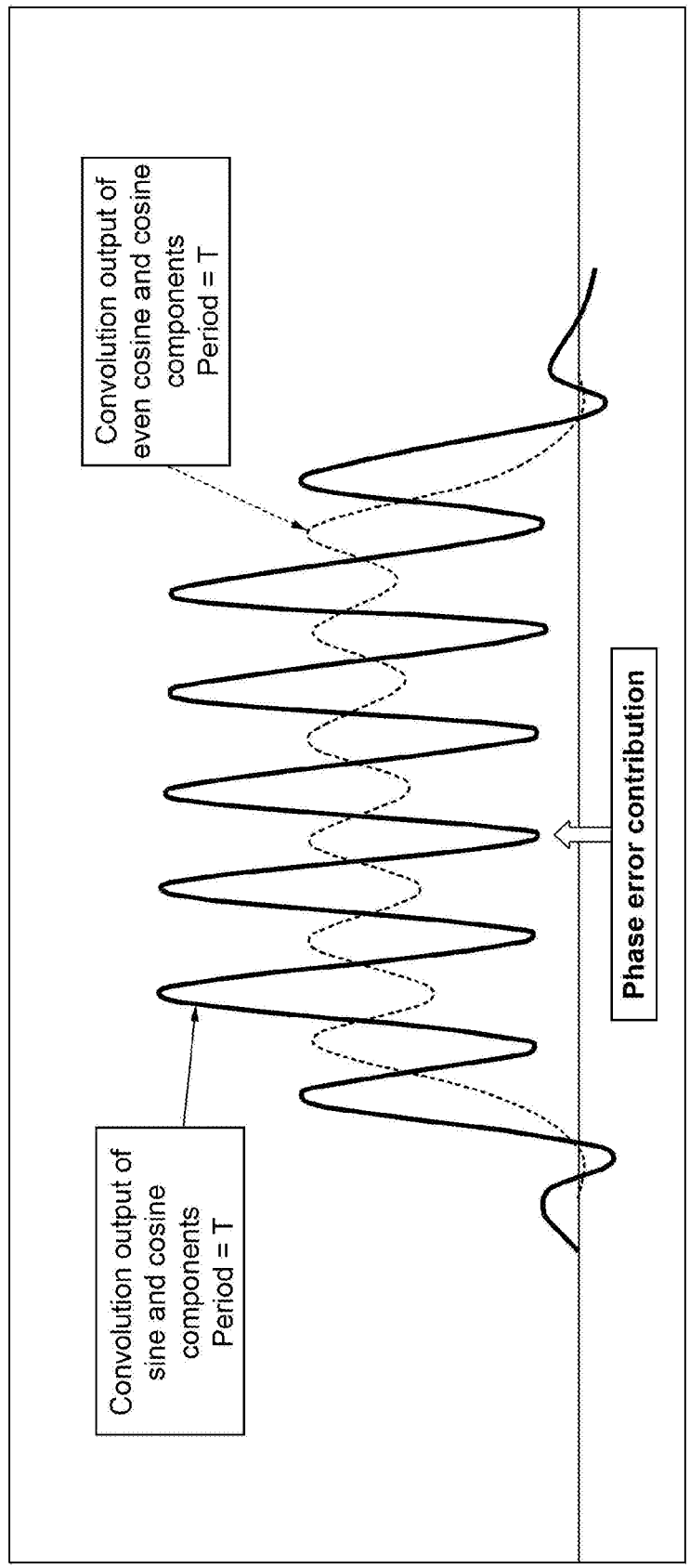
FIG. 45 schematically illustrates an example of error signal for a generic symbol stream.

In this respect, FIG. 45 shows an example of error signal for a generic symbol stream. It has to be noted that, in case of twisted waves, a double recovery is active, i.e., sampling time recovery and phase error recovery. That is the physical reason for using a slightly larger bandwidth that the one foreseen by Nyquist.

The previously proposed way to realize the Hilbert odd mode signals suggests a very interesting property. In particular, due to the fact that each symbol is repeated, according to the mode number, $4(2^{N-1})$ times, a processing gain can be considered for the symbol associated with the mode N equal to $4(2^{N-1})$. Therefore, it can be considered that either the energy per sample can be reduced, or the modulation constellation can be increased accordingly.

Figure 46:
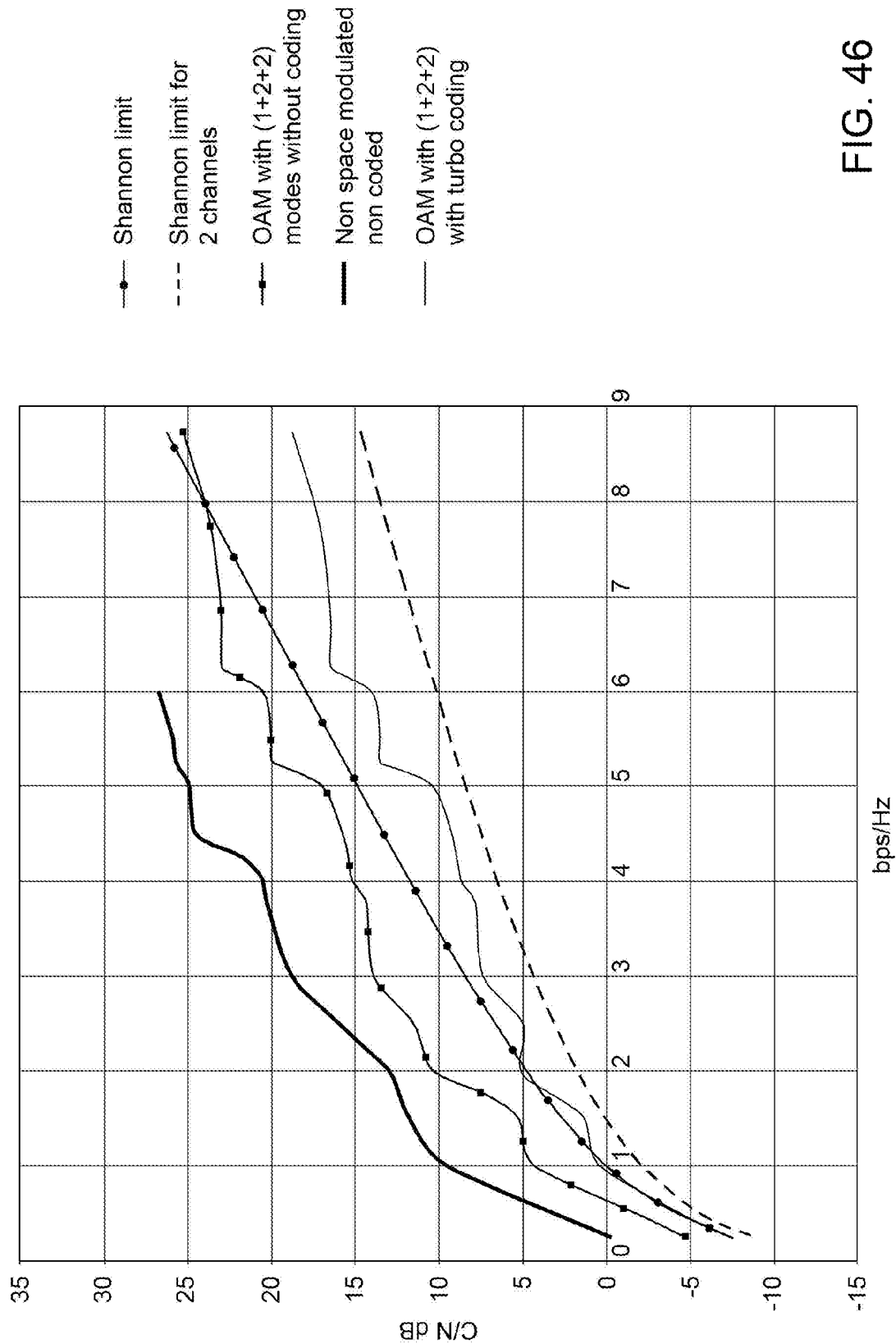
FIG. 46 shows a diagram representing advantages in using twisted waves according to the present invention.

The overall result is very interesting: due to the channel number increase and the possibility of using the processing gain, the advantage in using two independent channels can be used in the same bandwidth according to the Shannon theorem. In this respect, reference is made to FIG. 46 which shows the advantage in using twisted waves. In particular, in FIG. 46 the considered Shannon limit is the one given by two channels, i.e., real and imaginary ones.

Therefore, there is the possibility of encoding the symbol stream by using turbo codes thereby achieving a further advantage in addition to the advantage given by the use of the imaginary channels approximated by the twisted waves.

As explained in the foregoing, the implementation of the twisted wave signal modulation according to the present invention can be regarded as an approximation of the Hilbert transform. This fact implies, on one side, a bandwidth increase, and, on the other side, the presence of an absolute limitation on increase in frequency reuse, which is lower than two. In this respect, the following table lists some features of the twisted wave signal modulation according to the present invention.

TABLE

| PARAMETER | PARAMETER VALUE (considering using up to modes n = ±N) | PARAMETER APPROXIMATE VALUE FOR N = 2 |
|---|---|---|
| Frequency reuse | $\dfrac{2^{N+2} - 1}{2^{N+1} + 1}$ | 1.67 |
| Vestigial band rate reduction | $\dfrac{2^{N+2} + 2}{2^{N+2} + 3}$ | 0.95 |
| Frame length | $T_F = (2^{N+1} + 1)T_S$ | $9T_s$ |
| Super Frame loss | <1% | 0.99 |
| Additional bandwidth noise (dB) | $10\log\left(\dfrac{2^{N+2} + 3}{2^{N+2} + 2}\right)$ dB | 0.25 dB |
| Digitalization noise <−30 dB phase error | $\dfrac{N}{2^N - 1}$ | 9 bits |
| Maximum IFI (dB) | <−19 − 3N dB | <−25 dB |

Figure 47:
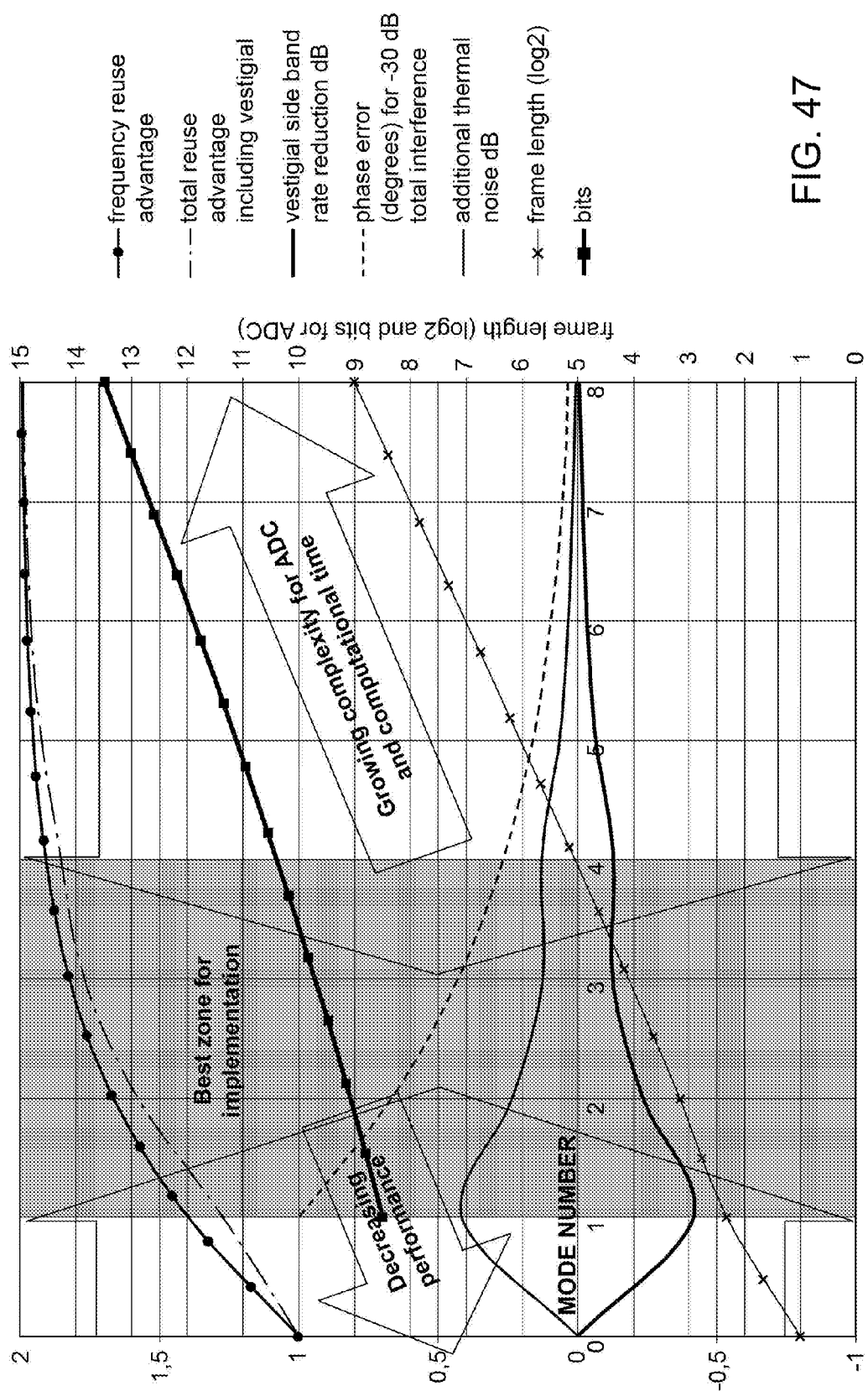
FIG. 47 schematically illustrates several parameters and criteria for implementing the present invention.

Moreover, in FIG. 47 some considerations concerning implementation criteria are schematically presented. As shown in FIG. 47, the choice to use up to modes n=±2 or n=±3 seems to be a very good compromise between performance and implementation complexity. In particular, for N=3 (i.e., in case of using up to modes n=±3), the frame length is lower than 32 symbols, the necessary number of bits is about 10, the thermal noise increase is lower than 0.2 dB, and the frequency reuse is close to 1.8.

As far as the feasibility of the present invention is concerned, the multi-mode signal generation device 400 and the symbol extraction device 500 are preferably implemented by means of Field-Programmable Gate Array (FPGA), Application-Specific Integrated Circuit (ASIC), and Software Defined Radio (SDR) technologies.

Moreover, the present invention can be applied also to a radar and Synthetic Aperture Radar (SAR) systems. In fact, the transmitting system 4 and the receiving system 5 previously described and shown in FIGS. 25 and 28, respectively, can conveniently be also:
- the transmitting section and the receiving section of a monostatic radar or SAR system; or
- the transmitter and the receiver of a bistatic radar or SAR system.

In particular, in case of radar/SAR application, the symbol generation section 40 is a radar pulse generation section configured to generate a digital radar pulse stream. Accordingly, the multi-mode signal generation device 400, in use, generates a multi-mode digital radar signal which can be used to increase radar cross-section and also to obtain target shape coefficients by means of twisted mode analysis. In other words, the present invention, if applied to a radar system, allows to improve target detection, and, if applied to a SAR system, allows to improve SAR imaging.

In case of radar/SAR application, the symbol extraction device 500 is a radar echo extraction device, which, in use, extracts radar echoes from the incoming signals.

Moreover, in case of monostatic radar/SAR, the RF transmission section 4000 and the RF reception section 5000 are implemented through a single RF section of the monostatic radar/SAR system.

Instead, in case of bistatic radar/SAR, the RF transmission section 4000 and the RF reception section 5000 are, respectively, the RF transmission section of the radar/SAR transmitter, and the RF reception section of the radar/SAR receiver.

Furthermore, in case of radar/SAR application, the symbol processing section 50 is a radar echo processing section of the monostatic/bistatic radar/SAR system, which radar echo processing section is configured to perform radar detection, or SAR imaging, on the basis of the radar echoes extracted by the radar echo extraction device.

More in detail, the present invention can be applied also to a radar or SAR system thereby obtaining a radar/SAR system comprising a transmitter which is configured to:
- generate or receive S (with S>3) digital radar pulses having a given pulse rate associated with a corresponding pulse period;
- generate a multi-mode digital radar signal, which has a predefined time length shorter than S times the pulse period, which is sampled with a predefined sampling rate higher than the pulse rate, and which carries the S digital radar pulses by means of a plurality of orthogonal harmonic modes comprising
    - a main mode which is a real harmonic mode and carries P (with P<S) of said S digital radar pulses, and
    - one or more secondary modes carrying the other S-P digital radar pulses, each secondary mode being a complex harmonic mode time-shifted by half the pulse period with respect to the main mode; and
- transmit a radar signal carrying the multi-mode digital radar signal towards a region of interest.

Moreover, said radar/SAR system based on the present invention includes also a receiver configured to:
- receive radar echoes from the region of interest;
- process the received radar echoes so as to obtain a corresponding incoming digital signal having the predefined time length; and
- extract, from the incoming digital signal sampled with the predefined sampling rate, the S digital radar echoes carried by the orthogonal harmonic modes.

Conveniently, the transmitter of said radar/SAR system based on the present invention is configured to generate a multi-mode digital radar signal carrying S digital radar pulses by:
- allocating P of the S digital radar pulses to the main mode by providing, for each of said P digital radar pulses, a corresponding complex value which represents said digital radar pulse and is related to the main mode;
- allocating each of the other S-P digital radar pulses to a corresponding secondary mode by providing, for each of said S-P digital radar pulses, a corresponding complex value which represents said digital radar pulse and is related to the secondary mode to which said digital radar pulse is allocated;
- computing, by using a predefined transmission matrix, M multi-mode complex values related to M (with M≥S) successive time instants which, within the predefined time length, are separated by half the pulse period, wherein the predefined transmission matrix relates
    - the S complex values representing the S digital radar pulses and related to the harmonic modes
    - to the M successive time instants
    - through complex coefficients each of which is related to a respective harmonic mode and to a respective time instant; and
- generating a multi-mode digital radar signal having the predefined time length and sampled with the predefined sampling rate on the basis of the M multi-mode complex values computed.

Moreover, the receiver of said radar/SAR system based on the present invention is conveniently configured to extract, from the incoming digital signal sampled with the predefined sampling rate, the S digital radar echoes carried by the orthogonal harmonic modes by:
- extracting, from said incoming digital signal, M multi-mode complex values related to M successive time instants which are, within the predefined time length, separated by half the pulse period;
- computing, by using a reception matrix derived from the predefined transmission matrix, S complex values representing the S digital radar echoes carried by the orthogonal harmonic modes, wherein said reception matrix relates
    - the M extracted multi-mode complex values related to the M successive time instants
    - to the S complex values to be computed
    - through complex coefficients each of which is related to a respective harmonic mode and to a respective time instant; and
- determining the S digital radar echoes represented by the S complex values computed.

Obviously, the concepts previously explained in relation to the transmission and reception matrices, the time length and the sampling rate of the multi-mode digital signals, etc., apply, mutatis mutandis, also to the radar/SAR system based on the present invention.

From the foregoing, it may be immediately appreciated that the present invention allows to increase frequency reuse and transmission capacity by exploiting an original application of the Hilbert transform to digital signals.

The present invention can be considered very interesting and almost revolutionary to develop a new theory for digital communications beyond the classical approach based on analytical signals.

In particular, as previously explained in detail, according to the present invention radio vorticity is considered as a way to approximate the Hilbert transform and is applied to a number of subcarriers so as to generate independent radio channels within one and the same bandwidth. These channels have an available bandwidth decreasing with the radio vorticity mode number and the total bandwidth advantage is growing as $1/2^N$, limited by 2, which represents the maximum possible use of the imaginary channel of the Hilbert transform.

From a mathematical (and physical) perspective, this Hilbert-transform-based approach is very similar to an interferometry measurement performed in time instead of in geometrical space.

Moreover, the present invention can be exploited at payload level (either for increasing multiplexing capability of the satellite payload, or for obtaining a very efficient interference rejection capability for commercial satellites), can be used to improve performances by optimizing the IFI control, for example via turbo modulation techniques, and can be used to extend the use of twisted modes also to terrestrial wireless communications (such as LTE-based or WiMAX-based communications) and radar/SAR systems.

Finally, the principles of the present invention, which in the foregoing have been described with reference to time domain, can be advantageously applied also to frequency domain (for example, to an Orthogonal Frequency-Division Multiplexing (OFDM) system, or an Orthogonal Frequency-Division Multiple Access (OFDMA) system) by exploiting the duality between time and frequency.

In conclusion, it is clear that numerous modifications and variants can be made to the present invention, all falling within the scope of the invention, as defined in the appended claims.

The invention claimed is:

1. A radio communications system comprising a transmitter and a receiver;
wherein the transmitter is configured to:
generate or receive digital symbols having a given symbol rate associated with a corresponding symbol period;
generate, every S digital symbols generated/received, a respective multi-mode digital signal, which has a predefined time length shorter than S times the symbol period, which is sampled with a predefined sampling rate higher than the symbol rate, and which carries said S digital symbols by means of a plurality of orthogonal harmonic modes comprising
a main mode which is a real harmonic mode and carries P of said S digital symbols, and
one or more secondary modes carrying the other S-P digital symbols, each secondary mode being a complex harmonic mode time-shifted by half the symbol period with respect to the main mode; and
transmit a radio frequency signal carrying a sequence of the generated multi-mode digital signals;
wherein S is an integer higher than three and P is an integer lower than S;
and wherein the receiver is configured to:
receive the radio frequency signal transmitted by the transmitter;
process the received radio frequency signal so as to obtain a corresponding incoming digital signal; and
extract, from successive, non-overlapped portions of the incoming digital signal sampled with the predefined sampling rate, the S digital symbols respectively carried by each incoming digital signal portion by means of the orthogonal harmonic modes;
wherein each of the successive, non-overlapped portions of the incoming digital signal has the predefined time length.

2. The radio communications system of claim 1, wherein the transmitter is configured to generate a multi-mode digital signal carrying S digital symbols by:
allocating P of the S digital symbols to the main mode by providing, for each of said P digital symbols, a corresponding complex value which represents said digital symbol and is related to the main mode;
allocating each of the other S-P digital symbols to a corresponding secondary mode by providing, for each of said S-P digital symbols, a corresponding complex value which represents said digital symbol and is related to the secondary mode to which said digital symbol is allocated;
computing, by using a predefined transmission matrix, M multi-mode complex values related to M successive time instants which, within the predefined time length, are separated by half the symbol period, wherein M is an integer equal to or higher than S, and wherein the predefined transmission matrix relates
the S complex values representing the S digital symbols and related to the harmonic modes
to the M successive time instants
through complex coefficients each of which is related to a respective harmonic mode and to a respective time instant; and
generating a multi-mode digital signal having the predefined time length and sampled with the predefined sampling rate on the basis of the M multi-mode complex values computed;
and wherein the receiver is configured to extract the S digital symbols carried by an incoming digital signal portion having the predefined time length and sampled with the predefined sampling rate by:
extracting, from said incoming digital signal portion, M multi-mode complex values related to M successive time instants which are, within the predefined time length, separated by half the symbol period;
computing, by using a reception matrix derived from the predefined transmission matrix, S complex values representing the S digital symbol carried by said incoming digital signal portion by means of the orthogonal harmonic modes, wherein said reception matrix relates
the M extracted multi-mode complex values related to the M successive time instants
to the S complex values to be computed
through complex coefficients each of which is related to a respective harmonic mode and to a respective time instant; and
determining the S digital symbols represented by the S complex values computed.

3. The radio communications system of claim 2, wherein the reception matrix is derived from the predefined transmission matrix through a generalized inversion technique.

4. The radio communications system of claim 2, wherein the predefined transmission matrix is such that the matrix resulting from the multiplication of the transpose of said predefined transmission matrix and said predefined transmission matrix has a determinant different from zero; and wherein the reception matrix is derived from the predefined transmission matrix through a pseudo-inverse technique.

5. The radio communications system of claim 4, wherein the reception matrix is computed on the basis of the following formula:

$$[[GMF]] = ([[A]]^T[[A]])^{-1}[[A]]^T,$$

where [[GMF]] denotes the reception matrix, [[A]] denotes the predefined transmission matrix, $[[A]]^T$ denotes the transpose of the predefined transmission matrix, and $([[A]]^T [[A]])^{-1}$ denotes the operation of inversion of the matrix resulting from the multiplication of the transpose of the predefined transmission matrix and the predefined transmission matrix.

6. The radio communications system according to claim 2, wherein the main mode comprises, within the predefined time length, P samples with sampling period equal to the symbol period;

wherein the secondary modes comprise, within the predefined time length, P−1 samples with sampling period equal to the symbol period, each secondary mode being time-shifted by half the symbol period with respect to the main mode;

and wherein said M successive time instants, which, within the predefined time length, are separated by half the symbol period, are the sampling times of the main mode and of the secondary modes, thereby resulting that M=2P−1.

7. The radio communications system of claim 6, wherein the harmonic modes comprise 2N secondary complex harmonic modes each of which carries a respective Orbital Angular Momentum (OAM) mode and has a respective topological-charge-related index n comprised between −N and +N, N being an integer higher than one;

and wherein the main mode carries $P=2^{N+1}+1$ digital symbols and each secondary complex harmonic mode having topological-charge-related index n carries $2^{N-n+1}$ digital symbols, thereby resulting that $M=2^{N+2}+1$ and $S=2^{N+2}-1$.

8. The radio communications system according to claim 1, wherein the predefined sampling rate depends at least on the predefined time length of each multi-mode digital signal and of each of the successive, non-overlapped portions of the incoming digital signal.

9. The radio communications system of claim 8, wherein the predefined time length is equal to P times the symbol period.

10. The radio communications system of claim 9, wherein the predefined sampling rate is determined on the basis of the following formula:

$$CR = \frac{2P+u}{2P} \cdot \frac{1}{T_S},$$

where CR denotes said predefined sampling rate, $T_S$ denotes the symbol period, and u denotes a digital-vestigial-component-related parameter whose value is an integer and depends at least on the predefined time length.

11. The radio communications system according to claim 1, wherein the transmitter is configured to generate a multi-frame digital signal comprising successive, non-overlapped time frames each of which has the predefined time length and is occupied by a respective multi-mode digital signal;

wherein the multi-frame digital signal carries frame synchronization data related to frame synchronization of its time frames;

wherein the radio frequency signal transmitted by the transmitter carries the multi-frame digital signal;

and wherein the receiver is further configured to:

extract the frame synchronization data from the incoming digital signal;

detect, on the basis of the extracted frame synchronization data, successive, non-overlapped time frames of the incoming digital signal with the predefined time length; and, for each detected time frame of the incoming digital signal, extract, from the incoming digital signal portion within said time frame, the S digital symbols carried by said incoming digital signal portion by means of the orthogonal harmonic modes.

12. The radio communications system of claim 11, wherein the multi-frame digital signal comprises a preamble followed by F successive, non-overlapped time frames occupied, each, by a respective multi-mode digital signal, F being an integer higher than one; and wherein the preamble carries frame synchronization data related to frame synchronization of the F following time frames.

13. The radio communications system of claim 11, wherein the frame synchronization data indicate time frame beginning and/or the predefined time length of the time frames.

14. A transmitting system configured as the transmitter of the radio communications system claimed in claim 1.

15. A hardware component comprising software code portions which are:

executable by a processor of a transmitting system configured to transmit radio frequency signals; and such that to cause, when executed, said transmitting system to become configured as the transmitter of the radio communications system claimed in claim 1.

16. A receiving system configured as the receiver of the radio communications system claimed in claim 1.

17. A hardware component comprising software code portions which are:

executable by a processor of a receiving system configured to receive radio frequency signals; and such that to cause, when executed, said receiving system to become configured as the receiver of the radio communications system claimed in claim 1.

18. A transmitting and receiving system comprising:

a transmitting section, which is configured as the transmitter of the radio communications system claimed in claim 1, and which is operable to transmit to another system comprising the receiver of the radio communications system; and a receiving section, which is configured as the receiver of the radio communications system, and which is operable to receive from another system comprising the transmitter of the radio communications system.

19. A hardware component comprising software code portions which are:

executable by a processor of a transmitting and receiving system configured to transmit and receive radio frequency signals; and such that to cause, when executed, said transmitting and receiving system to become configured as the transmitter and the receiver of the radio communications system claimed in claim 1.

20. A radar system comprising a transmitter and a receiver;

wherein the transmitter is configured to:

generate or receive S digital radar pulses having a given pulse rate associated with a corresponding pulse period, S being an integer higher than three;

generate a multi-mode digital radar signal, which has a predefined time length shorter than S times the pulse period, which is sampled with a predefined sampling rate higher than the pulse rate, and which carries the S digital radar pulses by means of a plurality of orthogonal harmonic modes comprising
    a main mode which is a real harmonic mode and carries P of said S digital radar pulses, and
    one or more secondary modes carrying the other S-P digital radar pulses, each secondary mode being a complex harmonic mode time-shifted by half the pulse period with respect to the main mode; and
transmit a radar signal carrying the multi-mode digital radar signal towards a region of interest;
wherein P is an integer lower than S;
and wherein the receiver is configured to:
receive radar echoes from the region of interest;
process the received radar echoes so as to obtain a corresponding incoming digital signal having the predefined time length; and
extract, from the incoming digital signal sampled with the predefined sampling rate, the S digital radar echoes carried by the orthogonal harmonic modes.

21. The radar system of claim 20, wherein the transmitter is configured to generate a multi-mode digital radar signal carrying S digital radar pulses by:
    allocating P of the S digital radar pulses to the main mode by providing, for each of said P digital radar pulses, a corresponding complex value which represents said digital radar pulse and is related to the main mode;
    allocating each of the other S-P digital radar pulses to a corresponding secondary mode by providing, for each of said S-P digital radar pulses, a corresponding complex value which represents said digital radar pulse and is related to the secondary mode to which said digital radar pulse is allocated;
    computing, by using a predefined transmission matrix, M multi-mode complex values related to M successive time instants which, within the predefined time length, are separated by half the pulse period, wherein M is an integer equal to or higher than S, and wherein the predefined transmission matrix relates
        the S complex values representing the S digital radar pulses and related to the harmonic modes
        to the M successive time instants
        through complex coefficients each of which is related to a respective harmonic mode and to a respective time instant; and
    generating a multi-mode digital radar signal having the predefined time length and sampled with the predefined sampling rate on the basis of the M multi-mode complex values computed;
and wherein the receiver is configured to extract, from the incoming digital signal sampled with the predefined sampling rate, the S digital radar echoes carried by the orthogonal harmonic modes by:
    extracting, from said incoming digital signal, M multi-mode complex values related to M successive time instants which are, within the predefined time length, separated by half the pulse period;
    computing, by using a reception matrix derived from the predefined transmission matrix, S complex values representing the S digital radar echoes carried by the orthogonal harmonic modes, wherein said reception matrix relates
        the M extracted multi-mode complex values related to the M successive time instants
        to the S complex values to be computed
        through complex coefficients each of which is related to a respective harmonic mode and to a respective time instant; and
    determining the S digital radar echoes represented by the S complex values computed.

22. The radar system of claim 21, wherein the reception matrix is derived from the predefined transmission matrix through a generalized inversion technique.

23. The radar system of claim 21, wherein the predefined transmission matrix is such that the matrix resulting from the multiplication of the transpose of said predefined transmission matrix and said predefined transmission matrix has a determinant different from zero; and wherein the reception matrix is derived from the predefined transmission matrix through a pseudo-inverse technique.

24. The radar system of claim 23, wherein the reception matrix is computed on the basis of the following formula:

$$[[GMF]] = ([[A]]^T[[A]])^{-1}[[A]]^T,$$

where $[[GMF]]$ denotes the reception matrix, $[[A]]$ denotes the predefined transmission matrix, $[[A]]^T$ denotes the transpose of the predefined transmission matrix, and $([[A]]^T[[A]])^{-1}$ denotes the operation of inversion of the matrix resulting from the multiplication of the transpose of the predefined transmission matrix and the predefined transmission matrix.

25. The radar system according to claim 21, wherein the main mode comprises, within the predefined time length, P samples with sampling period equal to the pulse period;
    wherein the secondary modes comprise, within the predefined time length, P-1 samples with sampling period equal to the pulse period, each secondary mode being time-shifted by half the pulse period with respect to the main mode;
    and wherein said M successive time instants, which, within the predefined time length, are separated by half the pulse period, are the sampling times of the main mode and of the secondary modes, thereby resulting that M=2P-1.

26. The radar system of claim 25, wherein the harmonic modes comprise 2N secondary complex harmonic modes each of which carries a respective Orbital Angular Momentum (OAM) mode and has a respective topological-charge-related index n comprised between -N and +N, N being an integer higher than one;
    and wherein the main mode carries $P=2^{N+1}+1$ digital radar pulses and each secondary complex harmonic mode having topological-charge-related index n carries $2^{N-n+1}$ digital radar pulses, thereby resulting that $M=2^{N+2}+1$ and $S=2^{N+2}-1$.

27. The radar system according to claim 20, wherein the predefined sampling rate depends at least on the predefined time length of the multi-mode digital radar signal.

28. The radar system of claim 27, wherein the predefined time length is equal to P times the pulse period.

29. The radar system of claim 28, wherein the predefined sampling rate is determined on the basis of the following formula:

$$CR = \frac{2P+u}{2P} \cdot \frac{1}{T_S},$$

where CR denotes said predefined sampling rate, $T_S$ denotes the pulse period, and u denotes a digital-vestigial-component-related parameter whose value is an integer and depends at least on the predefined time length.

30. The radar system according to claim 20, wherein said radar system is a Synthetic Aperture Radar (SAR) system.

31. A hardware component comprising software code portions which are:
  executable by a processor of a radar system; and
  such that to cause, when executed, said radar system to become configured as the radar system claimed in claim 20.

* * * * *